Sept. 15, 1959  C. R. BEHLING  2,903,979
METHOD AND APPARATUS FOR PRODUCT PROCESSING
Filed May 11, 1954  21 Sheets-Sheet 1

INVENTOR
CLARENCE R. BEHLING
BY Strauch, Nolan & Diggins
ATTORNEYS

INVENTOR
CLARENCE R. BEHLING

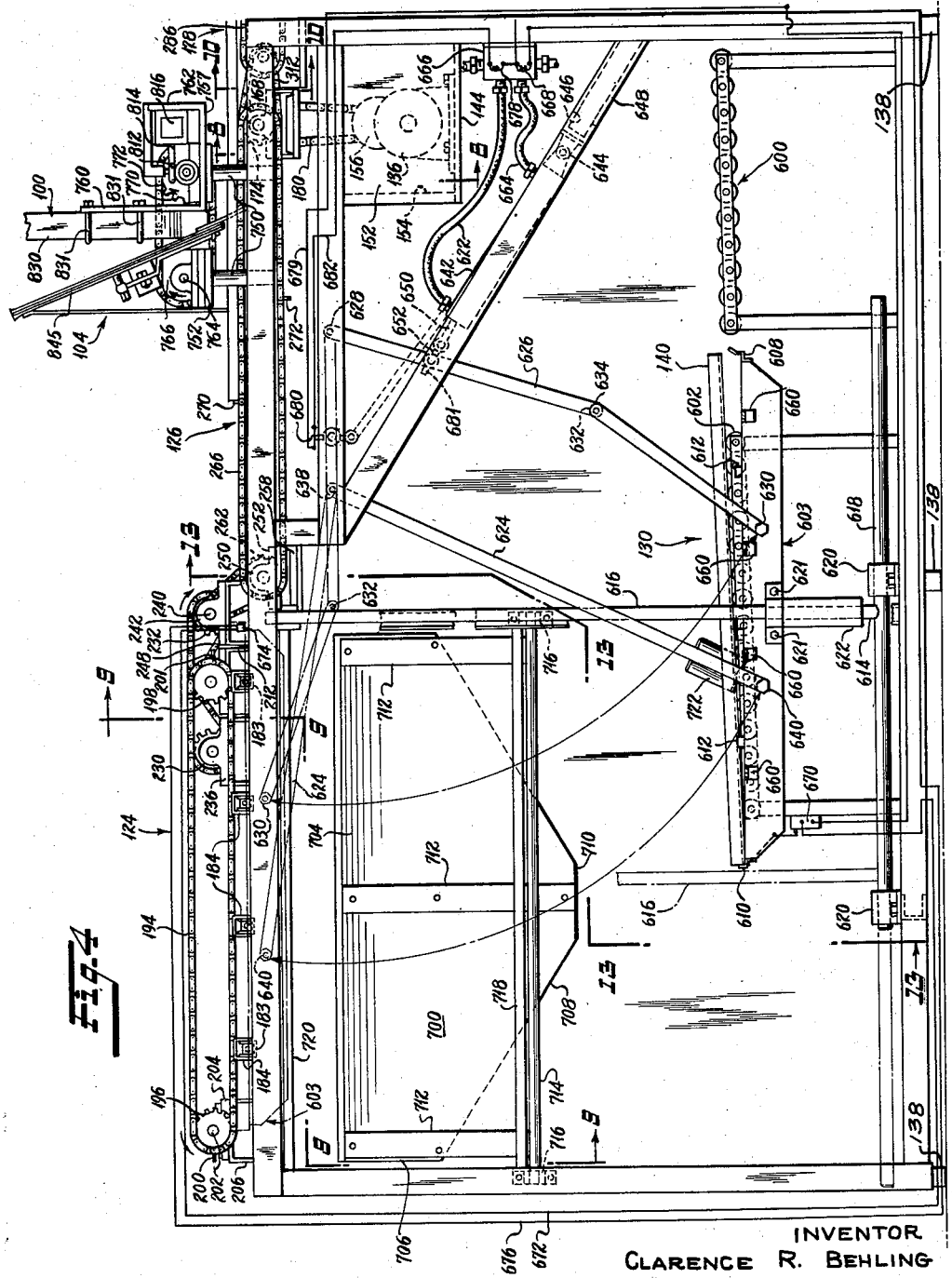

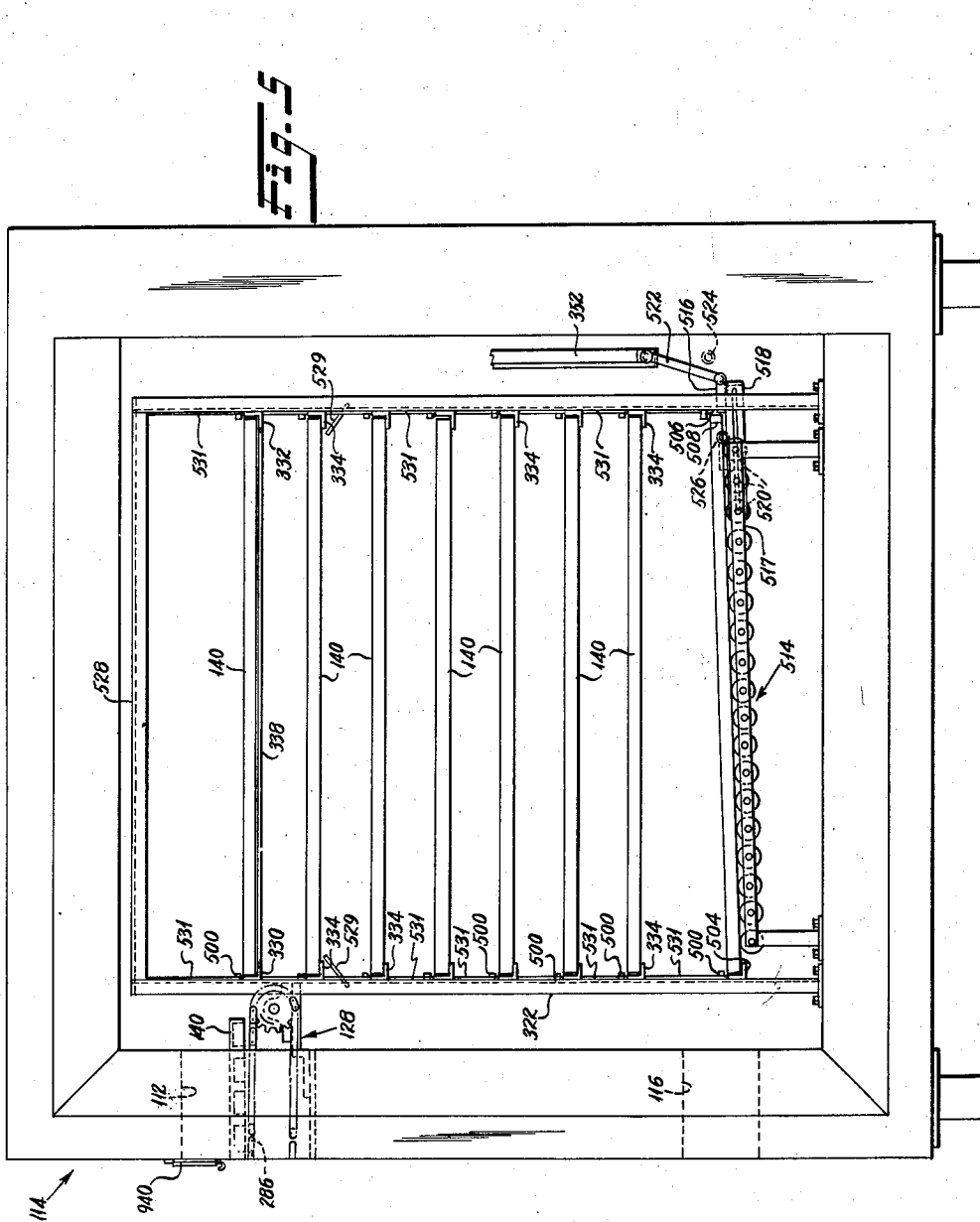

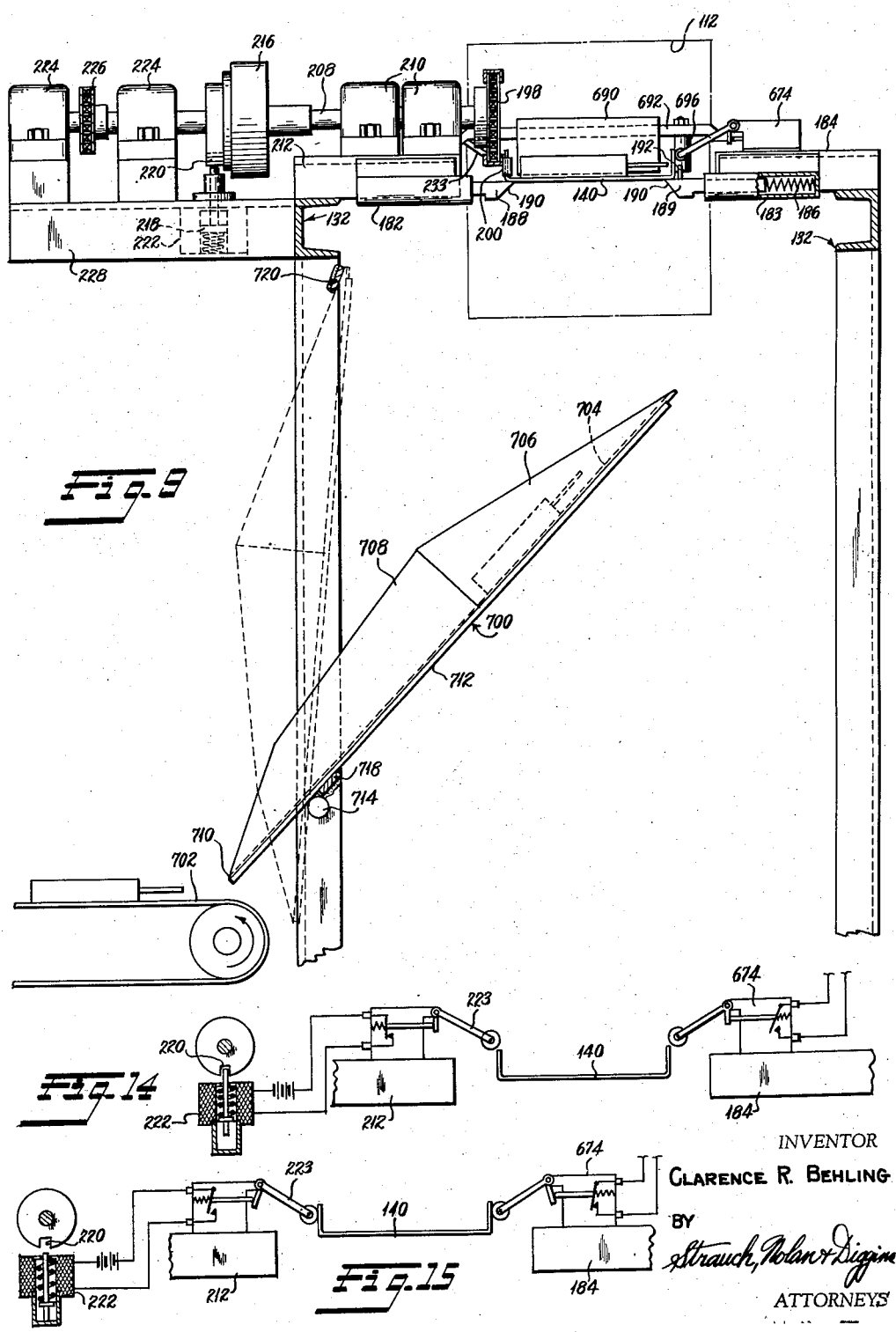

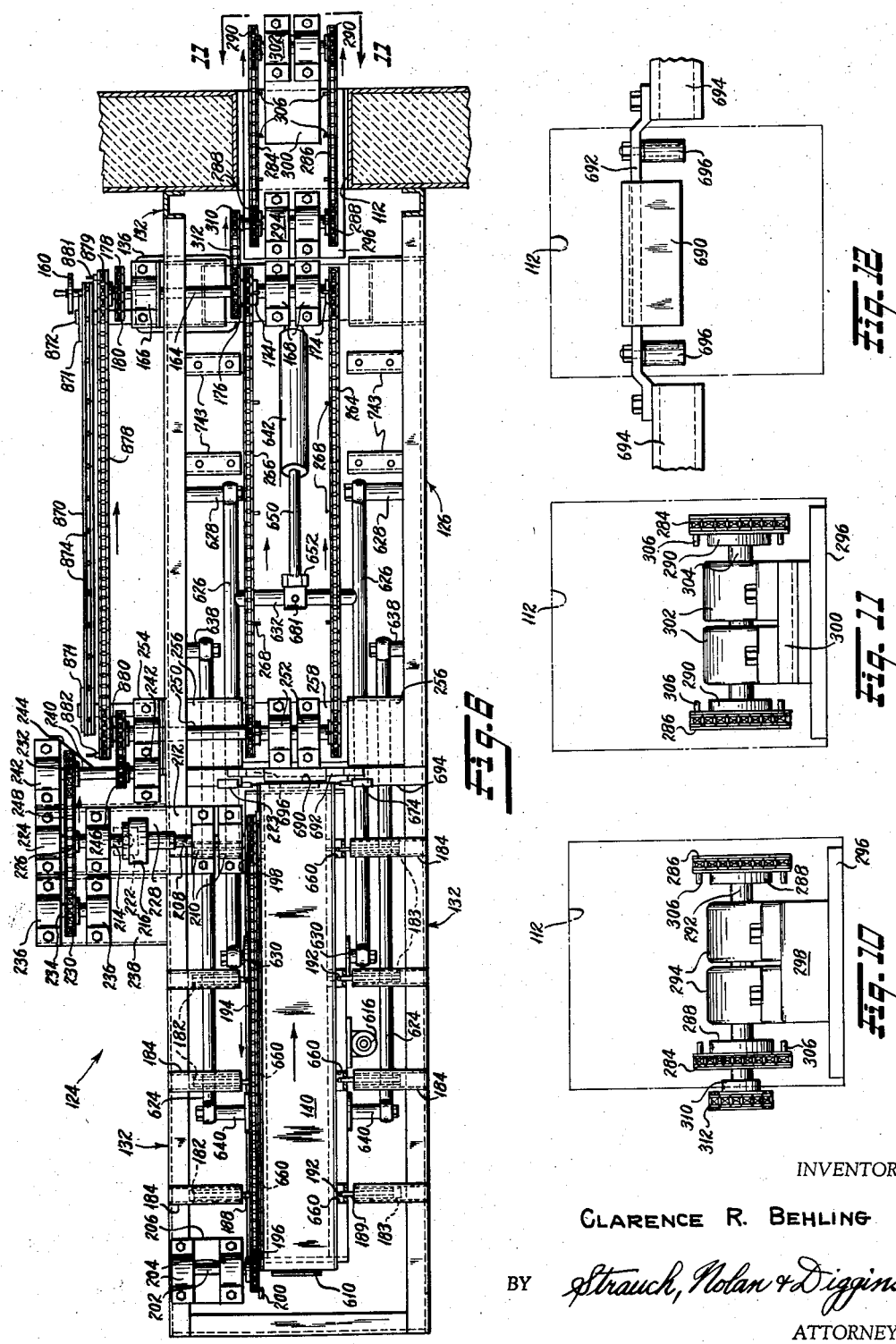

Sept. 15, 1959     C. R. BEHLING     2,903,979
METHOD AND APPARATUS FOR PRODUCT PROCESSING
Filed May 11, 1954     21 Sheets-Sheet 7
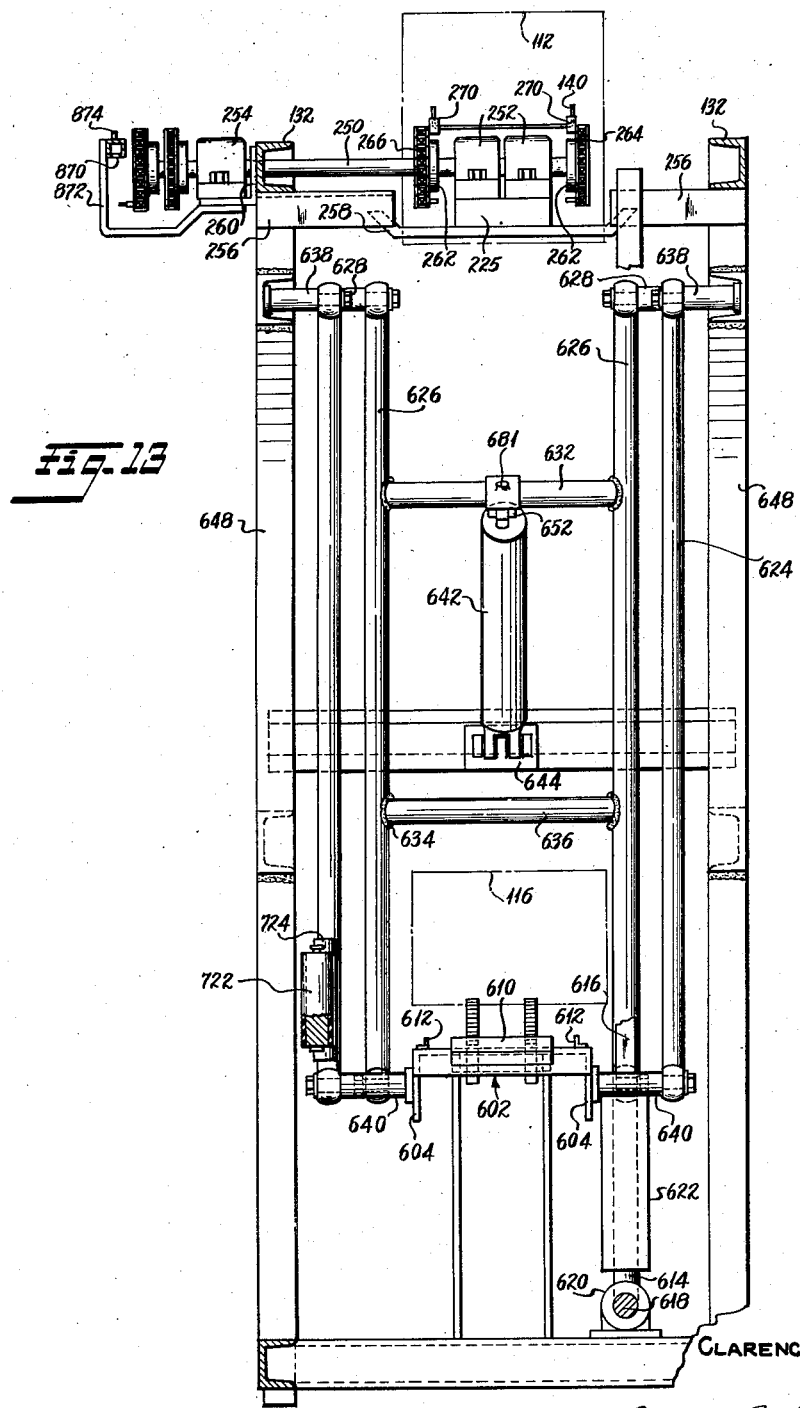
INVENTOR
CLARENCE R. BEHLING
BY
ATTORNEYS

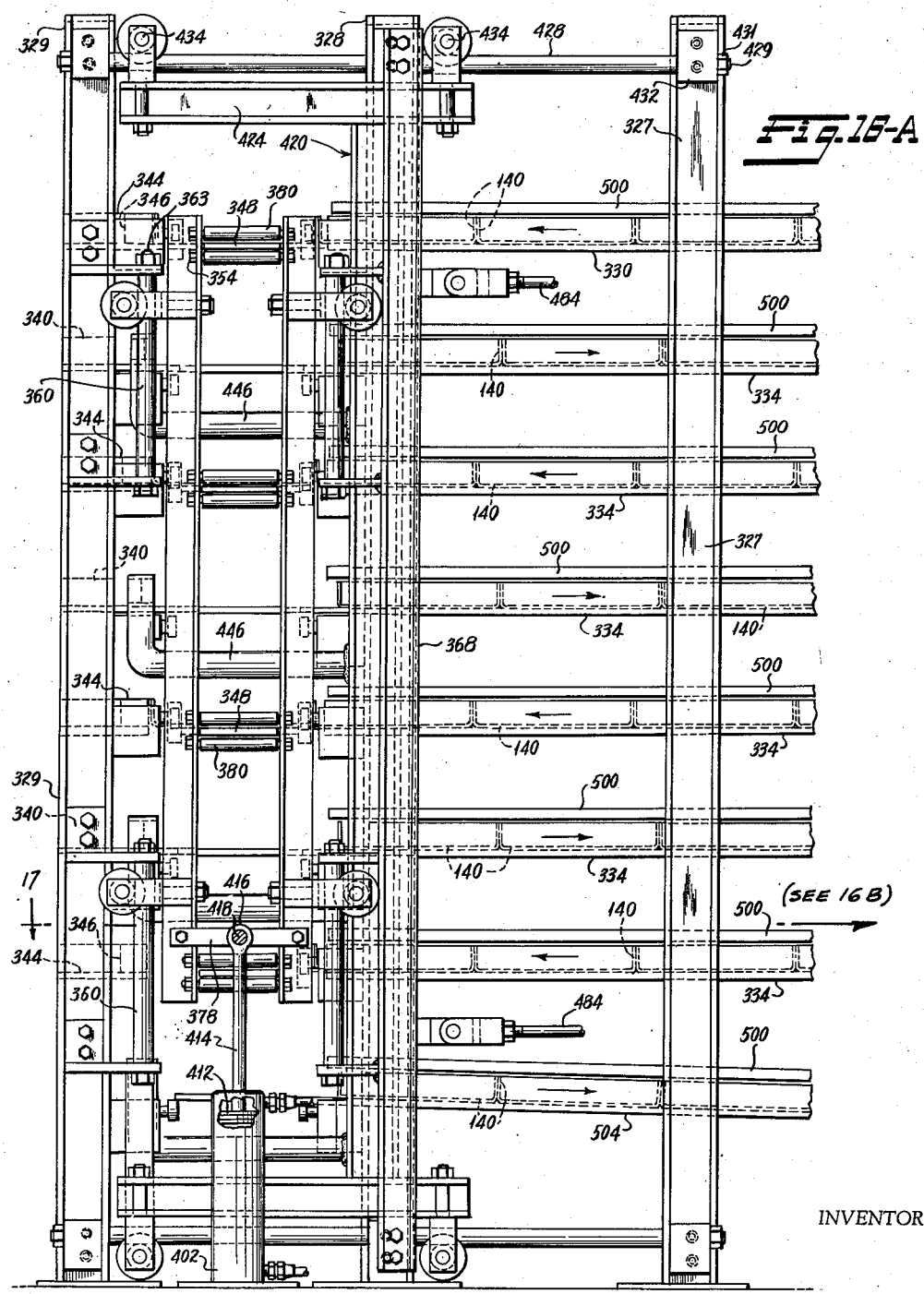

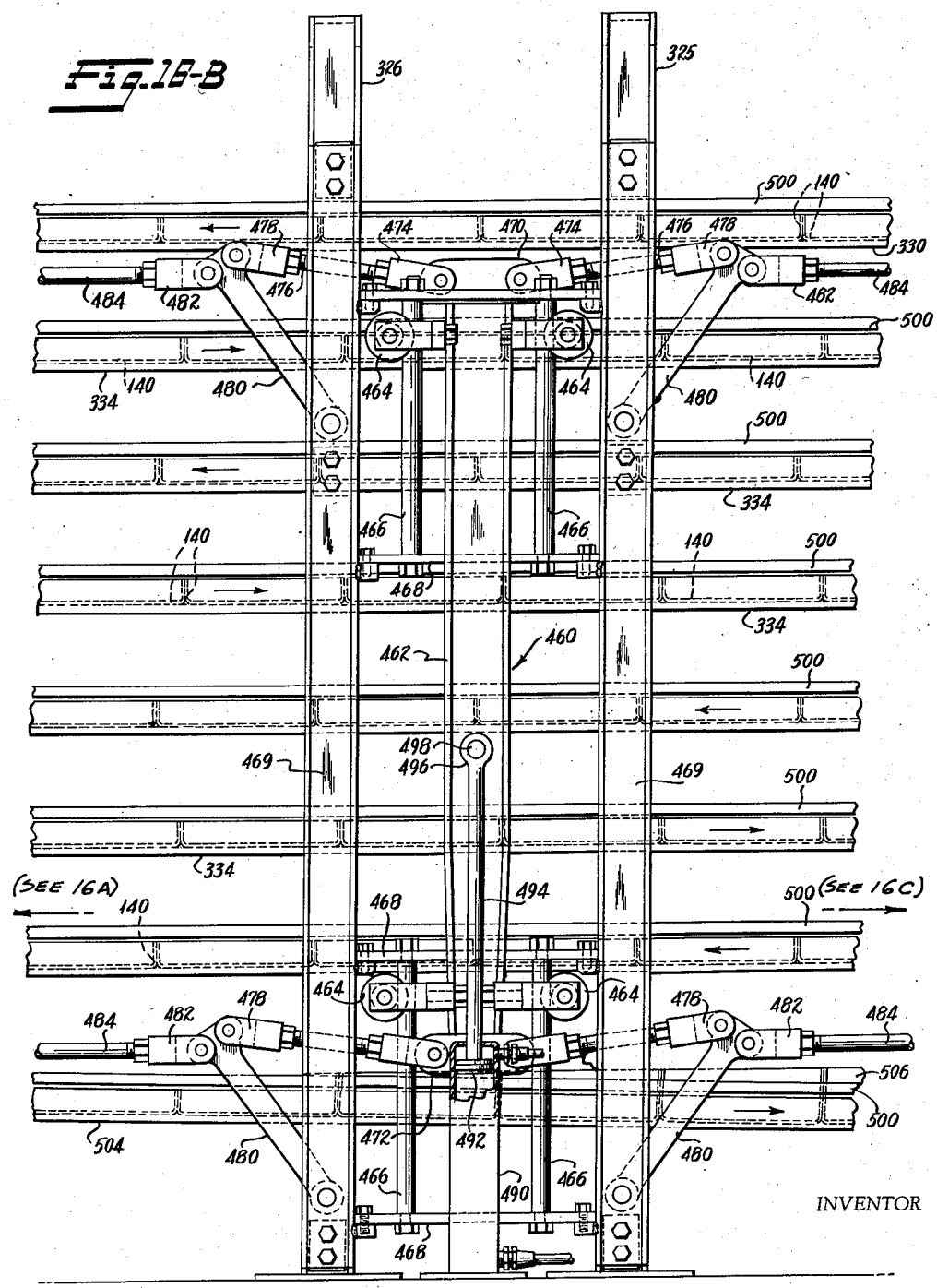

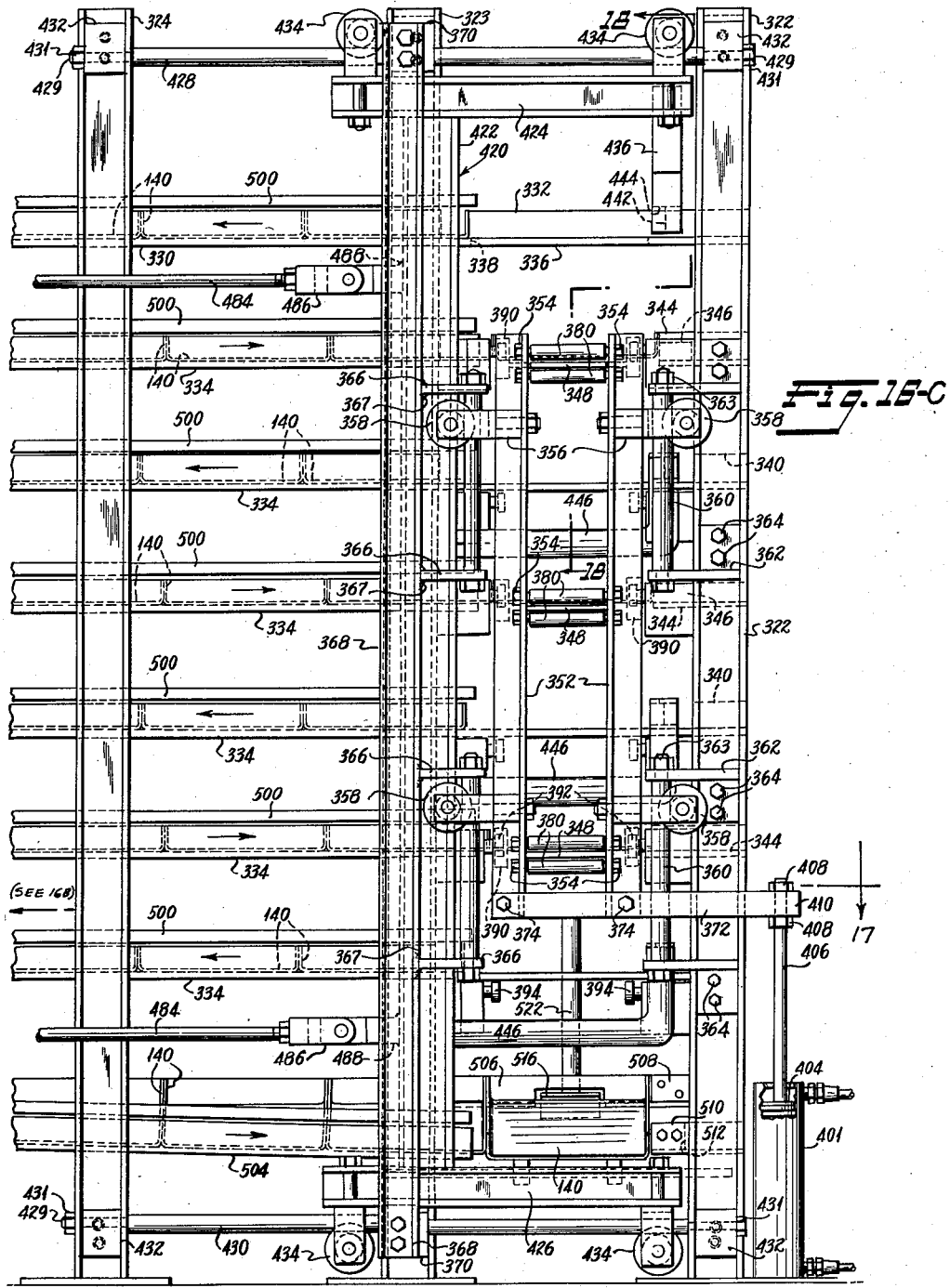

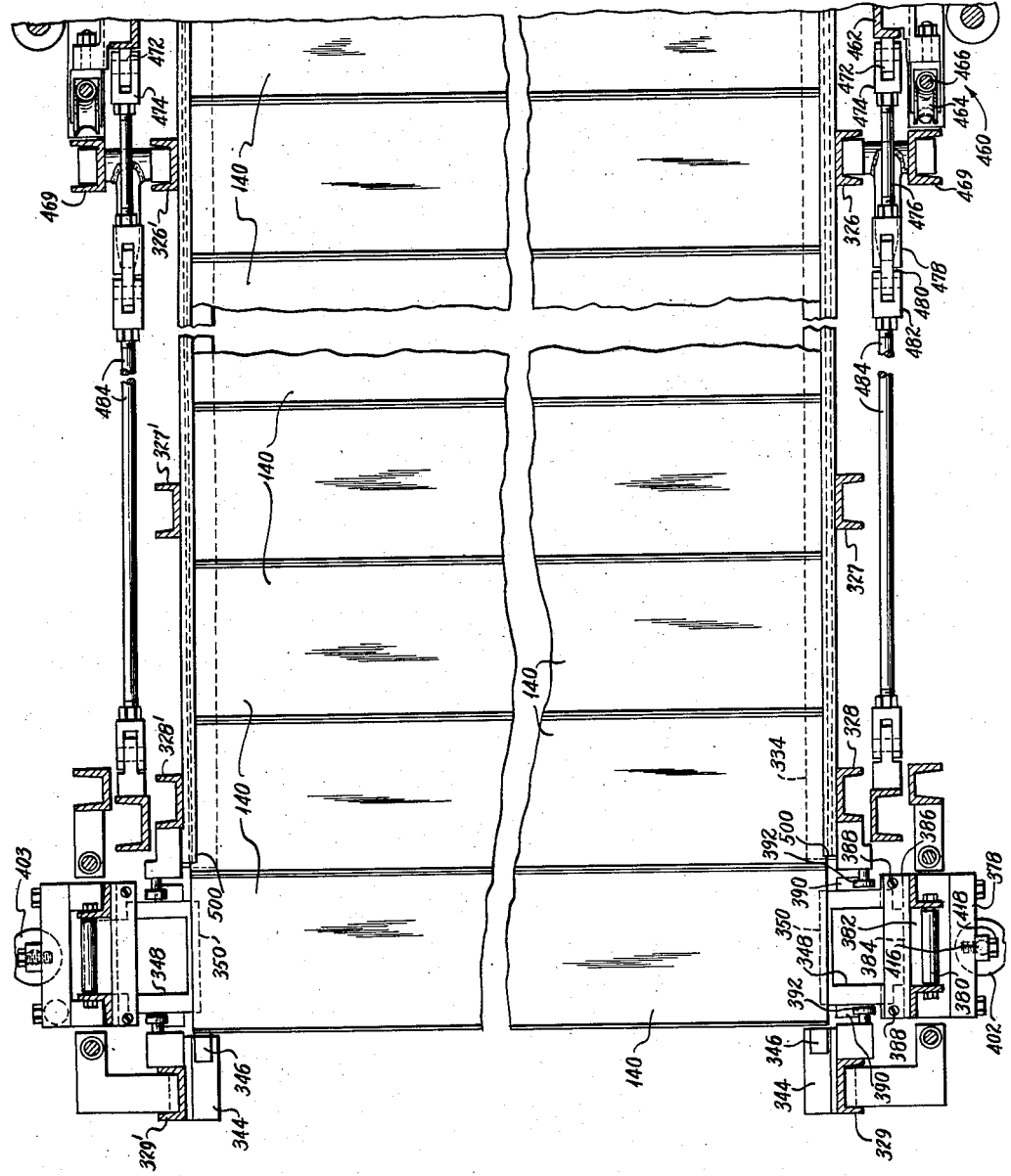

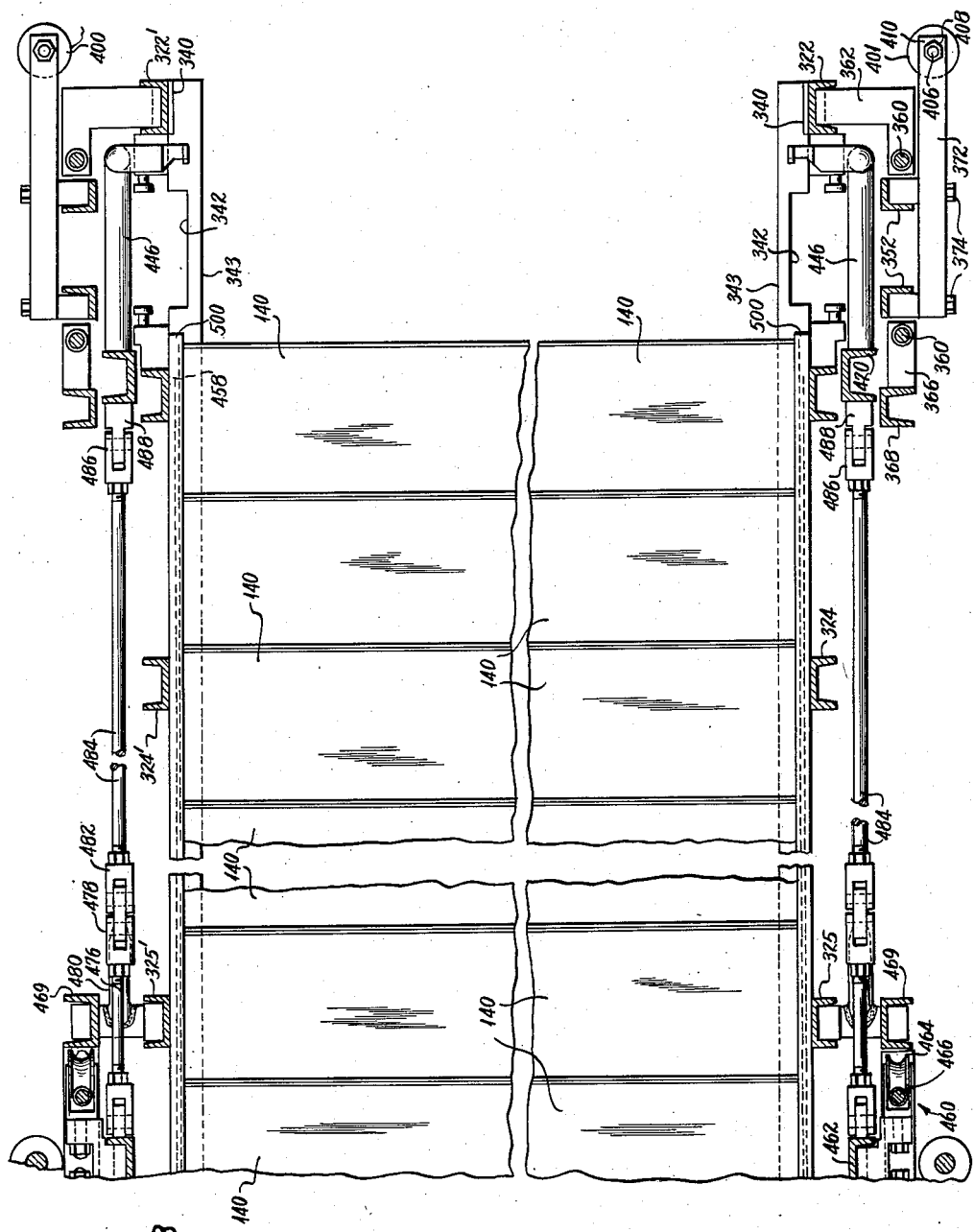

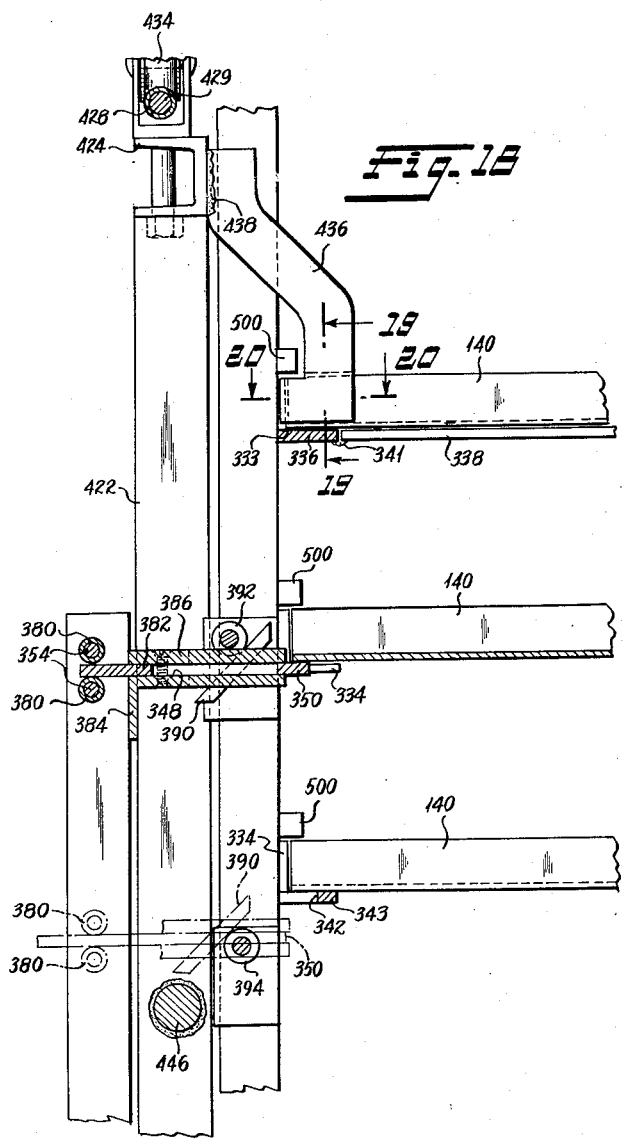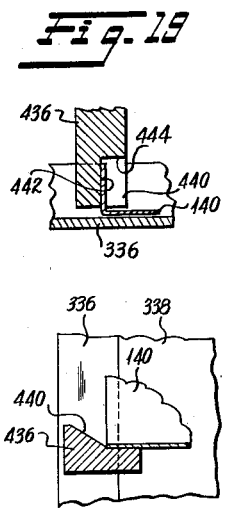

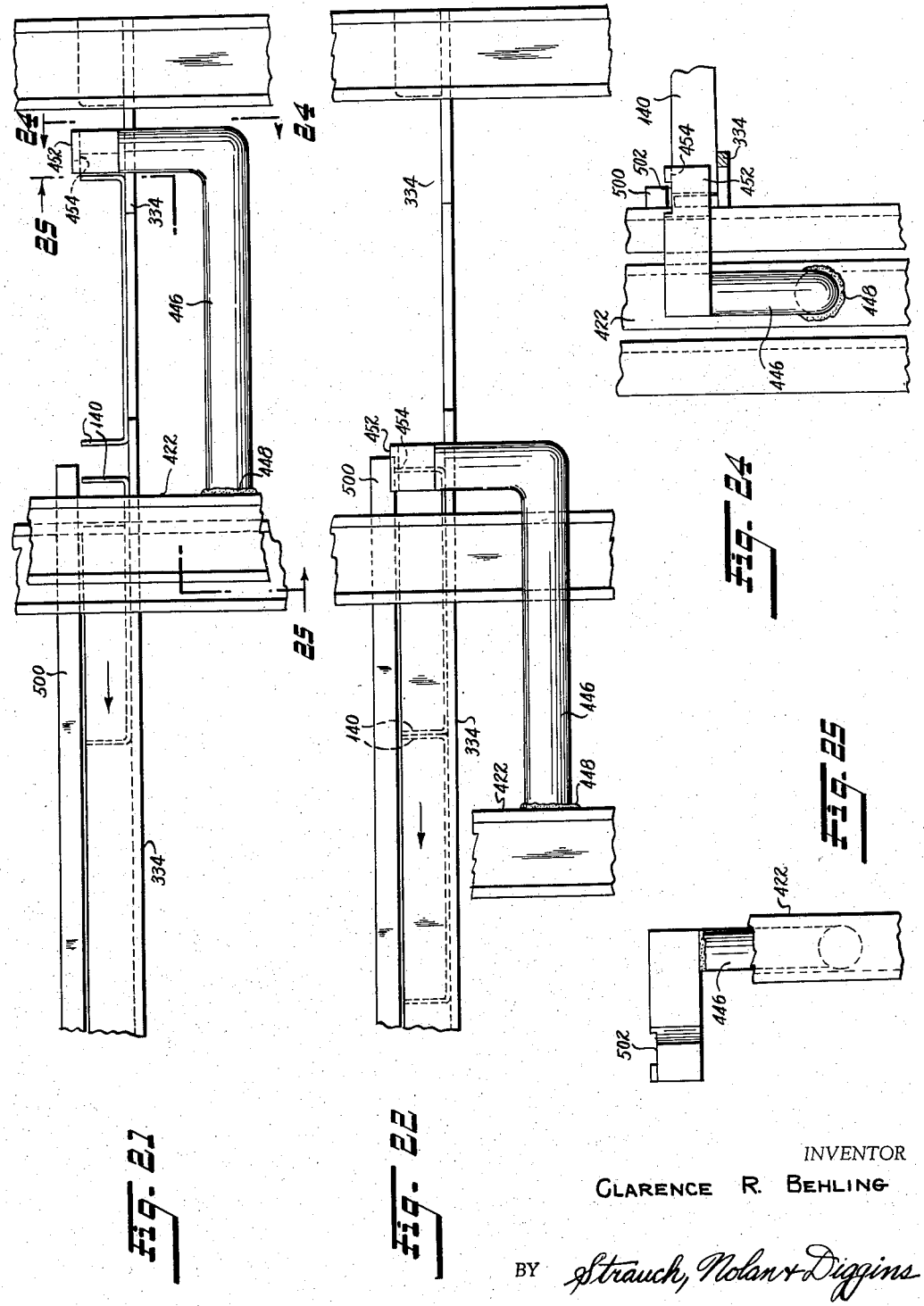

Sept. 15, 1959 C. R. BEHLING 2,903,979
METHOD AND APPARATUS FOR PRODUCT PROCESSING
Filed May 11, 1954 21 Sheets-Sheet 15
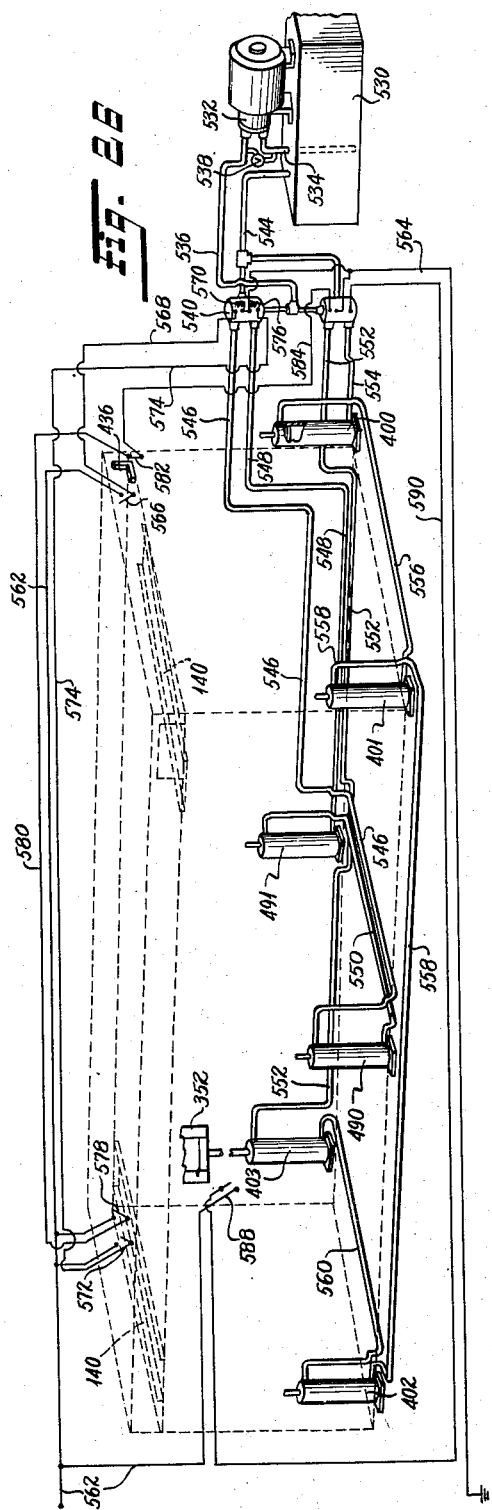
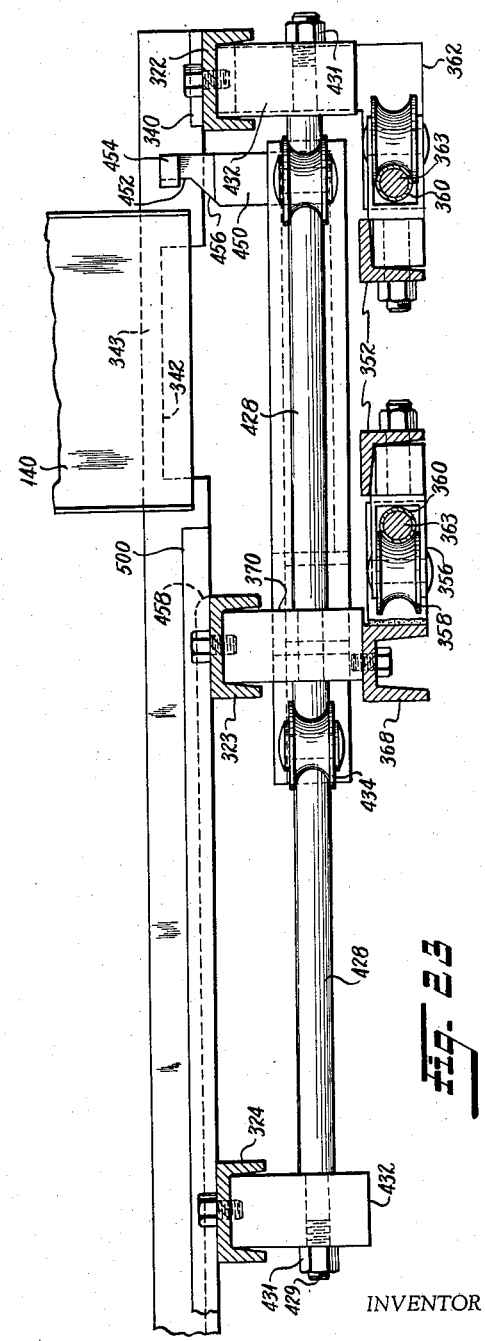
INVENTOR
CLARENCE R. BEHLING
BY Strauch, Nolan & Diggins
ATTORNEYS Sept. 15, 1959　　　　　C. R. BEHLING　　　　　2,903,979
METHOD AND APPARATUS FOR PRODUCT PROCESSING
Filed May 11, 1954　　　　　　　　　　　　　　21 Sheets-Sheet 16
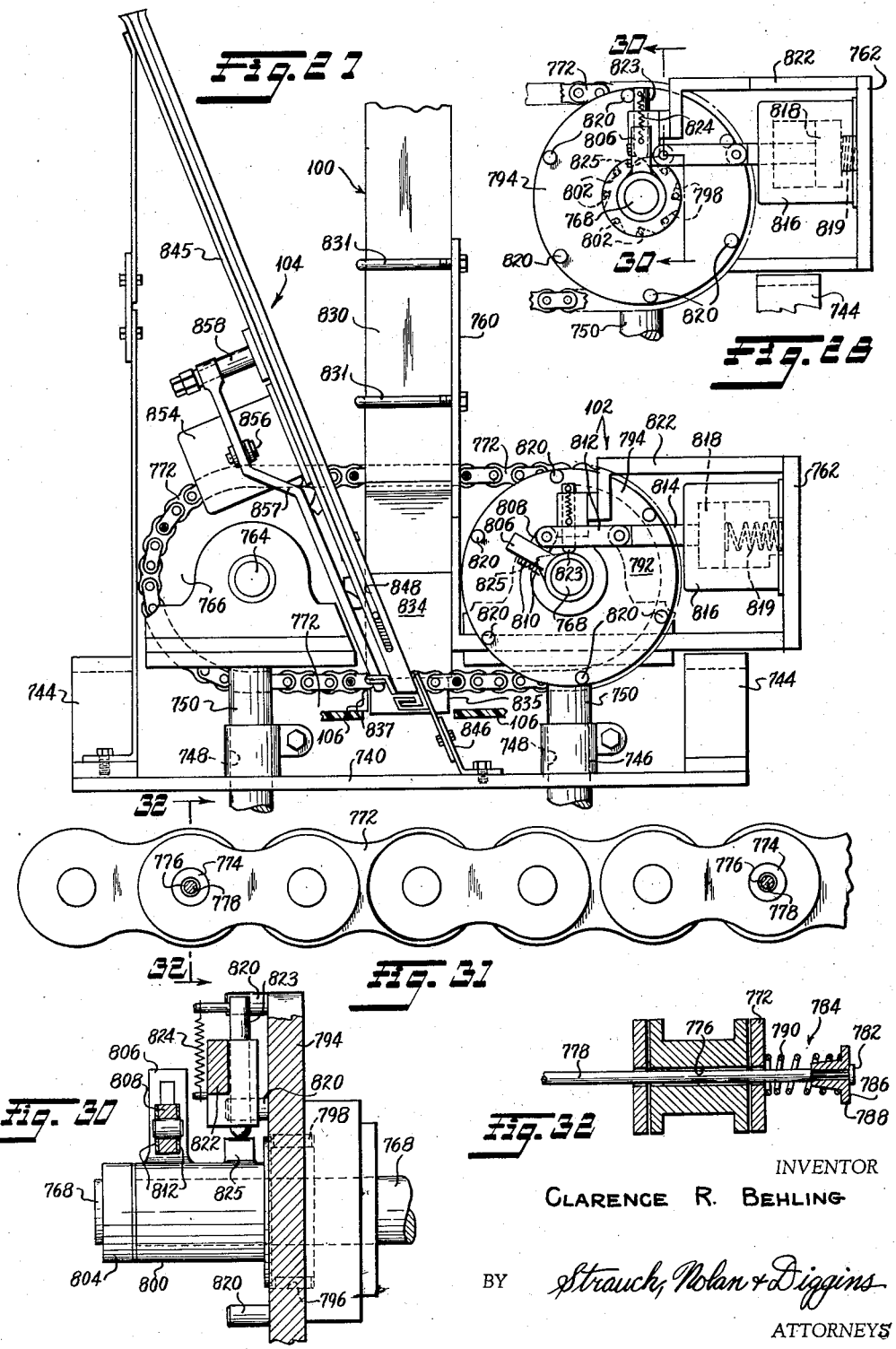
INVENTOR
CLARENCE R. BEHLING
BY Strauch, Nolan & Diggins
ATTORNEYS

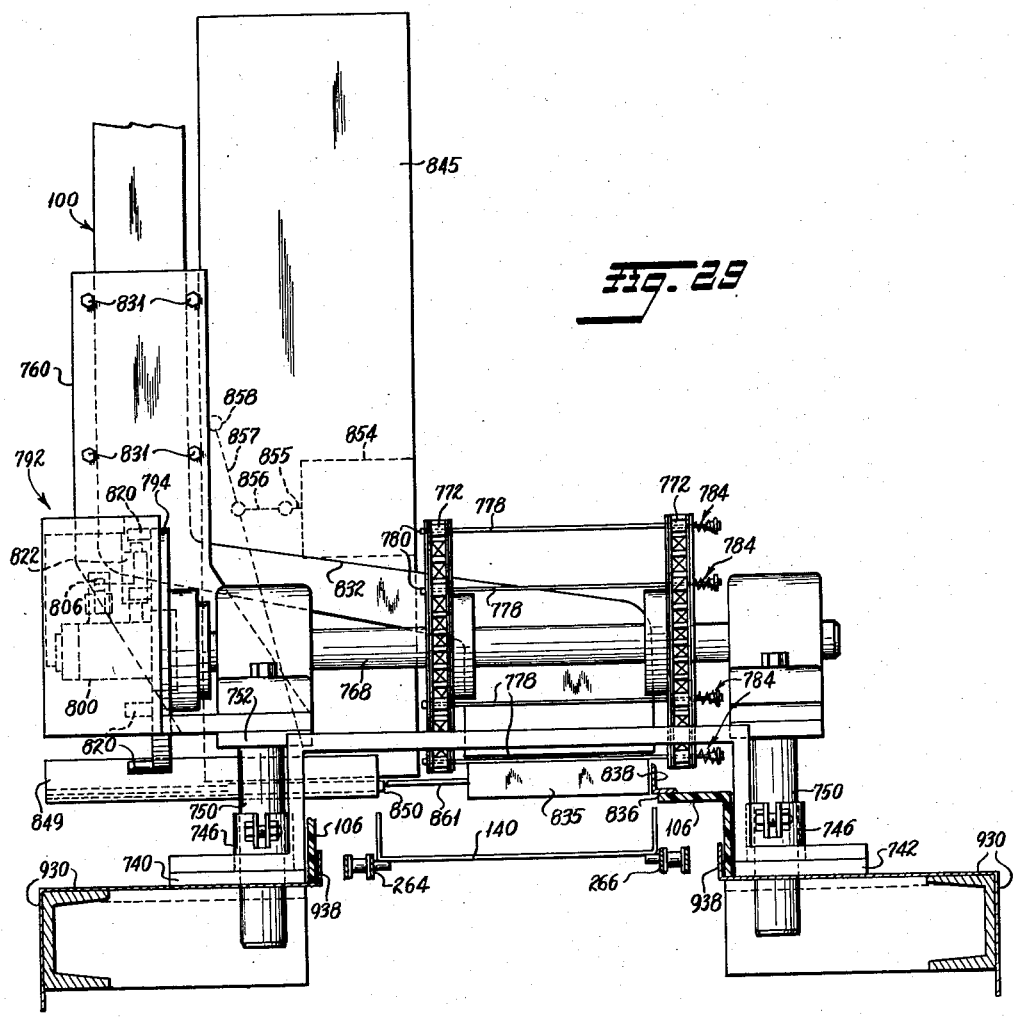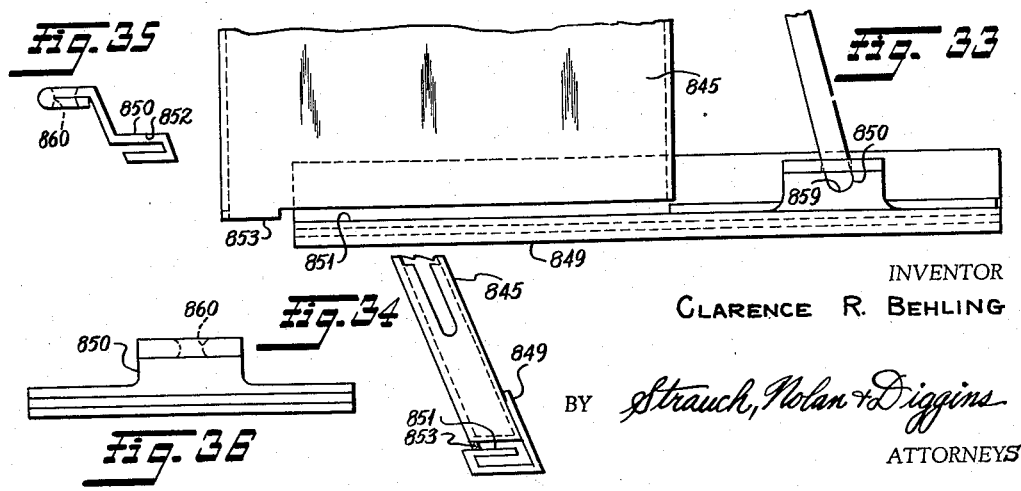

Sept. 15, 1959 C. R. BEHLING 2,903,979
METHOD AND APPARATUS FOR PRODUCT PROCESSING
Filed May 11, 1954 21 Sheets-Sheet 18
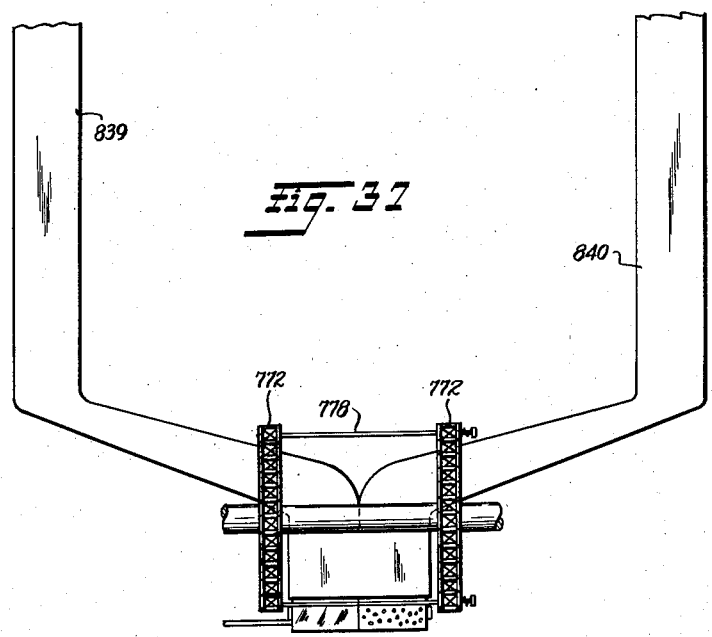
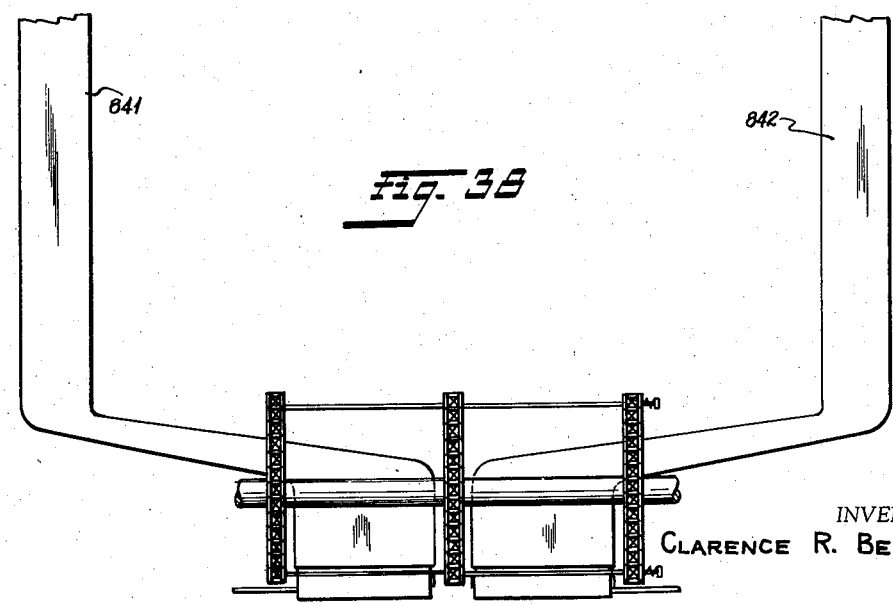
INVENTOR
CLARENCE R. BEHLING
BY *Strauch, Nolan & Diggins*
ATTORNEYS

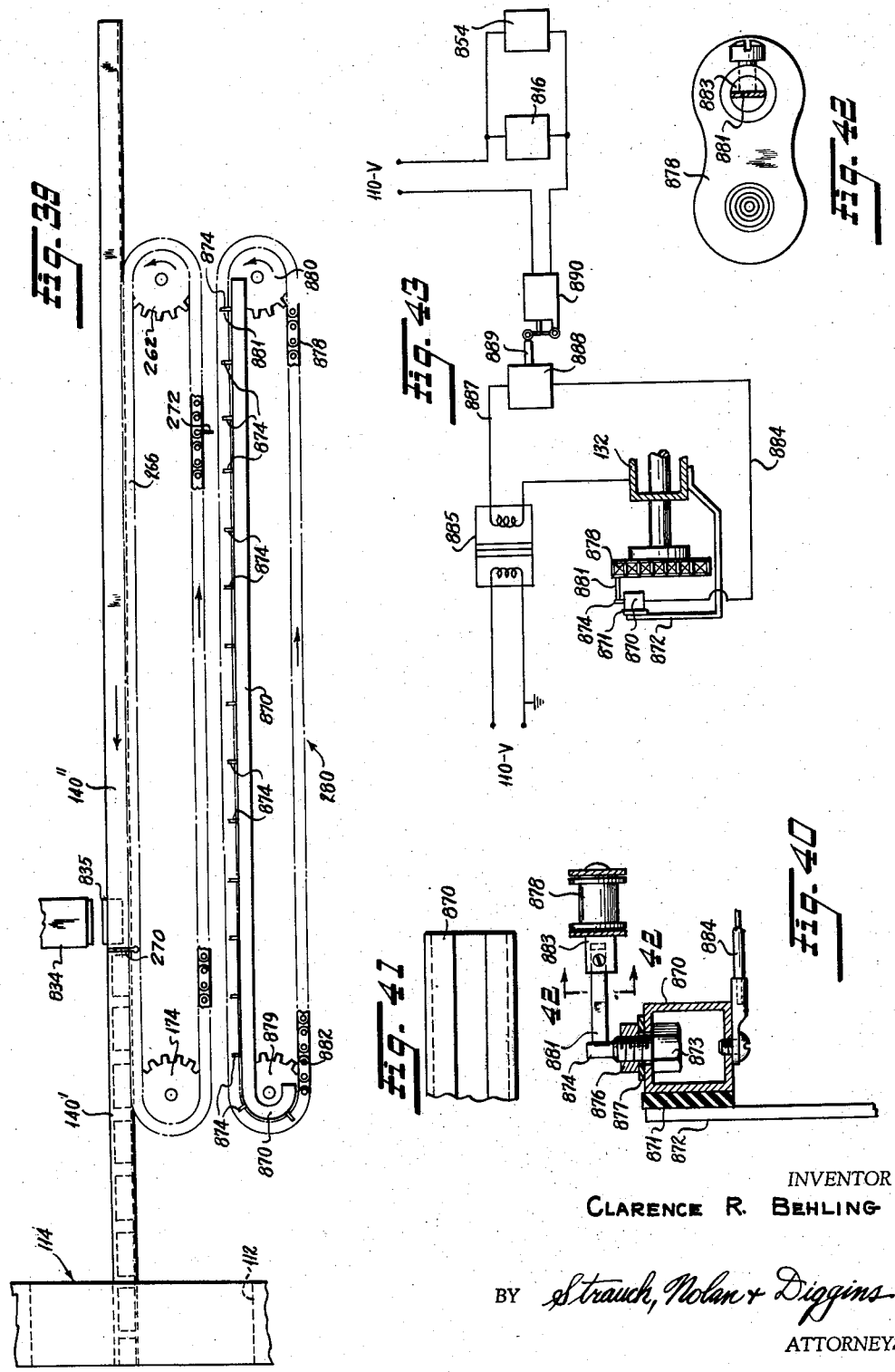

Sept. 15, 1959   C. R. BEHLING   2,903,979
METHOD AND APPARATUS FOR PRODUCT PROCESSING
Filed May 11, 1954   21 Sheets-Sheet 20
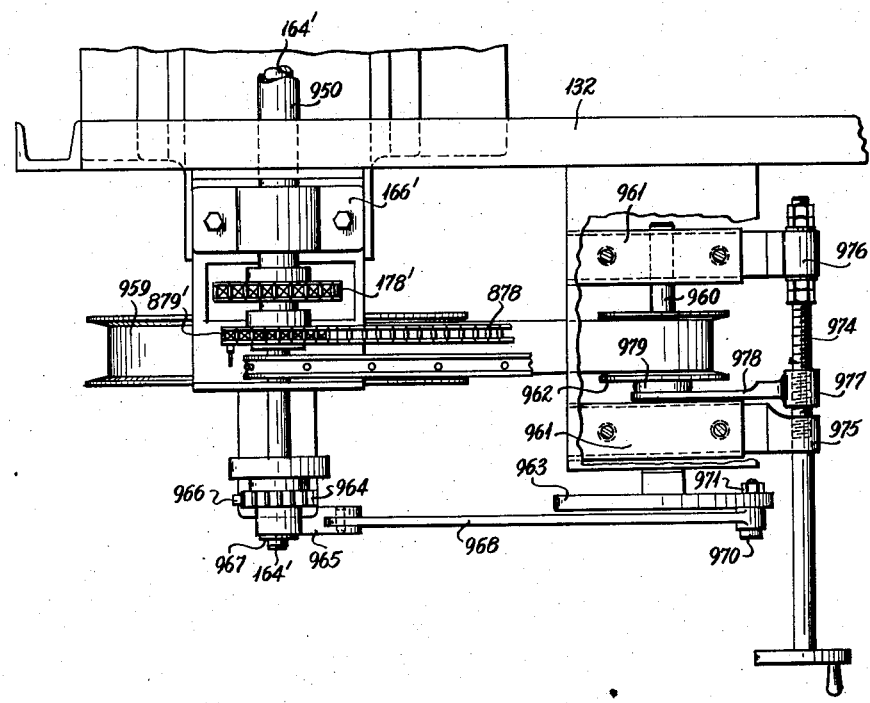
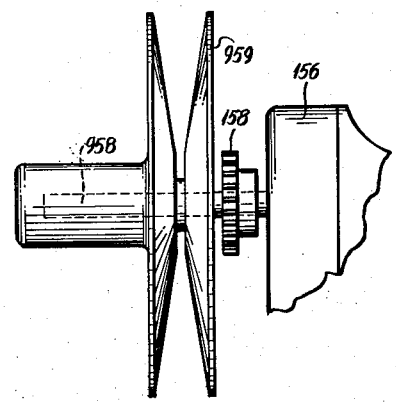
INVENTOR
CLARENCE R. BEHLING
BY *Strauch, Nolan + Diggins*
ATTORNEYS Sept. 15, 1959 C. R. BEHLING 2,903,979
METHOD AND APPARATUS FOR PRODUCT PROCESSING
Filed May 11, 1954 21 Sheets-Sheet 21
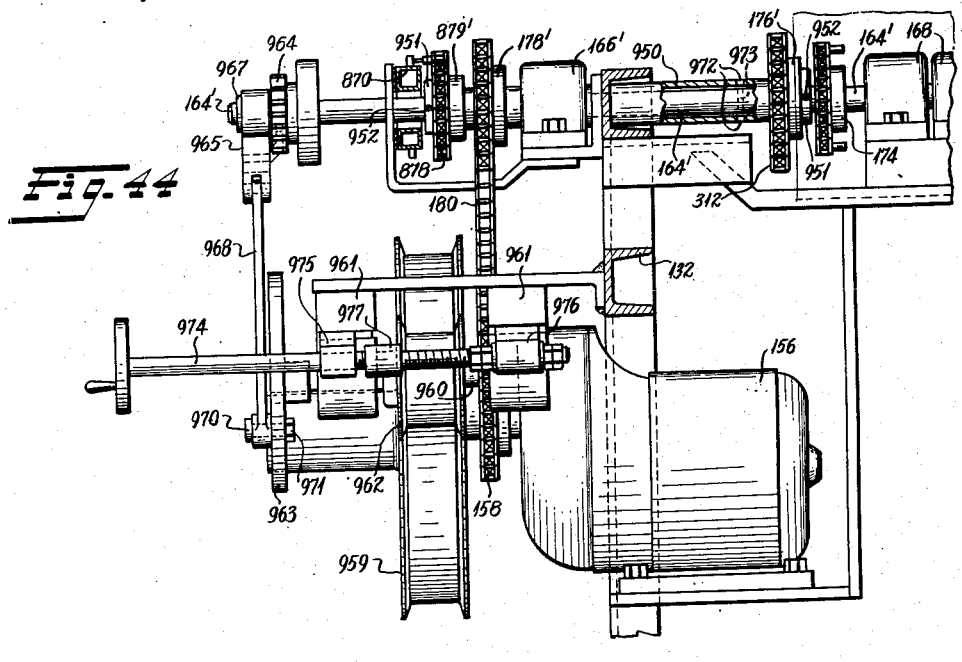
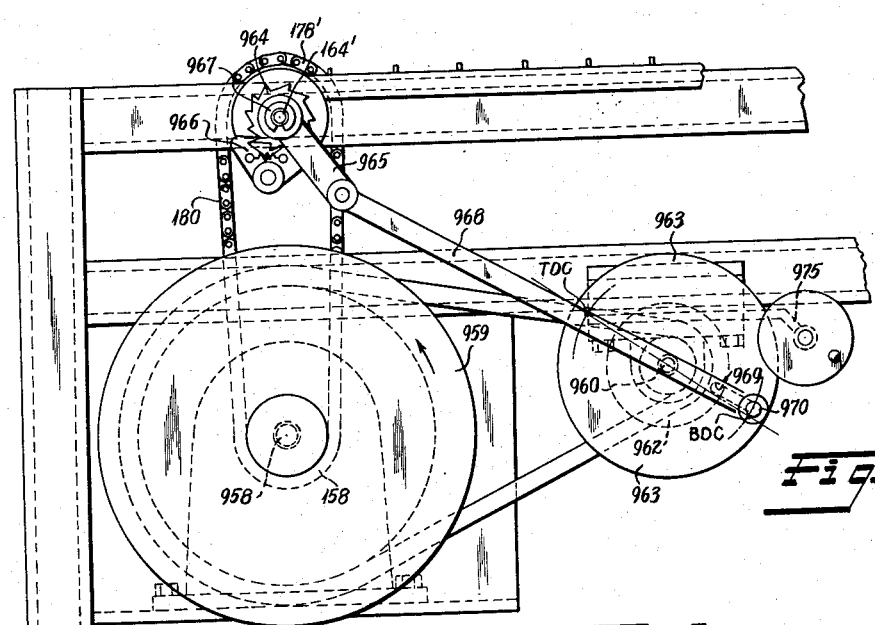
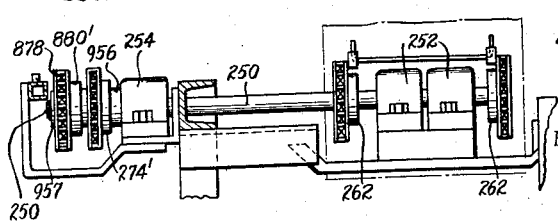
INVENTOR
CLARENCE R. BEHLING
BY *Strauch, Nolan & Diggins*
ATTORNEYS United States Patent Office 2,903,979
Patented Sept. 15, 1959

2,903,979

METHOD AND APPARATUS FOR PRODUCT PROCESSING

Clarence R. Behling, Pasadena, Calif.

Application May 11, 1954, Serial No. 428,960

51 Claims. (Cl. 107—8)

This invention relates to methods and apparatus for making processed products from a mass of unprocessed or semi-processed materials and more particularly relates to methods and apparatus for making frozen confections with or without holding sticks from a mass of semi-frozen or plastic confection mix.

While the methods and apparatus of the present invention are of general application it is contemplated that they will find their primary utility in connection with the processing of frozen confections such as ice cream bars and for purposes of disclosure will be so described and illustrated.

This invention utilizes a wholly enclosed, entirely automatic, continuous cycle free tray system wherein the trays remain substantially horizontal throughout a cycle of travel which includes depositing units of unprocessed or semi-processed material at controlled spaced intervals on an elongated tray carried on a relatively slow moving conveyor, transferring the tray to a higher speed conveyor for insertion into a conditioning unit, shifting the tray horizontally and vertically in a predetermined pattern within the conditioning unit to allow the conditioning process to occur, ejecting the full tray with conditioned products onto an elevator conveyor arranged in vertical alignment with the slow conveyor, conveying the full trays still in a horizontal position to an intermittent acting horizontal conveyor which returns the tray to its starting position and simultaneously removes all conditioned units from the tray to a bin or adjacent conveyor system for delivery to a packaging or further conditioning device.

All known prior art machines, which have appeared on the market for mass producing units of various products including food stuffs and non-edible items processed or conditioned in some manner such as freezing or baking, in the machine, have been subject to deficiencies in operation that constitute serious drawbacks to certain mass production operations. Some machines require a number of manual operations. Many machines, having continuous chains with conveying trays fastened to the chains, must be substantially dismantled for cleaning.

Cleanliness in food processing machines is essential to conform with sanitation regulations and constitutes a major problem in food handling machines. Chain drives require lubrication, which at times works out of the various bearings and becomes deposited on the food unit, and is considered a contaminant. A conveyor system wherein the tracks for the conveyor trays contact a large portion of the trays creates an additional contaminant source, a black deposit resulting from coaction between the trays and tracks which drops from level to level within a conveyor to fall on the food products. This result appears to be magnified when the trays and tracks are formed from aluminum, and is believed to occur from a combination of the rubbing metal to metal contact and electrolysis between the tray and the tracks.

Sanitation statutes require frequent cleaning and sterilization of trays necessitating a considerable amount of unproductive labor. Conveyors utilizing long lengths of chains, disconnecting linkages, gears, pulleys and a complexity of small parts require time to disassemble and clean, are subject to many mechanical failures and maladjustments and are normally bulky and sprawl over considerable space. Everyone of these deficiencies are multiplied by operation under low temperature conditions.

Known machines, wherein products are passed into and out of a conditioning device, encompass a free tray continuous cycle, chain type conveyor for use in conjunction with hand loading and unloading operations, a continuous cycle chain conveyor having foldable tray units carried by the chains cooperating with a chute loading device, a free tray conveyor of the continuous cycle, chainless type, and a fixed tray chain conveyor within a freezing cabinet. Each of these known types of prior art machines encounter one or more problems involving non-continuous operation cleaning, sanitation, freezing and frosting with resulting breakdown and stoppage of equipment, inefficient utilization of working space and other factors that will become apparent, contribute to ineffective mass production and add an increment to the resultant cost of the processed item.

As far as is known Patent No. 2,538,734 discloses the closest approach to solving many of the inherent problems in a continuous cycle product processing machine. However it has several features that would pose problems. For example, the trays are not kept horizontal at all times and therefore are subject to being displaced from the apparatus, causing jams and subsequent shutdowns of the machine. This machine does not have an interrelated control system for depositing units of products at spaced intervals on the trays, rather it utilizes a continuous feed bulk loader. Also note that the chainless magazine tray conveyor within the freezing cabinet utilizes a totally different method of conveying than that disclosed in the present invention, and if the rate of delivery were to be increased the height of the magazine conveyor and dumper would increase to bulky massive proportions.

As before indicated, the specific problems leading to this invention were those encountered in mass production of various frozen products, and as far as is known, the machines used in the prior frozen products art are each deficient in one or more of the aspects before considered. This invention by novel arrangements of structure and novel conveyors encompasses means for overcoming the various known deficiencies existing in prior machines.

Novel features exist in the dual compartments which comprise a refrigerated outer chamber or antechamber enclosing the unit depositing and unloading apparatus and an adjoining subzero freezing cabinet enclosing a chainless tray magazine and conveyor. Within the cabinet, circulation of the freezing medium, in this instance air, over freezing coils is accomplished by fans driven by motors mounted on the exterior of the cabinet. These features, in combination, result in a unit wherein the product trays are never exposed to outside air and are maintained at a low temperature whereby frosting of conveyor trays is kept to a minimum, and the products are always under cover thus maintaining sanitary conditions. By eliminating the chain drives within the sub-zero cabinet, a feature common in the prior art, and by mounting the fan motors on the exterior of the cabinet, no small moving lubricated mechanisms are located within the freezing cabinet, eliminating a main trouble source. Extreme low temperatures solidify the lubrications in the bearings of motors and chain conveyors, resulting in breakdowns of machinery. Drive motors located within a freezing cabinet are subject to moisture and give off heat which increases the refrigerant load. As will become apparent hereinafter, the chainless cabinet tray magazine and conveyor incorporates rugged moving members actuated by hydraulic servo-motors, similar to those that have been time-tested and proven in high-altitude aircraft systems where extreme low temperatures are normal, and have no small moving parts that will be susceptible to freezing and thus breakage.

The refrigerated antechamber, enclosing the remainder of the conveying system in the continuous cycle, remains at a temperature below freezing and at a value where presently used lubricants for small moving parts do not freeze. By maintaining a low temperature in the antechamber and leaving the frozen units on the trays until just prior to depositing unprocessed units on the trays, the trays remain at a sub-zero temperature, approximately that of the freezing cabinet. This is of importance because it has been determined that units of semi-frozen products deposited on trays maintained at or below a certain temperature value will not freeze to the tray, thus the invention eliminates the need of mechanisms to knock or jar the products loose from trays after freezing.

The tray used in the present invention may be made of stainless steel and is formed as an elongated trough or U-shaped channel member having open ends. The trays are thus easy to fabricate, easy to clean and lend themselves to the novel unit unloading feature of the present invention where the processed or conditioned units are held stationary while the tray passes out from under them, or, relatively speaking, the units slide off the open end of the tray into a conveyor chute to be delivered elsewhere as desired.

Throughout the entire automatic cycle the trays rest on conveyor support surfaces and are not attached in any manner to the conveyors. The trays move lengthwise on the conveyors in the antechamber and, while in the chainless cabinet magazine, rest with a small marginal end surface on spaced horizontal tracks and are conveyed sideways and vertically in a predetermined pattern. By providing ample access doors for the antechamber and freezing cabinet the trays may easily be lifted off the various conveyors, thereby providing full access to all parts of the antechamber and full entry into the freezing cabinet, the interior of which is unobstructed because of the spaced horizontal tracks. These features result in ease of cleaning the machine and enable quick removal of trays for required cleaning and sterilization, thus save time normally consumed in maintaining sanitary conditions.

As before-mentioned, a portion of the antechamber conveyor system is provided in vertical alignment with the remainder of that system to enable structural compactness. Structural compactness is also realized in the novel chainless conveyor system which enables nonconnected trays to travel in a reversing horizontal path with a vertical lowering of the trays to the next level at the end of each horizontal travel thereby utilizing a maximum distance of travel, hence a maximum time within the freezer cabinet yet at the same time requiring a minimum of freezer volume. The entire conveyor system is compact and utilizes a minimum amount of space.

To insure positive, accurate depositing of semi-processed units of products on the trays this invention incorporates a novel cutter mechanism cooperating with a semi-frozen or plastic state food extrusion tube located above the slow moving tray conveyor. The cutter mechanism is powered and indexed to rapidly cut a portion of extruded material at intervals determined by the slow moving conveyor hereinafter termed the indexing conveyor. A novel arrangement of the cutter and cutting wires allows the wires to be warmed by room temperature and eliminates the need of heated cutting wires and constitutes a vast improvement over the complex mechanisms of prior art.

If desired, a stick may be rapidly inserted automatically and simultaneously with the cutter operation, by an improved simplified stick inserting mechanism and control system, electrically interconnected with the indexing mechanism to thereby eliminate many of the cams, rollers and other complex linkages heretofore used.

To operate the machine, a novel inter-related control system is utilized whereby the time rate of one complete cycle is controlled by merely changing the speed of one variable speed motor. The motor powers the intermittent conveyor, the indexing conveyor, and the accelerating conveyor, all of which are chain type conveyors. The freezing cabinet chainless magazine conveyor consists of plural levels of horizontal tracks with provisions at opposite ends of alternate levels, except the lowermost level, for lowering one tray to the next lower level. Movement within the cabinet consists of two hydraulically powered phases or steps, a horizontal shift of all trays and a vertical lowering of alternate end trays of all levels except the lowermost wherein the end tray is ejected on to the vertical conveyor or elevator which is also hydraulically operated.

The system rate is controlled by the speed of the chain conveyors. The indexing chain conveyor moves the tray below the cutting and depositing mechanism where the extruded products are cut into desired portions and deposited in predetermined spacings along the length of the tray as determined by a cutter indexing device cooperating with the indexing conveyor. The intermittent chain conveyor, meanwhile moves another tray onto the indexing conveyor behind the tray being filled. As the last cut portion is deposited on the tray, the tray engages the accelerating conveyor which inserts the tray lengthwise into the freezing cabinet at one end of the upper level of horizontal tracks. As the tray slides into position on the track it engages a limit-switch to initiate the horizontal shift of all trays within the cabinet. By proper limit switch interconnection the alternate end trays are lowered one level and the bottom end tray is ejected onto the elevator conveyor where, by further limit switch cooperation, the elevator raises the tray through a novel system of snap latches to the intermittent chain conveyor. By still further limit switch action the elevator lowers into position for receiving the next ejected tray from the freezer cabinet while the intermittent conveyor starts the tray toward the indexing conveyor simultaneously passing the tray under the previously mentioned unloader completing a wholly automatic continuous cycle. By merely increasing or decreasing the chain conveyor drive speed the rate of the entire cycle of the automatic system is increased or decreased.

As will be apparent hereinafter, the rate of operation of the chainless magazine tray conveyor required to receive a tray of unconditioned units and eject a tray of conditioned units will be a constant value determined by the time required for the hydraulic mechanism to perform the shifting operations. This rate is sufficient to correlate with maximum input of unconditioned products to the machine.

It will thus be realized that this invention, by its novel structure and control mechanism, has overcome many problems associated with mass producing frozen products. As is pointed out, this machine by eliminating lengthy chains and sources of freezing in conveyor mechanisms, decreases possibility of potential breakdowns; by its simple free tray mechanism, sanitation problems are alleviated; by its compact arrangement space problems are overcome; and by the novel control system, long lengths of movable mechanisms are eliminated and a positive, dependable relatively simple complete cycle control is obtained.

With these and other considerations in view, it is an important object of this invention to provide a novel reliable compact continuous cycle multi-conveyor free tray product conditioning machine.

Another object is to provide a novel fully automatic, free tray, product depositing, conditioning and unloading machine of the continuous cycle type.

A further object resides in providing in a novel, fully automatic, continuous cycle, product conditioning machines a novel means for depositing semi-conditioned product units on conveyor units in accordance with predetermined conveyor indexing signals.

A still further object is to provide a novel system of inter-related conveyors cooperating to result in an automatic continuous cycle free tray conveyor.

Another object resides in the provision of novel electrical, hydraulic, mechanical controls cooperating with free tray conveyors to produce a novel continuous cycle conveyor machine.

Still another object is the provision of a conveying system wherein units of products are deposited at spaced intervals on a tray carried by a conveyor in direct relation to the speed of the conveyor and wherein the spacing between each unit on a tray may be varied individually.

A further important object resides in the provision of three aligned conveyors including a conveyor to unload trays and feed empty trays to a loading conveyor where the trays are loaded with units of products in accordance with a predetermined pattern of spacing related to the speed of the loading conveyor and an accelerated speed conveyor for removing a loaded tray from the loading conveyor and creating a gap between successive trays in accordance with subsequent conveyor requirements.

A still further object resides in the novel provision of an upper level track and chain horizontal conveyor co-operating with a lower level vertical conveyor so that the lower level conveyor can raise a tray to the upper level and deposit it on the upper level conveyor.

A still further object resides in the novel automatic control system whereby a lower level conveyor can raise a horizontal tray to an upper level and deposit it on a horizontal conveyor to initiate operation of the horizontal conveyor and return the lower level conveyor to its lower position, each time a tray is placed on the lower level conveyor.

Another object resides in a novel conveyor and conditioning apparatus for depositing units of semi-solid food product on trays, conveying them individually to a conditioning cabinet and retaining them in the conditioning cabinet a requisite amount of time by shifting all trays horizontally, shifting some trays vertically and ejecting a tray of conditioned units each time a tray is received and by the novel shifting pattern to utilize a minimum volume conditioning cabinet for a substantially high output rate of conditioned products.

A still further object resides in the provision of a novel chainless free tray magazine conveyor for use in a conditioning enclosure.

Still another object resides in the novel arrangement of a chainless free tray magazine conveyor within a conditioning enclosure to assure maximum use of the enclosure volume and maximum efficiency in circulation of a conditioned medium past the trays in the magazine.

A still further object resides in a novel vertical shifting conveyor for free horizontally disposed trays.

A still further object resides in a vertical shifting conveyor, for free horizontally disposed trays, combined with an automatic control system actuated by a tray to lockout operation of the conveyor or raise the conveyor to an upper level position and actuated by the conveyor upon reaching the upper level to lower the conveyor to its original position.

Another object resides in the provision of a novel continuous cycle free tray product conditioning apparatus for conveying a loaded horizontal tray to a conditioning cabinet at one elevation, receiving a conditioned loaded horizontal tray from the cabinet at another elevation and vertically transferring the tray in a horizontal position to the original elevation.

Another important object resides in a novel extruded plastic state product cutter having a plurality of cutting elements intermittently rapidly actuated in one direction and arranged so successive elements will cut an individual unit from the extruded product for each intermittent actuation.

A still further object resides in the provision of a novel indexing distributor mechanism directly related to the speed of a conveyor to control a cutting mechanism and a stick inserting mechanism coacting with a semi-solid product extruding tube to simultaneously insert a stick into and cut off a unit of semi-solid product which is deposited on the conveyor in accordance with signals originated by the distributor mechanism.

A still further object resides in a novel mechanism wherein channel shaped trays are conveyed past a depending finger unloading member that fits within the tray, coacts with and retards movement of products carried by the tray and permits the tray to continue from under the products whereupon the products fall through the conveyor to a chute below the conveyor.

A still further object resides in a novel conveyor machine for free trays where a vertical conveyor raises a tray in a horizontal position between horizontal tracks of a horizontal conveyor having latch means cooperating with the tray to retain the tray upon downward movement of the vertical conveyor.

A further object lies in a novel provision of an improved stick inserting mechanism having a magazine to contain sticks and a solenoid actuated rapidly shifting stick inserting plunger coacting with the magazine, together with a product cutting and extruding device.

A still further object resides in the provision of novel means for maintaining a semi-conditioned enclosure surrounding a product unit depositing, conveying and unloading system abutting a product conditioning enclosure.

A still further object resides in an improved conditioning enclosure for use with a continuous cycle, automatic, free tray product producing, conditioning and unloading apparatus.

A still further important object is the provision in an indexing distributor system of a distributor bar having a plurality of individual control elements each adjustably fastened on said bar to be positioned in any desired successive space relationship with one another.

A still further object resides in the novel combination of an indexing distributor system with a tray conveyor where a tray is to be conveyed at any constant rate past a depositing mechanism and the conveyor is connected to move a control member in direct relationship to the rate and position of the moving tray, with the control member arranged to engage successively a plurality of individually adjustable control elements arranged on a distributor member connected in parallel to control the depositing mechanism whereby the entire system can be converted to deposit various size units spaced apart any desired distance on the trays by merely readjusting the spacing of the control elements on the distributor bar.

A still further important object resides in the novel process of maintaining trays at or below —30° F. up to the time a unit of semi-solid ice-cream mix is deposited thereon, including the provision of retaining the frozen ice cream units in the tray until just prior to refilling the tray and maintaining a subfreezing temperature surrounding the tray during its period out of the freezing cabinet, to prevent a deposited unit from freezing to the tray and thus eliminating a step in the unloading requiring jarring the frozen products loose from a tray.

Further objects and advantages of the invention will be apparent from the following description in conjunction with the accompanying drawings wherein the preferred embodiment is set forth in detail and from the appended claims which are to be accorded a range of equivalents consistent with the state of the prior art.

The preferred embodiment of the invention herein disclosed is illustrated in the following drawings in which:

Figure 4 is a right side elevation of the three chain conveyors, elevator conveyor, the depositing mechanism and the unloading mechanism with the antechamber covers removed.

Figure 5 is a right hand elevation of the sub-zero freezer cabinet with the access door removed and forms a continuation from the right side of Figure 4.

Figure 6 is a top plan view of the chain conveyors and elevator mechanism shown in Figures 4 and 5 with the antechamber cover and depositing mechanism removed, and with the elevator in a raised position.

Figure 7 is a perspective view of a typical product tray.

Figure 8 is an enlarged vertical section taken on lines 8—8 of Figure 4 showing the variable speed drive and main conveyor drive shaft.

Figure 9 is an enlarged vertical section taken on lines 9—9 of Figure 4 showing the tilting chute and a section through the intermittent conveyor.

Figure 1:
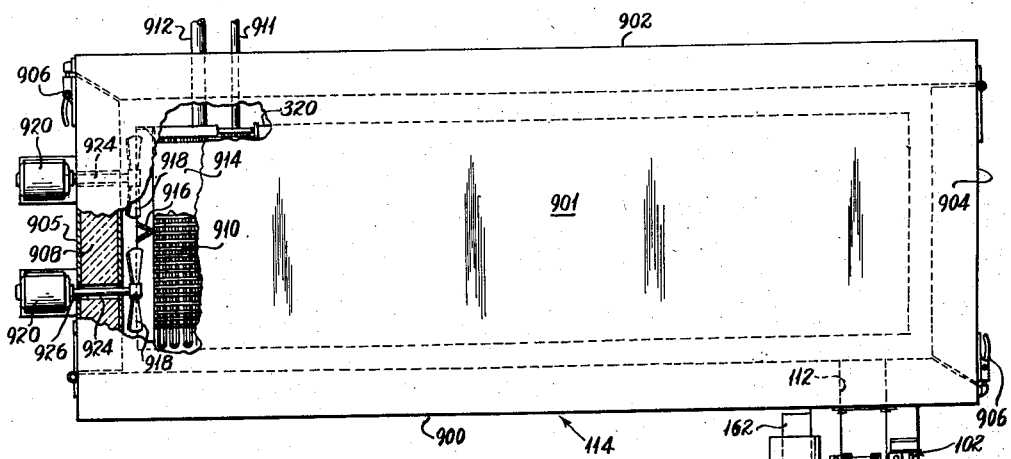
Figure 1 is a partially broken top plan view of the entire machine.

Figures 10 and 11 are enlarged vertical sections taken on lines 10—10 and 11—11 respectively of Figures 4 and 6 respectively, showing various details of the accelerating conveyor.

Figure 12 is an enlarged detail elevation view of the tray unloading bar.

Figure 13 is an enlarged vertical section taken on line 13—13 of Figure 4 showing details of the indexing conveyor system.

Figure 14 is a schematic view of the wiring circuit for the intermittent conveyor slip clutch solenoid in the inoperative condition.

Figure 15 is a view similar to Figure 14 showing the circuit in the tray operated condition.

Figures 16A, 16B and 16C are enlarged front elevation views of the left hand, center and right hand portions respectively of the chainless magazine conveyors and when placed together illustrate the complete front elevation.

Figures 17A and 17B are enlarged left and right hand portions respectively of a view taken on line 17—17 of Figures 16A, B and C at the 7th level of the trays.

Figure 18 is a detail section view of the tray lowering mechanism taken on line 18—18 of Figure 16C.

Figures 19 and 20 are section details of the upper level tray pusher bar taken on lines 19—19 and 20—20 respectively, of Figure 18.

Figures 21 and 22 are detail elevation views showing the two limit positions of the tray pusher bars.

Figure 23 is a detail plan view of the horizontal and vertical acting carriages.

Figures 24 and 25 are detail views of the lower level tray pusher bars looking from opposite sides as indicated by lines 24—24 and 25—25 of Figure 21.

Figure 26 is a schematic view of the electrical and hydraulic control systems for the chainless magazine conveyor.

Figure 27 is an enlarged side view of the extruding tube, cutting mechanism and stick inserter.

Figure 28 is a detail view of the cutting chain drive in actuated condition.

Figure 29 is a rear view of Figure 27 showing the top portion of the antechamber in section.

Figure 30 is a sectional view of the cutting chain drive mechanism taken on lines 30—30 of Figure 28.

Figure 31 is an enlarged side view of a section of the cutter mechanism chain.

Figure 32 is a section view of the cutting wire tensioning device taken on line 32—32 of Figure 31.

Figure 33 is a front elevation of the lower end of the stick inserter shown in Figure 29.

Figure 34 is a side view of Figure 33 with the stick plunger removed.

Figure 35 is a side view of the stick plunger.

Figure 36 is a front view of the stick plunger shown in Figure 35.

Figures 37 and 38 are elevation views of alternative embodiments of the extrusion tubes and cutting assembly.

Figure 39 is an offset schematic view showing the relationship of the indexing chain and distributor bar to the indexing conveyor chain, looking at the left side of the conveyor.

Figure 40 is an enlarged detail section of the upper left portion of Figure 8 showing the indexing mechanism contacts.

Figure 41 is a plan view of a portion of the indexing distributor bar.

Figure 42 is an elevation detail of the indexing stylus point chain link.

Figure 43 is a schematic diagram of the indexing control circuit.

Figure 44 is an enlarged fragmentary vertical section of a modified embodiment of the variable speed drive showing connections to the conveyor and indexing mechanism and corresponds to Figure 8.

Figure 45 is a fragmentary side elevation of the modified drive mechanism as seen from the left hand side of Figure 44.

Figure 46 is a fragmentary top plan of the mechanism shown in Figure 44.

Figure 47 is a detail view of the main drive shaft sheave.

Figure 48 is an enlarged vertical fragmentary section of the front indexing conveyor shaft and sprockets of the modified embodiment and corresponds to the upper portion of Figure 13.

*General description*

In a product processing machine of the preferred and illustrated type, a product in semi-solid or plastic state is extruded through a conveying tube to a point above a tray conveyor. A plurality of elongated trays are successively conveyed lengthwise by several adjacent conveyors past the nozzle of the extruding tube. As the trays pass under the nozzle the extruded product is cut and deposited therein. The trays continue in a lengthwise direction to a sub-zero freezing room or cabinet to harden the product units for subsequent handling and storage. From the freezing room the trays are successively, automatically ejected to another conveyor which returns the filled trays to the first mentioned conveyors, ready to repeat the cycle. As the trays again start through the cycle the hardened frozen products are unloaded into an adjoining chute which deposits them on an adjacent belt conveyor. The belt conveyor may carry the products to further processing machines for coating, wrapping, packing or storage.

Figure 3:
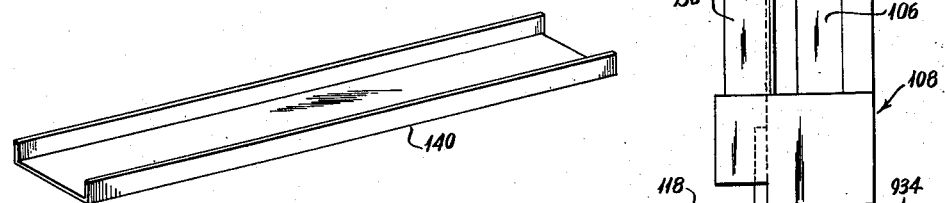
Figure 3 is a front elevation of the machine.
Figure 2:
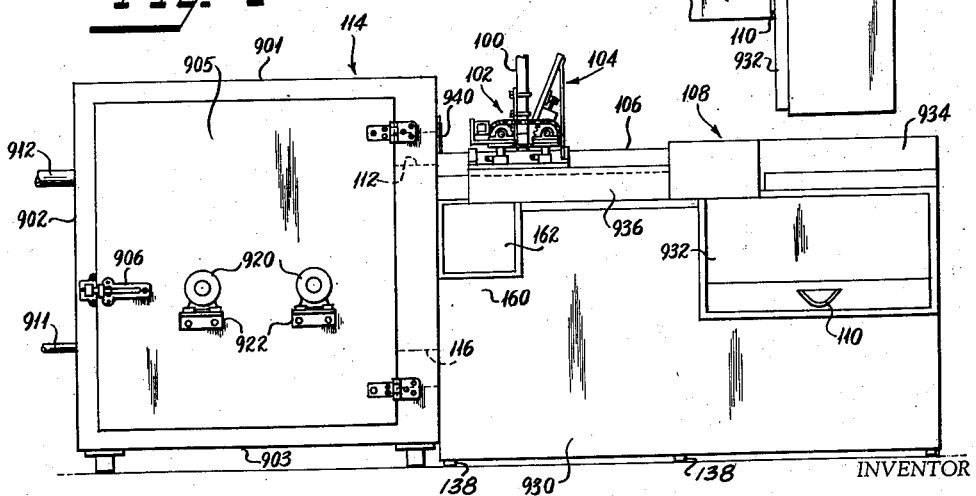
Figure 2 is a side elevation as viewed from the left side of Figure 1.
Figure 2:
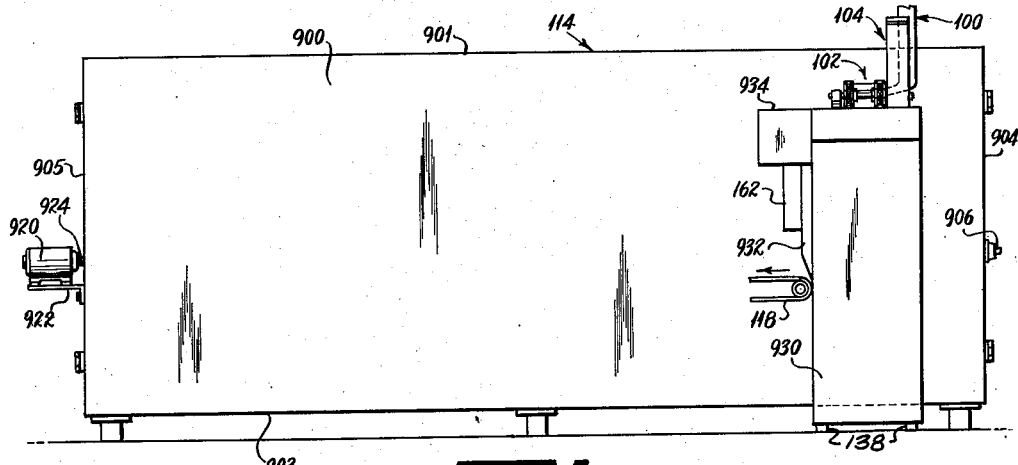
Figure 3:
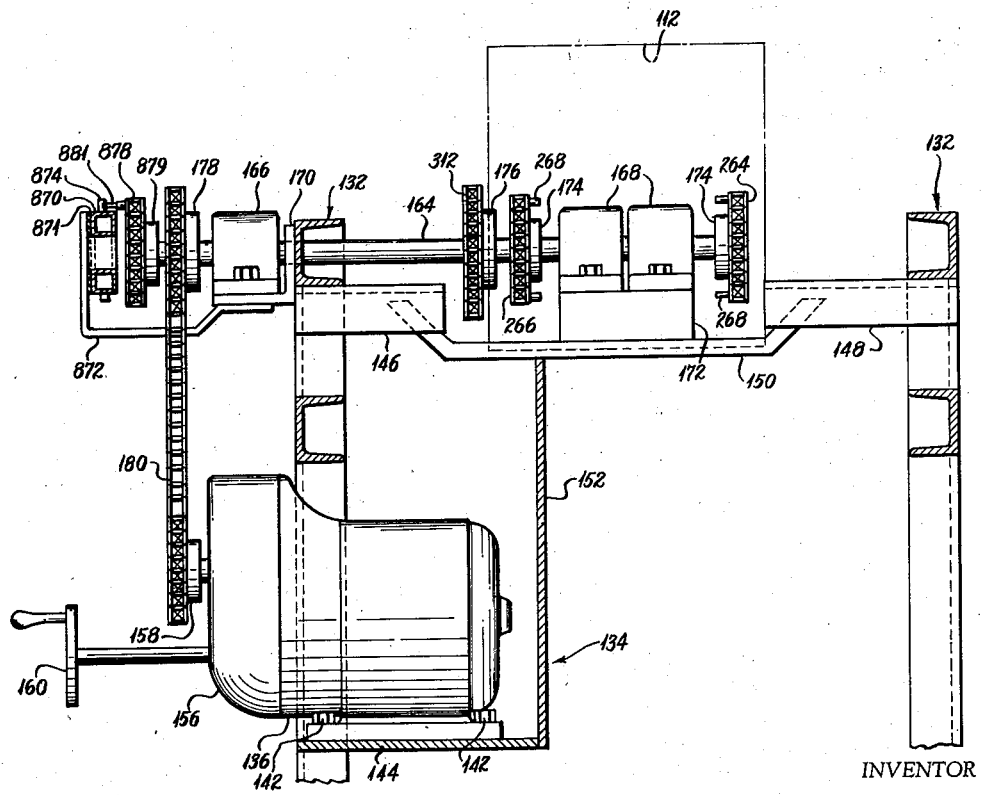

Referring now to the drawings and in particular to Figures 1, 2 and 3, the semi-solid or plastic product to be processed or conditioned is piped to the machine through tube 100 into cooperating arrangement with the cutting mechanism, generally indicated at 102, and the stick insertor generally indicated at 104. By mechanism and a control system to be explained more fully hereinafter, the product being extruded from the tube is cut and a stick simultaneously inserted. The resulting unit of product drops through a small opening in the upper surface of a Plexiglas cover 106 and is deposited on a moving tray. Figures 1, 2 and 3, with the exception of a portion of Figure 1 which shows a partially broken section of the cooling end of the sub-zero freezing cabinet, show only the exterior of the machine. Reference character 108 indicates the antechamber, which, except for the small opening in the Plexiglas cover 106 and the product exit chute opening 110, entirely encloses three aligned chain type conveyors and one vertical elevator conveyor.

The antechamber conveyors are arranged in line to pass a tray longitudinally under the cutting mechanism and through an opening 112 adjacent the upper edge of the front wall of a sub-zero freezing cabinet generally indicated at 114.

Within the sub-zero freezing cabinet the trays enter a chainless tray magazine conveyor and are passed horizontally and vertically in a predetermined pattern, to be explained more fully hereinafter, until the products carried by the trays are completely frozen. At this point the trays are ejected through a front wall exit opening 116 vertically disposed below entrance opening 112. The ejected tray is received by the vertical conveyor, normally positioned in the lower portion of antechamber 108, which raises the loaded tray to and deposits it on the aligned conveyors adjacent the top of antechamber 108. At this point the tray is again conveyed toward the opening 112 and during this travel the conditioned or processed products are unloaded and exit out of chute opening 110 to be deposited on a conveyor belt 118 and carried to further machines, manual handling or cold storage.

In Figure 4, the four conveyors enclosed in antechamber 108 are disclosed in elevation and will be referred to as the intermittent conveyor 124, the indexing conveyor 126, the accelerating conveyor 128 and the elevator conveyor 130. These conveyors are mounted on a suitable structural antechamber frame formed of channel iron generally indicated at 132. Frame 132, in addition to supporting the four conveyor systems has suitably mounted thereon, as by depending bracket means 134, a variable speed drive motor 136. Motor 136 operates chain conveyors 124, 126 and 128 by means to be presently described. If desired, leg members 138 (see Figures 2, 3 and 4) may be added to frame 132 as suitable supports.

The preferred type of product tray 140 is best illustrated in Figure 7 and comprises an open-ended, elongated, shallow U-shaped tray. The tray may be made of various materials, as desired. One embodiment utilizes 16 gauge stainless steel. Another embodiment (not shown) consists of a woven stainless steel wire basket formed with the same trough shaped open-ended form disclosed in Figure 7. The length, depth and width of the trays will be determined by the structural design of the chainless tray magazine conveyor, generally indicated as 142 in Figure 5 wherein the trays are shown as resting on tracks on front and rear walls of the magazine conveyor. The magazine structure will be explained in full detail hereinafter.

*Variable speed drive*

With reference to Figure 4 and Figure 8, the variable speed drive motor 136 is supported by depending bracket means generally indicated at 134. Motors 136 is suitably fastened, as by bolts 142, to a horizontal platform 144. Short lengths of wide channel iron 146 and 148 are fastened by any suitable means, such as welding, riveting or bolting, to frame structure 132. A bent support plate 150 is fastened to channel members 146 and 148, as by welding, to form a horizontal platform for a purpose to be described later. Depending from support plate 150 is vertical plate 152 joined to horizontal platform 144 by welding or bolting. As may be seen in Figure 4, plate 144 is suitably fastened at one side to a vertical frame member and at the other side by depending plate members 152 and 154. Drive motor 136 is thus rigidly mounted to the supporting frame structure 132. Plates 144, 152, 154 and another plate, not shown, partition the drive motor from the interior of the antechamber cabinet. The motor enclosure is completed by a removable cover 162, Figure 2, fastened by suitable latch means to the antechamber casing or cover.

A variable speed mechanism 156 is fastened to the motor casing. Extending from the side of variable speed mechanism 156 are a drive shaft, carrying sprocket member 158, and a manual control means 160 for varying the output speed of the variable speed mechanism 156. Vertically disposed above the motor 136 and parallel with the axis of sprocket 158, a main drive shaft 164 is suitably journalled in three ball bearing pillow blocks 166 and 168. Pillow bearing 166 is bolted to a small section of angle iron 170 fastened to frame work 132. Pillow bearings 168 are bolted to a support block 172 fastened to bent plate 150. Although not detailed, all pillow block bearings are adjustably mounted to properly locate the shaft and thereby keep the chains taut and in proper relation to each other.

Suitably spaced on and keyed to shaft 164 are indexing conveyor chain sprockets 174, and an interconnecting drive sprocket 176. Immediately above and in the same plane with sprocket 158 a fourth sprocket 178 is suitably keyed to drive shaft 164. An endless roller link chain 180 passes over and around sprockets 158 and 178 to form a drive connection between the variable speed drive and the main drive shaft 164.

Thus it will be appreciated that by controlling the variable speed mechanism 156, the main drive shaft 164 and all driven members deriving their driving power from the main drive shaft can be adjusted to a desired operating speed. Main drive shaft 164, as will become apparent, through interconnecting chain links, constitutes the drive for all three of the chain conveyors 124, 126 and 128, which will now be described in detail.

*Intermittent conveyor*

In the intermittent chain conveyor the tray rests on supporting structure and a chain engages with, forms driving means for and provides lateral guide for the tray. With reference to Figures 4 and 9, the intermittent conveyor track provided for tray 140 comprises a plurality of opposed pairs of spring loaded barrel bolt latches 182 and 183 suitably fastened as by bolts, welding or riveting to short lengths of channel iron 184 horizontally projecting from the frame work 132 and suitably fastened thereto. Each of the opposed latches 182 and 183, Figure 9, comprises a body portion fastened within a channel member 184 enclosing a biasing spring 186 engaging and biasing a latch plunger 188 or 189 to an extended position. Lower surfaces 190 of plunger 188 and 189 are beveled to enable a tray, lifted from below the level of latch plungers 188 and 189, to coact against the beveled edges 190 and move latch plungers 188 and 189 against the biasing action of springs 186, and to continue to move vertically past the latch plungers. When the trays reach a position above the latch plungers, biasing springs 186 force plungers 188 and 189 back to their extended position. Tray 140 may then rest on the upper surfaces of the ends of latch plungers 188 and 189, as the lifting mechanism retracts to the lower position. Four pairs of the opposed latches are spaced along the length of the intermittent chain conveyor 124 and constitute lower support members of the conveyor guide track. Latch plungers 189, along the side of the conveyor track opposite the drive chain, are provided with vertically extending lugs 192 on their upper surfaces to act as lateral guides along that side of the tray track.

To positively convey the tray 140 in the directions of the arrow, Figure 6, a vertically planar roller link chain and sprocket arrangement is provided parallel to and slightly laterally off-set from the side of the tray track opposite latches 189. The chain drive comprises a roller link chain 194 which passes over and around sprocket wheels 196 and 198. The chains and sprockets are so arranged that the lower stretch of chain (Figure 9) acts as a lateral track guide means opposite the latch lugs 192. Disposed on the side of chain 194 facing the tray track are two indexing drive lugs 200 and 201 shown in Figures 4 and 6 in their intermittent stop and start positions. Figure 9 shows lug 200 driving a tray 140. In this position the lugs 200 and 201 are out of the way of any tray to be vertically lifted between and deposited on the tracks. As indicated in Figure 4 the intermittent drive chain 194 is rotated in the counterclockwise direction. Rotation of chain 194 occurs only when a tray has been placed in the conveyor tracks, rotation being controlled by mechanism to be described hereinafter. When chain 194 rotates, a lug 200 on the chain passes around wheel 196, engages the end of a tray 140 and forces the tray to the right. The chains are designed so the linear length of chain between lugs 200 and 201 is equal to the length of a tray. As a tray reaches the end of the intermittent conveyor track and the drive lug 200 or 201 starts around wheel 198 and disengages from the tray, rotation of the intermittent conveyor ceases, as will be explained. Note that only a small side margin of the base of the trays contacts the support lugs 188 and 189.

Sprocket wheel 196 is suitably keyed on a shaft 202 journalled in pillow block bearings 204 bolted to a support channel 206 which is riveted, welded or bolted to frame 132. Sprocket wheel 198 is suitably keyed to drive shaft 208 journalled in pillow block bearings 210 bolted to a support channel 212 suitably fixed to frame members 132. The intermittent conveyor drive shaft 208 is connected to a drive shaft 214 by an intermittent acting drive slip clutch 216 which is prevented from rotating by a spring loaded solenoid plunger 218 engaging a notch 220 formed on the exterior circumference of clutch 126. Whenever a tray is deposited on latches 188 and 189, a solenoid 222 is actuated to withdraw plunger 218 from notch 220 and allow the drive shaft 214 to drive through slip clutch 216 and rotate the conveyor chain 194. Control for this solenoid is by a limit switch 223, described with the elevator conveyor control hereinafter. The drive slip clutch is adjusted to slip when a tray being conveyed abuts the next tray on the indexing conveyor.

Drive shaft 214 is journalled in two pillow block bearings 224 bracketing a sprocket wheel 226 suitably keyed to the shaft 214. The pillow blocks are bolted to a support channel 228 extending horizontally from frame work 132. Support channel 228 also forms a support for solenoid 222.

As is apparent in Figure 4, the intermittent conveyor chain contacts the trays as the chain traverses the lower stretch of its loop, whereas the other two aligned conveyors contact the trays as the chains traverse the upper stretch of the loops. For this reason, drive shaft 214 and the intermittent conveyor chain rotate opposite to the other two conveyor chains, therefore a reversing drive connection is provided between sprocket wheel 226 and the main drive system. The reversing drive consists of two sprocket wheels 230 and 232 in the same plane as sprocket wheel 226, spaced on either side thereof and respectively keyed to shafts 234 and 240. Shafts 234 and 240 are journalled respectively in the pillow block bearings 236, 242 bolted to support plates 238 and 244 suitably affixed to frame member 132. Shaft 240 also has a sprocket wheel 246 keyed thereto and driven from the main drive system by means described later. It is noted that sprocket wheels 246, 230 and 232 rotate in a clockwise direction as seen in Figure 4. To enable sprocket wheels 230 and 232 to drive sprocket wheel 226 in a counterclockwise direction a roller link chain 248 is provided which passes around and engages with sprocket wheels 230 and 232, and has its lower stretch passing over and engaging sprocket wheel 226. The diameter of sprocket wheel 226 is less than that of sprocket wheels 230 and 232, resulting in an increased speed between the drive means and conveyor chain 194 for reasons to become apparent.

*Indexing chain conveyor*

As the tray 140 is conveyed to the right by the intermittent conveyor, as viewed in Figure 4 and Figure 6, it passes to the indexing conveyor 126, a chain type conveyor that supports and conveys a tray by the top stretches of chains. As previously noted, main drive shaft 164 is journalled in pillow block bearings 168 adjacent one end of the conveyor frame work 132. Sprocket wheels 174 constitute the chain guide and drive means at one end of the indexing chain conveyor. At the end of the indexing chain conveyor which is adjacent the intermittent conveyor 124, a shaft or axle 250 is journalled in pillow block bearings 252 and pillow block bearing 254. Bearings 252 are bolted to a support block 255 which is fastened by channel irons 256 and bent support plate 258 in a manner similar to that supporting bearings 168. Bearing 254 is bolted to an angle iron 260 suitably fastened to frame 132. On either side of bearings 252, sprocket wheels 262, the same diameter as sprocket wheels 174, are keyed to shaft 250. Sprocket wheels 262 and 174 are so positioned on their respective shaft that an endless chain carried by each set of sprocket wheels will be spaced apart a distance slightly greater than the width of one tray. Endless roller link chains 264 and 266 pass around and engage with sprocket wheels 262 and 174 to thus provide two vertically disposed parallel horizontally spaced endless chain loops. At spaced intervals on the facing link surfaces of the parallel chain loops a plurality of horizontally disposed support pins 268 are integrally fastened. Pins 268 are arranged in opposed pairs and two of the pairs, which are equidistantly spaced about the loops chains 264 and 266, include transverse driving lugs indicated at 270 and 272. The pairs of opposed drive lugs 270 and 272 alternately engage the ends of successive trays 140 which will rest on horizontal support pins 268. This is best seen in Figures 4, 13 and 39 which disclose the drive lugs 270 engaging the end of a tray 140. As in the intermittent conveyor, the linear length of chain between drive lugs 270 is equal to the length of a tray.

The plane of the upper surfaces of latch plungers 188, Figure 4, is tangent to the tops of horizontal support pins 268 on the upper stretches of chains 264 and 266, consequently a tray passing from the intermittent conveyor to the indexing conveyor remains in the same horizontal plane.

One end of shaft 250 passes through and extends beyond bearing 254, has a sprocket wheel 274 keyed thereto and located in the same vertical plane as previously mentioned sprocket wheel 246. An endless chain 276 passes around and engages with both of sprocket wheels 246 and 274. It is to be noted that sprocket wheel 246 is of smaller diameter than sprocket wheel 274. Thus shaft 250, rotating at the indexing conveyor speed, connects through large sprocket wheel 274 and chain 276 to small sprocket wheel 246, driving shaft 240 at a higher rate of speed than shaft 250. A further speed increase is realized, as before mentioned, between sprocket wheel 232 and sprocket wheel 226 which drives the intermittent chain loop 194. It is thus apparent that intermittent drive chain 194 operates at a much higher speed than the indexing conveyor chains 264 and 266 preferably a 2:1 ratio. This feature assures that the tray moving from the intermittent conveyor, and following a tray on the indexing conveyor will move to a position adjacent and abutting the drive lugs 270 or 272 that are driving the preceding tray, consequently no gap exists between trays on the indexing conveyor as adjacent ends of two trays pass under the depositing mechanism. At the point where the tray being transferred from the intermittent conveyor to the indexing conveyor abuts the drive lugs 270 or 272, the intermittent drive chain 194 can no longer shift the tray at a higher speed than permitted by the indexing conveyor chain, and therefore the slip clutch 216 will enable shaft 214 to overrun shaft 208.

Connected to shafts 164 and 250 and cooperating therebetween, the present invention incorporates what is termed an indexing means or mechanism, generally indicated at 280, which will be described in further detail hereinafter. The indexing means is mentioned at this point to note that the indexing conveyor which is driven at a constant predetermined speed, is directly connected to the indexing means, which controls the depositing mechanism in accord with the position of the tray on the indexing conveyor. The indexing conveyor is so called because of this relationship.

As the indexing conveyor carries a tray along its path of travel, the tray passes beneath a product unit depositing mechanism comprising, in the disclosed embodiment, the extrusion tube 100, cutting mechanism 102 and stick insertor 104 positioned above and intermediate the ends of the indexing conveyor. The depositing mechanism is actuated intermittently by the aforementioned indexing means to fill the tray, as it is conveyed beneath the depositing mechanism, with units of the product to be processed. When the tray is filled it passes from the indexing conveyor to an aligned accelerating conveyor 128 which carries the loaded tray into the freezing cabinet 114 at an accelerated rate of speed to create a gap between the loaded tray and the succeeding tray being filled. This gap is necessary to permit the magazine conveyor to operate one complete cycle before the succeeding tray starts entry into the magazine conveyor.

*Accelerating conveyor*

The accelerating conveyor 128 is positioned adjacent the discharge end of the indexing conveyor 126 and is vertically aligned therewith to transfer a tray filled with product units from the indexing conveyor to the chainless tray magazine conveyor 142. Accelerating conveyor 128 passes through entrance 112 of a side wall of the sub-zero freezing cabinet 114. This may be seen by joining Figures 4 and 5 and is also shown in Figure 6. Figures 10 and 11 are end views of the accelerating conveyor.

Accelerating conveyor 128 has parallel vertically arranged endless chains similar to those of the indexing conveyor. Two roller link type endless chains 284 and 286 pass around and engage with sprockets 288 and 290, each chain and its corresponding pair of sprocket wheels being arranged in vertical planes coincident with the planes of indexing conveyor chains 264 and 266. Paired sprocket wheels 288 are keyed to a driven shaft 292 journalled in pillow block bearings 294. A base plate 296 is fastened by suitable means either to frame work 132 or to the cabinet wall and extends horizontally into cabinet entrance 112. Suitably affixed to the antechamber end of base plate 296 is a support block 298 having pillow block bearings 294 bolted thereon. At the opposite end of base plate 296, within the freezer cabinet, a bent bracket member 300 is bolted through longitudinal slots in the end of base plate 296 to enable adjustment of tension on the accelerator conveyor chains. Sprocket wheels 290 are keyed to the ends of a shaft 304 journalled in pillow block bearings 302 suitably affixed to the adjustable bracket 300. It will be apparent from Figure 4 that shafts 292 and 304 are parallel and horizontally disposed, however, shaft 304 is at a lower elevation than shaft 292, consequently chain tracks 284 and 286 have a downward inclination.

The depositing mechanism is so arranged in relation to the indexing conveyor to complete the filling of a tray carried by the indexing conveyor just before the center of gravity of the filled tray passes top dead center of sprocket wheels 174. As the tray passes out from under the depositing nozzle, and its center of gravity passes top dead center of sprocket 174, the tray will tilt downwardly to rest on horizontally disposed pins 306 projecting from the inner faces of the accelerator conveyor chains 284 and 286.

Shaft 292 has an extended end portion to which is affixed a sprocket wheel 310 arranged in a vertical plane coextensive with sprocket wheel 176 on main drive shaft 164. Sprocket wheels 176 and 310 are interconnected by an endless link chain 312 whereby the accelerating conveyor is directly connected to the main drive shaft 164 and will rotate or be in operation whenever the indexing conveyor is operating. To enable the accelerating conveyor 128 to operate at a higher speed than the indexing conveyor, sprocket 310 is constructed with one-half as many teeth as sprocket 176, resulting in a 2:1 speed ratio between the accelerating conveyor and the indexing conveyor.

As previously mentioned, plate 296 may be fastened directly to the cabinet wall or to the frame structure of the antechamber. By fastening the plate to frame structure 132, the accelerating conveyor and the indexing conveyor may be predeterminedly aligned and fixed in that position, thus enabling the antechamber unit containing the fixed conveyors to be removed from a position adjacent the sub-zero freezing cabinet for use with another freezing cabinet or freezing room. Alternatively, should the plate 292 be fastened to the cabinet or freezing wall, it would be a simple matter to disconnect chain 312 for removal of the antechamber unit. Alignment upon reassembly could be very easily maintained through guide blocks 314 bolted to the sides to the cabinet or room wall to guide the ends of frame members 132 in proper abutting relationship to the wall.

The end of the bent support bracket 300 is positioned adjacent an upper corner of the chainless magazine conveyor 142 so the top stretch of accelerating conveyor chain tracks 284 and 286 will be substantially coextensive with the bottom edge of the chainless magazine conveyor entrance 112.

*Tray magazine chainless conveyor*

Within a sub-zero freezing cabinet or room 114, as indicated in Figure 1, a magazine type chainless tray conveyor 320 is arranged to receive a filled tray from the accelerating conveyor 128. The magazine conveyor is constructed from channel and angle beams to form a box like structure having open ends. Referring to Figures 5, 16A, 16B, 16C and 17A and 17B, vertically arranged channel members 322, 323, 324, 325, 326, 327, 328 and 329 constitute the vertical supporting structure along the front of the magazine. Similar members are situated along the back side of the magazine and are indicated by prime numbers corresponding to the front vertical channels. Extending horizontally from vertical support 322 to vertical support 328 is an angle member 330 having one flange arranged vertically and suitably fastened to each vertical support, the other flange projecting horizontally inward to provide a horizontally disposed track. Opposite and parallel to angle member 330 is a similar angle member 332, fastened along the inner sides of the corresponding rear vertical supports. The horizontal flange of angle members 330 and 332 constitute a pair of top level tracks for supporting a plurality of free trays 140 in side by side relation. Disposed at equally spaced distances below the top level set of tracks are six pairs of angle members 334 disposed horizontally and parallel with track members 330 and 332 on the front and rear vertical support members.

The top level angle 330 at its right hand side (Figure 16C) has its vertical flange removed between vertical channels 322 and 323 leaving the flat horizontal flange indicated at 336 while the rear angle member 332 extends intact between the corresponding rear vertical support members 322' and 323'. Between and welded to the horizontal flange portion 336 of the top level front angle member 330 and the corresponding portion on rear angle member 332, is a skid plate 338 for receiving an incoming tray 140 from the accelerating conveyor 128. Viewing Figure 16C, the tray will be inserted from the viewer and will be guided on skid plate 338 until it abuts the vertical flange of rear angle member 332. The tray will thus rest with one end on the horizontal flange of angle 330 and the other end resting on the horizontal flange of angle 332. Because the flanges of the angles are tapered (Figure 18) the end edges of the trays rest on the flanges in line contact, as indicated at 333, rather than surface contact.

The levels of parallel tracks will be referred to hereinafter as levels 1 through 7 starting from the top level and the lower non-parallel or tilted level of tracks will be termed the bottom tracks. Viewing Figure 16A, 16B and 16C, 17A and 17B, it will be noted that the tracks of the top or first level, and all odd levels, end just beyond vertical channel member 328 and the second level, and all even levels of tracks are fastened to vertical member 329 at the left end of the magazine, and end just beyond vertical channel member 323, being fastened to each intermediate vertical channel. Levels 1, 3, 5 and 7 are similarly constructed, and levels 2, 4 and 6 are similarly constructed. Figures 17A and 17B are left and right portions of the 7th level, however the structure is similar to all odd levels of tracks and by turning these drawings up side down the structure will be applicable to the even levels of tracks. The vertical flange of angle 334 is cut away between vertical channels 328 and 329 and 328' and 329' on all even levels leaving a small vertical end flange 340 abutting and fastened to vertical channels 329 and 329'. The odd levels are similarly constructed and fastened at the right hand side. In the outer edge of the horizontal flange of odd level tracks 334, between vertical members 322 and 323 and 322' and 323', a recess 342 is cut. Similar recesses are formed at alternate ends of track levels 2 through 7 for a purpose that will become apparent. Still viewing Figures 17A and 17B, the left hand ends of odd level tracks 334 terminate a distance greater than the width of one tray from vertical support members 329 and 329'. Mounted on members 329 and 329' are two small sections of angle 344 coextensive with angle members 334 carrying stop members 346 forming an abutment for trays resting on the track. Similar structure exists at the right end of the even levels of tracks. At the left end of each odd level of tracks and at the right end of each even level of tracks, between the two end vertical support channels, where no track exists, front and rear horizontal plates 348 are normally positioned with an edge portion 350 extending into the recess 342 forming a horizontal support coextensive between the lower flanges of tracks 330, 332 and 334 and angle members 344.

As a tray moves along the tracks in directions indicated by arrows in Figures 16A, 16B and 16C, toward stops 346 they will pass off the ends of tracks and onto plate members 348. Plate members 348 are slidable carried by vertical carriages, described hereinafter, and are capable of being simultaneously shifted to the next lower level of tracks, each pair of opposed plates carrying with them one tray.

Viewing Figures 17A and 18 it will be seen that when plate 348 moves downwardly with tray 140, the plate portion 350 will pass through the recess 342 in the next lower tracks 334. As the plates 348 pass through the recess 342, tray 140 will be retained in supporting relation on the horizontal flange 343 of angle members 334. Note that similar plates 348 are situated at the left hand ends of levels 1, 3, 5 and 7 and at the right hand ends of levels 2, 4, and 6. From each of these positions all the plates 348 are capable of being simultaneously lowered to a position just below the next lower level, each opposed pair of plates thereby shifting a tray from one level to the next lower level.

To provide a means of simultaneously lowering all of the plates 348, vertical carriages and cooperating tracks are arranged at the four corners of the conveyor frame. For purposes of description the vertical carriage shown in Figures 16C, 17A, 18 and 23 will be described in detail. In the disclosed embodiment the left hand vertical carriages have four lowering plates while the right hand carriages have three lowering plates. The magazine is not necessarily restricted to the number of track levels shown, more or less levels being utilized as desired, however, the levels should be in multiples of two if it is desired to have the exit and entrance at the same end. Accordingly, if two more levels were desired in the disclosure the vertical carriages would be extended two levels each and an additional lowering plate 348 and cooperating mechanism installed on each carriage.

Each carriage comprises two vertical angle members 352 connected by pairs of bolts and nuts 354 at equally spaced intervals corresponding to the distance between two tray levels. Bolted adjacent each end of each vertical member 352 is a roller yoke 356 pivotally journalling a roller 358 having a semi-circular groove in the periphery, thus providing two vertically spaced rollers on the side of each vertical carriage member 352. Vertically disposed hollow roller rails 360 pass through yoke members 356, engage the circular groove in the periphery of each wheel. The right hand rails 360 are vertically fixed between offset angle plates 362 by through bolts and nuts 363, the offset plates in turn being bolted as at 364 to vertical magazine support channel 322. The left hand rails 360 are similarly bolted to anchor plates 366 welded as at 367 to a fixed vertical carriage support channel 368. Channel member 368 is offset in front of vertical support channel 323 (Figures 17B and 23) and is connected or fastened to vertical channel member 323 by anchor blocks 370 at the top and bottom ends of channel 323. A vertical carriage actuator bar 372 is fastened to the lower ends of vertical carriage members 352 by bolts 374 and spacer blocks 376. Note that the front and rear vertical carriage actuator bars 378 at the left of Figure 17A are shorter than those on the right of Figure 17B. The vertical carriage actuator bars 372 and 378 at each of the four corners are individually connected to hydraulic servo-motors in a manner and for operation as will be described hereinafter.

The described structure of the vertical carriages results in a planar frame vertically shiftable a distance equal to that indicated between the reference letters U and L of Figure 16C.

Each pair of tension bolts 354 provides a pair of journals for tubular guide rollers 380 coacting with the top and bottom of tray lowering plates 348. With reference to Figures 17A and 18 it will be seen that the tray lowering plate 348 is provided with a tongue 382 guided between an angle bracket 384 and a plate 386 which is fastened to the angle bracket 384 by screws 388 to provide a friction fit for the plate 348. Welded to both sides of the tray guide plates 348 are angled cams 390 (Figure 18). The cam actuating rollers 392 are journalled on bearings suitably mounted to the magazine vertical frame channels 322, 323, 328 and 329 and corresponding rear channels (Figure 17A). Two upper level rollers 392 and two lower level rollers 394 are provided for each plate 348, and are arranged to coact with the cam members 390 on both sides of the plates. The solid lines in Figure 18 illustrate the tray lowering plate in the upper level position with cam 390 engaging roller 392 thereby shifting plate 348 to the right which will position the plate end portion 350 as a continuation of the horizontal track 334. In this position a tray may be pushed along tracks 334 and on to the plate portions 350. As shown in phantom lines (Figure 18), when the vertical carriage 352 is lowered, cams 390 engage lower rollers 394 and will be shifted to the left, withdrawing the lowering plates 348 as shown. As the vertical carriages lower all of the tray lowering plates from the upper position to the lower position, protruding portion 350 passes through recesses 342 in the next lower tracks 334, and the tray being lowered will engage the reduced flange 343 of the next lower track 334 allowing tray lowering plate 348 to continue downwardly away from tray 140 and simultaneously be retracted by cams 390 acting against the lower arm rollers 394. The tray lowering plates remain in the retracted position until the vertical carriage 352 again raises to the upper position where the top surfaces of cams 390 engage the upper rollers 392 to extend the plates 348 to a tray receiving position.

The motive means for vertically shifting the vertical carriages at each of the four corners of the magazine consists of four vertically disposed hydraulic servo-motors 400, 401, 402 and 403. The connection between servo-motors 400 and 401 and the corresponding vertical carriages are similar and the connections from servo-motors 402 and 403 to the left hand vertical carriages are also similar hence a description of the connections from motors 401 and 402 to their carriages will suffice. Piston 404 of servo-motor 401 is fastened to connecting rod 406 which in turn is connected as by nuts 408 to an extended end 410 of vertical carriage actuator bar 372, and is constructed so the extended position of connecting rod 406 will position the vertical carriage as indicated by the reference letter U in Figure 16C. When piston rod 406 is retracted the lower surface of the actuator bar 372 will be positioned as indicated by the character letter L. At the left hand side of Figures 16A and 17A servo-motor 402 includes a piston 412 fastened to connecting rod 414 provided with an eye 416 at its upper end. Passing through eye 416 is a journal bolt 418 screwed into the side of actuator bar 378. Actuation of servo-motor 402 will position the left hand carriage in an upper or lower position corresponding to that shown in Figure 16C.

It is thus apparent that for a complete cycle of movement of all four servo-motors 400 to 403, the vertical carriages at both ends of the magazine will initially be lowered, together with the tray lowering plates 348 positioned at the ends of alternate tray levels to the next lower tray level, at which position all of the plates 348 will be retracted by coaction of their cams with the cam rollers. Completing the cycle of movement, the servo-motors will raise all vertical carriage members to their original positions where coaction between the plate cam members 390 and the upper cam rollers 392 will extend all plates 348 to their original position.

As noted by the arrows on the trays at different levels in Figures 16A, 16B, and 16C, alternate levels of trays are shifted horizontally in opposite directions, the upper level of trays moving toward the left and each succeeding lower level of trays moving in alternate opposite directions. For horizontal shifting of trays at all levels, four simultaneously actuated horizontal carriage frames 420 are provided. Each horizontal carriage comprises a vertical channel member 422 suitably fastened at each end to horizonitally extended channel members 424 and 426 and positioned between the offset vertical carriage support channel 368 and the frame structure of the magazine. Each horizontal carriage is similar in structure hence description of one will suffice. The horizontal carriage is guided for horizontal movement on upper and lower trolley rails 428 and 430, respectively (Figures 16C and 23), suitably fastened to the magazine vertical frame channel members adjacent the top and bottom of the magazine, by threaded rod 429, nuts 431 and blocks as at 432. Rollers 434 coact with trolley rails 428 and 430 and are fastened to the upper and lower horizontal channel members 424 and 426, in a manner similar to the vertical guide rollers 358. The right hand horizontal carriages are provided with tray pusher bars at the first, third, fifth, and seventh level of tracks arranged to cooperate with trays at those levels and those trays to the left as indicated by the arrows upon a shifting movement of the horizontal carriages to the left along tracks 428 and 430. Referring to Figure 16A it will be noted that the left hand horizontal carriages have pusher bars arranged to engage trays at the second, fourth, sixth and lower levels to push all of the trays to the right on those levels. All pushers bars are similar with the exception of those on the upper level at the right hand end.

With particular attention to Figures 16C and 18, the upper level pusher bar 436 is welded at 438 to horizontal channel 424 of the horizontal carriage to depend therefrom in an offset manner as indicated in Figure 18. The lower end of pusher bar 436 as indicated in Figures 19 and 20 has a bevel portion 440 utilized to properly center the trays 140 after they are received from the accelerating conveyor and as they are pushed to the left. Note Figure 25, the lower end of the bar is milled to form a recess having a back wall 442 and an overhanging lip 444. As the pusher bars are moved to the left by shifting of the horizontal carriages 420, beveled portions 440 on the front and rear upper level pusher bars will center the trays, rear walls 442 of the recesses will engage the vertical sides of the tray and the overhanging lip 444 will be positioned over the top edge of the side wall of the tray.

The remaining horizontal push bars 446 are similar and a description of one will suffice. Looking at Figures 21–25, the push bar 446 comprises an elongated rod welded at 448 to a side of the horizontal carriage vertical channel 422, and has a hooked end member 450 to cooperate with the sides of a tray. When the horizontal carriages are positioned at the far ends of the magazine, the ends 450 of each pusher bar will be positioned at the ends of their respective tracks. When a tray 140 has been positioned at the starting end of a level, as indicated in Figures 21 and 23, the end of push bar 446 is out of engagement with the side of the tray. Movement of the horizontal carriage to the left in Figure 22 will abut the flat vertical portion 452 against the side wall of the tray and the overhanging pusher bar lip 454 will be positioned over the top edge of the tray. Note that these pusher bars also have a bevel portion 456 which will maintain the trays in a centered position relative to tracks 334 prior to engagement of the trays with the side walls of the tracks. Figure 21 discloses the push bar at its far end position and Figure 22 discloses the push bar after it has been actuated by the horizontal carriage 422. The push bar thus engages and, its lip 454 overhangs the side wall of the tray and pushes the tray to the left to abut the preceding tray and push all preceding trays on that level toward the left position a distance equal to the horizontal movement of the carriage. The vertical entrance flange of track 334 is chamfered at at 458 in Figure 23 to aid in guiding and centering the trays as they are initially pushed along the track.

The actuating means for simultaneously moving all four horizontal carriages is best illustrated in Figures 16A, 16B, 16C, 17A and 17B. Positioned on the front and back side at the mid point of the magazine frame are two vertically acting carriage assemblies generally indicated by reference numeral 460. Each assembly comprises a main preformed channel member 462, vertically guided by yoked rollers 464 guided on vertical trolley rails 466 in a manner similar to that previously described for rollers 358 and 434. A pair of spaced trolley rails 466 are provided at the front and at the back sides, fastened to horizontal plates 468 which in turn are suitably bolted to vertical channel members 469 spaced from and suitably fastened to the vertical magazine support channels 325 and 326. Main channel member 462 is provided at each end with a pair of opposed horizontally disposed lugs 470 and 472. Each set of opposed lugs is pivotally connected by an adjustable clevis 474, rod 476, and clevis 478 to a journal pin in the swinging end of a pivoted lever 480. As seen in Figure 16B four of these linkages are provided for each of the vertically acting center carriage assemblies. Pivotally connected to levers 480 adjacent the pivotal connection of clevis 478 are additional pivotal clevis attachments 482 adjustably screwed to the ends of substantially horizontally disposed rods 484. As will thus be apparent, an upper and lower rod 484 extends from each vertically acting carriage assembly to each of the two corresponding horizontally acting carriages. Rods 484 connect to the horizontal carriages by additional clevis and pin arrangements 486, one element of which is fixed, as by welding 488, to the side of the horizontal carriage vertical channel member 422.

The power units for each vertically acting central carriage assembly comprise a hydraulic servo-motor 490 or 491 having a piston 492 carrying a piston rod 494 vertically disposed in relation to the vertically acting carriage. On the exterior end of the piston rod 494 an eye 496 is formed and engages a stud member 498 fixed to the main channel member as by welding. Front and rear servo-motors and their connections to the channel members 462 are identical.

To operate the horizontal carriages through a cycle from and back to the position illustrated in Figures 16A, 16B and 16C, servo-motors 490 and 491 will be actuated to move pistons 492 to their lower position, pulling downwardly on rod 494 and moving main channel members 462 to a lower position. Linkage 470, 476, 480, and rods 484 will all be moved toward the center of the magazine, thus shifting horizontal carriages 420 toward the center of the machine. The right hand horizontal carriages shift toward the left and pusher bars 436 and 446 engage trays at levels 1, 3, 5, and 7 moving all trays at that level one tray position to the left. At the same time the horizontal carriages at the left side of the magazine will be shifted towards the right and pusher bars 446 will engage trays at levels 2, 4, 6 and 8 and push those trays and all trays at that level toward the right. Upon completion of the downward stroke of channel member 462, resulting in a repositioning of trays at all levels, pistons 491 and 492 shift channel members 462 back to their original position whereupon all horizontal carriages will be repositioned to their original position with the tray pusher bars at the far end of their respective track levels, leaving a free tray space adjacent each pair of pusher bars. Figures 16A, 16B and 16C illustrate trays just after they have been shifted and the horizontal carriages have returned to their original position.

When a plurality of trays is aligned in side by side abutting relationship along tracks 334, and all trays are shifted by pushing on the end tray, there is a tendency for the row of trays to buckle where they abut one another. The overhanging lips 444 of pusher bars 436 and lips 454 of pusher bars 446 prevent vertical movement of the end trays by coaction with the top edges of the sides of the tray. In addition, a stabilizer bar 500 extends along the top of each track member and protrudes a slight distance over the tops of the ends of each tray, as indicated in Figure 20, to prevent vertical movement of the horizontally shifting trays. A horizontal shift of all trays by push bars 446 will position the end trays which are engaged by the push bars under, and past the adjacent ends of, stabilizer bars 500. To provide for end 450 of the pusher bars to pass under stabilizer bar 500, a recess 502 is cut in the upper surface of the pusher bar end 450 as indicated in Figure 24.

The lower level of tracks comprises angle track 504 along the front of the magazine and angle track 506 along the back wall of the magazine. These tracks and their stabilizing bars 500 are similar to the tracks at the other levels except the front angle member 504 slants downwardly from left to right to gradually tilt the trays from the rear wall downwardly toward the front wall as they progress from left to right (Figures 5, 16A, 16B and 16C). The left end of the lower level tracks is constructed similar to the right hand end of Figure 17B and receives a tray lowered from the preceeding or seventh level. At the right hand end of the lower level, the rear track 506 extends to the end of the magazine. A stop block 508 is suitably fastened as by bolts to the end of track 506. Front track 504 ends adjacent vertical magazine support channel 323. A short angle extension 510 carrying a stop block 512 is fastened to vertical magazine support channel 322 opposite the end of track 504.

Extending from the right hand end of track 506 at the rear side of the magazine to a position adjacent the end of track 504 at the front wall of the magazine is an inclined skate conveyor 514 arranged to receive a tray as it is pushed off the end of front track 504 and along the back track 506. Stops 508 and 510 serves to properly align a tray 140 as it slides sideways onto skate conveyor 514. When a tray is deposited on the skate conveyor 514 it has completed movement back and forth on all levels of the magazine and is ready to be ejected. In position on the inclined skate conveyor 514 a filled tray will have a tendency to roll down the inclined plane however provision has been made to positively eject the tray out of the magazine exit in a longitudinal direction. In Figure 5, a ram member 516 is disclosed as being guidingly supported along the inclined side braces 517 of the skate conveyor 514 by coaction between slotted member 518 along axles 520. Ram 516 is actuated by a downward vertical shift of the rear corner vertical carriage frame 352 and is connected thereto by pivoted link 522. Phantom pivot points 524 and 526 illustrate the positions of the ram 516 and its pivoted link after a downward shift of the rear vertical carriage frame 352.

The vertical channel members 322–329 may either be mounted on a base frame structure or, as shown in Figure 5, may be directly mounted to the base of the freezer cabinet. The same is true for the skate conveyor 514. In either case the top ends of the vertical channel member are joined by transverse channel members 528. The construction of the magazine frame work will depend on the manner of using the conveyor, for example, as used in a freezer cabinet it would be mounted within the cabinet, whereas if it were to be used in a large freezing room the magazine could be constructed as a portable unit.

As shown in Figure 18, the only part of the trays that contact the tracks 330, 332 and 334 is the edge of the bottom surface at the ends of the trays. Should there be any tendency for a sooty deposit resulting from a metal to metal sliding contact at the line contact of the ends of the trays, such deposits can be prevented from dropping to the next lower level by deflecters attached along the front and rear magazine frame-work below the tracks as indicated by elements 529 positioned below the second level of trays in Figure 5.

When used within a freezing cabinet as illustrated, the levels of trays provide the tops and bottoms of a series of horizontal ducts whose side walls are provided by a series of sheet metal plates 531 fastened to the vertical chanel members 323–328 and 323'–328' and extending between the tracks 330, 332, 334, 504 and 506. The ducts thus provided, enable circulation of a freezing medium (air) over and below the trays of product units. Sheet metal plates 531 may be dispensed with if the magazine unit is to be located in a freezing room where the cold air is in constant circulation and no confined paths of flow are necessary.

The control system for the magazine conveyor is disclosed in Figure 26 and includes a reservoir 530 and an electric motor driven hydraulic pump 532 having a fluid intake line 534 and pressure line 536 connected thereto. A pressure relief valve 538 connects between lines 534 and 536. Pressure line 536 connects to two solenoid operated control valves 540 and 542 and a return line 544 connects valves 540 and 542 to the reservoir. Solenoid valve 540 controls fluid flow to and from servo-motors 490 and 491 through lines 546 and 548 to actuate the horizontal carriages. To obtain simultaneous operation of servo-motors 490 and 491, line 546 is connected to the upper end of servo-motor 490, the lower end of servo-motor 490 being connected by line 550 to the upper end of servo-motor 491 and the hydraulic circuit being completed by a connection between line 548 to the bottom of servo-motor 491. Thus, if pressure is applied to line 548, servo-motor 491 will move its piston to the top of the cylinder simultaneously forcing the piston of servo-motor 490 to move to the top of its cylinder and line 546 functions as a fluid return line.

Operation of valve 540 in the opposite direction will reverse the action of servo-motors 490 and 491. When the pistons are in their upper position, all of the push bars are at the far end of the tracks and when the pistons of servo-motors 490 and 491 move to the lower position the push bars are pulled toward the center of the magazine shifting alternate levels of trays in opposite directions.

Solenoid valve 542 controls the positioning of the vertical carriage servo-motors 400–403 by distribution of fluid under pressure to lines 552 or 554. Line 554 is connected to the bottom of servo-motor 400 while line 552 is connected to the top end of servo-motor 403. Servo-motors 400–403 are connected in series by line 556 extending from the top of servo-motor 400 to the bottom of servo-motor 401, line 558 extending from the top of servo-motor 401 to the bottom of servo-motor 402, and line 560 extending from the top of servo-motor 402 to the bottom of servo-motor 403. Thus, if pressure is applied by solenoid valve 542 through line 554 to the bottom of the servo-motor 400 the other three servo-motors 401, 402 and 403 will all be positioned with their pistons in the upper end and line 552 will return fluid through valve 542, line 544, to reservoir 530. Similarly, actuation of solenoid valve 542 in the opposite direction will position the pistons of all four servo-motors 400–403 at the bottom of their stroke. As previously mentioned, simultaneous operation of these servo-motors will vertically lower or raise the vertical carriages at each of the four corners of the magazine.

The control circuit for the solenoid actuated valves 540 and 542 are energized from power lines 562 and 564. Power line 562 connects, through limit switch 566 and wire 568, to the upper solenoid 570 of valve 540. Power line 562 is also connected, through limit switch 572 and line 574, to the lower solenoid 576 of valve 540. Upper and lower solenoids 570 and 576 are connected to a common line 564. Energizing the upper solenoid 570 will actuate servo-motors 490 and 491 to a lower position, pulling all horizontal carriages toward the center of the magazine, while energization of solenoid 576 will position servo-motors 490 and 491 in their upper position to return all horizontal carriages to their original end positions.

Power line 562 also connects, through limit switch 578, line 580 limit switch 582 and line 584, to the upper solenoid 586 of valve 542. Power line 562 is further connected, through limit switch 588 and line 590 to the bottom solenoid 592 of valve 542. The other sides of solenoids 586 and 592 are also connected to the common line 564. It will be seen that completion of a circuit to energize the upper solenoid 586 will actuate all corner, vertical carriage, servo-motors to their lower positions thus lowering all of the vertical carriages simultaneously; and completion of a circuit to energize solenoid 592 will actuate all vertical servo-motors to their upper position thus shifting the vertical carriages back to their original positions.

Limit switch 566 is so located or has an actuator so located as to be closed whenever a tray indicated by dotted lines 140 is received into the magazine from the entrance as illustrated in Figure 26. Limit switches 572 and 578 are located or have their actuators located to be actuated by a tray pushed to the left side of the upper level of tracks as illustrated by dotted lines in Figure 26. Limit switch 582 is located or its actuator is located to be closed whenever the horizontal carriage push bar 436 is positioned along with the horizontal carriages at the end of the magazine and will be in the open position whenever the horizontal carriages are shifted away from the end position. Limit switch 588 is located or has an actuator located adjacent the lower limit position of the vertically shifting carriage 352 and remains open unless the vertically shifting carriage is in its lower position. Limit switch 588 can be positioned to be operated by any one of the four vertically shifting carriages.

Prior to starting the automatic operation of the magazine, the top level of tracks is filled with trays except for the entrance position. Since this will result in a tray occupying the left end position, limit switches 572 and 578 will be closed, limit switch 582 will be closed because of the horizontal carriage position, limit switches 566 will be open because there is no tray in the entrance position and limit switch 588 will be open because the vertical carriages are in the upper position. Power lines 562 and 564 will then be connected to a supply source, electric pump 532 will be started, and a circuit will be completed through line 562, limit switch 578, line 580, limit switch 582, line 584 and through the upper solenoid 586 of valve 542 to return line 564. This completed circuit initiates a vertically downward shift of all four vertical carriages and the left hand tray of the upper level will be lowered by tray lowering plates 348 to the second level position opening limit switch 582 to break the circuit to solenoid 586. As the vertical carriages reach their lower position the tray lowering plates will be retracted as previously described and limit switch 588 will be closed. Closing of limit switch 588 completes a circuit from line 562 through the limit switch to the lower solenoid 592 of solenoid valve 542, directing pressure to servo-motors 400–403 to raise all vertical carriages back to their upper position. As before explained, raising of the vertical carriages will re-extend the tray lowering plates 348 and position them at the ends of the tracks. At this point in the cycle of operation there are no trays at the left hand end of the upper level nor would there be any trays at the left hand positions of levels 1, 3, 5 and 7 and the right hand positions of levels 2, 4, 6 and 8 if these levels had been full of trays.

The magazine is now conditioned to start its automatic operation, the horizontal carriages being at the extreme end positions of the magazine and the vertical carriages all being in the upper position ready to receive horizontally shifted trays. Limit switches 572 and 578 will now be in the open position. Since limit switch 578 and limit switch 582 are connected in series and control the vertical lowering of the vertical carriages it is understood that both switches must be closed before the carriages can be lowered, i.e. there must be a tray at the left end of the upper level and the horizontal carriage must be in its nonshifted position before the vertical carriages can shift to their lower position.

From this point on in the automatic magazine cycle, each time a tray 140 is received in the entrance of the magazine it will slide along skid plate 338 until it abuts the rear wall of track 332. Full insertion of the tray will close limit switch 566 and energize solenoid 570 of valve 540, directing pressure to the upper ends of servo-motors 490 and 491 and thereby horizontally shift the horizontal carriages. This horizontal shift will push all of the upper level trays to the left (and once the magazine is full, will shift adjacent levels of trays in opposite directions) thereby positioning a tray on the uppermost tray lowering plates of the left hand vertical carriages, simultaneously closing limit switches 572 and 578. The inward shift of the horizontal carriages opens the limit switch 582 preventing completion of the circuit to the vertical lowering carriages however the left end tray has closed limit switch 572 completing a circuit to solenoid 576 of valve 540, initiating a return shift of the horizontal carriages. Upon completion of the horizontal return shift, limit switch 582 will be closed completing the previously described lowering circuit to the vertical carriages. The vertical carriages will lower the trays and actuate switch 588, as before described, to initiate a vertically upward shift of the carriages back to their original position, completing the cycle of movement of the chainless tray magazine. When all levels of tracks in the magazine are filled with trays the right hand end tray of the lower level of tracks is ejected from the exit in a longitudinal direction by ram 516 when the vertical carriages are lowered.

When a tray is ejected along skate conveyor 514 it passes through an exit opening 116 at the lower part of the front freezer cabinet wall onto another skate conveyor 600 (Figure 4) aligned with and inclined in substantially the same plane as skate conveyor 514. Skate conveyor 600 is aligned with the three chain conveyors 124, 126 and 128 located in the antechamber 108 and is vertically arranged beneath the chain conveyors to convey a tray in an opposite direction from that of the chain conveyors. Adjacent the lower end of skate conveyor 600 a third skate conveyor 602 is aligned and inclined in substantially the same plane. When the tray is ejected from the magazine and freezer cabinet and passes over skate conveyor 600 into skate conveyor 602, it will be in position directly above an elevator conveyor 130 described below in detail.

*Elevator conveyor*

In surrounding relationship to skate conveyor 602, the frame platform 603 of an elevator conveyor 130 comprises longitudinal angle plates 604 spaced on both sides of skate conveyor 602 (Figure 13) the main flanges of plates 604 are disposed in the vertical plane while the horizontal flange 606 is disposed in facing arrangement to form spaced, parallel, horizontal supports. Connecting the ends of plates 604 are Z-brackets 608 and 610. The upwardly extending edge of the rear Z-bracket 608 is angled toward the rear for a purpose to become apparent. The upward extending portion of Z-bracket 610 at the front of the frame structure provides a stop plate for a tray rolling down the skate conveyor 602 (Figure 4). At spaced intervals along the horizontal flanges 606, small angle members 612 are suitably fixed and act as lateral tray guides when the elevator conveyor is raised to the top level position as indicated by phantom lines in Figure 4.

The elevator conveyor frame structure or platform 603 is guided and partially supported for vertical and horizontal shifting movement by a sliding T-shaped member 614, termed the elevator lateral and vertical stabilizer, consisting of a vertical bar 616 fixed as by welding to the mid point of a horizontal bar 618. Stabilizer bar 614 is guided, for horizontal shifting, in horizontal guide bearings 620. Fixed, as by bolts 621, to the right hand plate 604 of platform 603 is a stabilizer bar vertical guide bearing 622. Platform 603 is maintained in a horizontal position during an elevation movement to the upper level by coaction between vertical guide bearing 622 and vertical rod 616, and vertical rod 616 is allowed to shift horizontally by coaction between horizontal rod 618 and horizontal guide bearings 620.

Platform 603 is shifted and additionally supported and maintained in a horizontal position by two sets of pivoted elevator arms 624 and 626. The arms 626 are pivoted to antechamber frame 132 by trunnions 628 and are pivoted to frame side plates 604 by trunnions 630. Intermediate the ends of arms 626 and adjacent the trunnions 630, a horizontal rod 632 is welded to and rigidly joins the arms 626. In order for the pair of arms 626 to clear bearing structure within the antechamber each arm 626 is bent at point 634 and an additional horizontal support rod 636 is welded between arms 626 at this point. The front elevator arms 624 are pivoted at one end on a trunnion 638 on the antechamber frame 132 and at their other end to a trunnion 640 suitably fastened near the forward portion of platform 603. The distance between trunnions 628 and 638 is equal to the distance between trunnions 630 and 640 and the distance between trunnions 638 and 640 is equal to the distance between trunnions 628 and 630. It will thus be seen that the platform supported by trunnions 630 and 640 will remain parallel to the horizontal antechamber structure regardless of the position of elevator arms 624 and 626.

The power unit for raising and lowering the elevator conveyor 130 includes a hydraulic servo-motor 642 having its base portion pivotally mounted at 644 to a cross channel member 646 welded between two diagonal channel members 648 fixed at their ends as by welding to the antechamber frame structure 132. The piston rod 650 of servo-motor 642 is connected by clevis 652 to the mid point of horizontal rod 632. Extension and retraction of piston rod 650 will first raise the platform 603 to a position shown by dotted lines in Figure 4 and subsequently lower the platform to the position shown in full lines in Figure 4.

At spaced locations along the bend of angle plates 604 of platform 603 notches 660 are formed, corresponding in position to the spacing between pairs of latch members 188 and 189. When the platform 603 is raised to its upper position, as shown in Figure 5, the tray 140 will rest between guide angles 612 and between Z-brackets 608 and 610. As stated in the description of the intermittent conveyor, when platform 603 raises a tray 140 to a level above the latch members 188 and 189 the sides of the trays will engage the beveled surfaces 190 of the latch members biasing them to one side against the spring action. As the tray passes above the top level of the latches the latches are enabled to return to extended position (Figure 9) and this extending movement is permitted by the notches 660 in angle plates 604 (Figure 6). When the latches spring back to the extended position and provide a support surface for the tray 140, platform 603 may then be lowered to its original position, leaving the tray in a position to be shifted by the intermittent conveyor 124.

Servo-motor 642 is automatically actuated in the following manner. The fluid connections at the ends of the servo-motor 642 are connected through lines 662 and 664 to a solenoid operated control valve 666. The pressure supply and return lines to solenoid valve 666 are connected to a hydraulic supply system similar to that used in the magazine conveyor. The lower solenoid 668 is controlled by a circuit including limit switch 670, line 672, limit switch 674 and line 676 to direct fluid under pressure to the lower portion of servo-motor 642 and extend piston rod 650 thereby shifting platform 603 to its upper position. Upper solenoid 678 is controlled by a circuit through limit switch 680, line 679 and lines 682 to direct fluid under pressure to the upper end of servo-motor 642 to lower the platform 603 to its original position.

Operation of the elevator conveyor is initiated by receiving a tray from the exit of the magazine conveyor. As the tray passes over the skate conveyor 600 and 602 it abuts the front Z-bracket 610 and simultaneously closes limit switch 670 through control linkage 671. If there is no tray on the intermittent conveyor (Figure 10), limit switch 674 will be in a closed position, the circuit to solenoid 668 will be completed and the platform 603 will lift the tray and deposit it on the intermittent conveyor. As the patform reaches the top level position an actuator 681 on horizontal rod 632 will close limit switch 680 completing a circuit to solenoid 678 to lower the platform to its original position. When the tray is deposited on the intermittent conveyor and as long as it remains on the intermittent conveyor, the tray side walls engage roller actuator arms (Figure 9) for two limit switches 223 and 674 (Figure 6). Actuation of limit switch 674 (Figures 14 and 15) will open the circuit to solenoid 668 and lockout further raising of the elevator conveyor until the tray has cleared the intermittent conveyor.

Actuation of limit switch 223 (Figures 14 and 15) by a deposited tray will energize solenoid 222 through a simple conventional circuit (Figure 14) and allow slip clutch 216 to start driving the intermittent conveyor. Limit switch 223 is held closed by the side wall of the tray 140 so long as the tray remains on the intermittent conveyor and breaks the circuit when the tray leaves the conveyor, thereby deenergizing solenoid 222 and allowing plunger 218 to engage in notch 220, disabling the drive to the intermittent conveyor. It is thus seen that the intermittent conveyor is stopped in a position to receive another tray from the elevator conveyor and the elevator conveyor is free to be actuated through another cycle of operation as soon as a tray is received from the magazine.

*Product unloader and exit chute*

To properly and conveniently unload units of conditioned products from the trays a novel arrangement of structure has been incorporated between the elevator conveyor 130, the intermittent conveyor 124 and the point where a tray is transferred to the indexing conveyor 126. By unloading the conditioned units just prior to refilling the trays with semi-processed units, the trays are maintained at approximately the temperature of the conditioned units, which in the case of frozen products will be at least −40° F., while the trays are in the antechamber.

With reference to Figures 6, 9 and 12 a tray unloading bar or plate 690 comprises a rectangular sheet metal plate bent at right angles along the top portion. The bent portion is welded to a horizontal bridge member 692 bolted to short support channel members 694 suitably affixed to the antechamber frame at a location midway between the intermittent conveyor and the indexing conveyor. Plate 690 depends into the path of movement of a tray, as it passes along the chain conveyors, and terminates just short of the plane of the tray bottoms, as indicated in Figure 9. The width of plate 690 is less than the distance between the side walls of a tray enabling a tray to be conveyed past the unloading plate but preventing any units of products to move with the tray to the indexing conveyor. Lateral tray guide rollers 696 depend from bridge 692 at either side of plate 690 and bear on the sides of a tray to provide additional tray guide structure.

After a tray of conditioned units has been positioned on the intermittent conveyor 124 by the elevator conveyor 130, one of the chain drive lugs 200 or 201, will engage the tray and positively push the tray past the unloading plate 690. The units will abut each other, because plate 690 prevents their passage with the tray, and drop off the open rear end of the tray as the tray moves out from under them.

Normally positioned immediately below intermittent conveyor 124 (Figures 4 and 9), a chute 700 receives the conditioned units as they drop from the tray passing along the intermittent conveyor and directs them out of the antechamber opening 110 to an adjoining conveyor system 702, or if desired, on a table to be packaged or further handled manually.

The space immediately below the intermittent conveyor 124 must be clear of obstructions whenever the elevator conveyor 130 is actuated to raise a tray to be positioned on the intermittent conveyor. Consequently, provision is made to tilt chute 700 to one side whenever the elevator is raised. Chute 700 is constructed of a flat bottom portion 704 extending from a point adjacent the front end of the antechamber to a point adjacent the vertical plane of unloading plate 690 and has short parallel triangular end walls 706 and converging guide walls 708 ending at an outlet opening 710. Bar braces 712 are suitably fixed to the lower surface of the chute and are rigidly fastened, adjacent the exit end of the chute, to a rod 714 as by welding. The ends of rods 714 are journalled in pillow block bearings 716 bolted to the vertical members of the antechamber frame 132 thus pivotally mounting the chute 700 so it may be tilted to a vertical position out of the path of the elevator in its upward movement.

Two bars 718 and 720 extend between the same vertical members of antechamber frame 132 that rod 714 is journalled on and provide limit stops for the tilting chute 700. Pivot rod 714 is offset from the center of gravity of the chute, as is apparent from Figure 9, so the chute is normally inclined against stop bar 718 to receive unloaded product units, from a tray just above.

Elevator conveyor 130 automatically tilts chute 700 to the position shown by phantom lines in Figure 9, during movement upwardly to the intermittent conveyor level, by a pair of rubber coated rollers 722 mounted by means of a saddle bracket 724 to the left hand elevator arm 624. As the elevator raises, arm 624 swings in an arc, indicated in Figure 4, and rollers 722 will engage the lower surface of center bar brace 712, moving and holding chute 700 to and in a position shown by dotted lines in Figure 9 against stop bar 720. Note that in the tilted position, the C.G. of the chute will remain to the right of pivot rod 714 so the chute will return of its own accord to the original position against stop bar 718 when the elevator lowers to its normal position.

*Cutting apparatus*

As shown in assembled relation with the entire combination (Figures 1–4) and in enlarged detail in Figures 27–32, the cutting mechanism comprises an integral rigid support base having two spaced elongate plates 740 and 742 joined at their ends by bridge members 744 welded thereto. The base plates 740 and 742 are adapted to be fixed in place over the indexing conveyor 126 by bolting to short channel extensions 743 (Figure 6) on frame 132. Each base plate has two adjustable clamp sockets 746, fixed to its upper surface as by welding, and the bores 748 of sockets 746 extend through base plates 740. Loosely fitting in each socket and adapted to be clamped tight within the sockets are shafts 750 with rigidly connected horizontal platforms 752 at their upper ends.

Bolted to each of the four platforms 752 are pillow block bearings 754 and spacer plates 756 and 757. One spacer plate, 757, has an extension 758 with a front vertical anchor plate 760 and a rear vertical anchor plate 762 affixed thereto as by welding for purposes to be described hereinafter. The front pair of opposed bearings 754 journals a shaft 764 having fixed thereon two sprocket wheels 766 disposed between the bearings. Journalled in the rear two bearings 754 is a second shaft 768 having fixed thereto and disposed between the bearings, two sprocket wheels 770, each in vertical planar alignment with its corresponding sprocket wheel 766 on the front shaft.

Two identical endless link chains 772 pass around and engage the two sets of corresponding sprocket wheels 766 and 770, and thereby comprise two vertically arranged, parallel and spaced apart loops of chain. At spaced intervals, opposed link pivot pins 774 have through axial bores 776. Passing through the bores 776 in opposed pins 774 are cutting wires 778 each having a headed end 780 abutting the outside of one pivot pin and a smaller headed end 782 for coacting with a tensioning device 784 bearing against the outside surface of the opposed pivot pin. The tensioning device comprises a split tapered spring guide 786 having an annular flange 788 and longitudinal grooves in the split surfaces. The grooves of the split guide fit around the cutting wire with the outside surface of the annular flange abutting the head 782 of the cutting wire. One end of a compression coil spring 790 is guided on the tapered parts of the split guide 786 and also retains the two split halves in clamped relation on the cutting wire. The other end of the coil spring 790 abuts the outer end of the pivot pin 774 and thus maintains the cutting wire under tension.

In the preferred embodiment, cutting wires pass through the hollow pins 774 at every fifth pitch (Figure 31) and the chains include sixty links or pitches resulting in 12 cutting wires passing between the chain loops. Each sprocket wheel has 30 teeth and must be rotated ⅙ of a turn or 60° to move the cutting wires a distance equal to the space between two adjacent cutting wires or five pitches.

To provide controlled intermittent 60° rotation of the cutting chain assembly, the end of shaft 768 that is journalled adjacent plate 757 is extended beyond the bearing and fixedly engaged with an indexing drive assembly 792. Drive assembly 792 comprises an indexing disc 794, fixed on shaft 768, having a recessed coaxial counterbore 796 on one side surface, constituting the driven part of a one-way roller type clutch. Mounted for rotation on shaft 768 and having a roller ratchet wheel portion 798 freely received within counterbore 796, is a hub 800 constituting the drive portion of the one-way roller clutch. Rollers 802 between ratchet wheel 798 and the inner cylindrical periphery of counterbore 796 complete the one-way clutching mechanism. A collar 804 fixed to the end of shaft 768 prevents axial displacement of hub 800 on the shaft.

Extending radially from hub 800 adjacent its outer end is a slotted arm 806 slidably receiving a link member 808 adjustably clamped thereto by bolts 810. Parallel links 812 are pivotally connected between link 810 and the extended end of a solenoid plunger connecting rod 814. Fixed on the front side of vertical anchor plate 762 is a solenoid 816 including a plunger 818 biased away from the anchor plate 762 by a spring 819. The plunger is integral with rod 814 and when solenoid 816 is energized the plunger and rod will move axially toward anchor plate 762, and upon deenergization of the solenoid the plunger will be biased away from plate 762 by spring 819. It is thus seen that intermittent energization of the solenoid 816 will, through linkage 812, 808 and 806 oscillate the drive ratchet wheel 798 of the one-way clutch. The clutch is so arranged that oscillation of wheel 798 in a clockwise direction (Figure 28) will engage the rollers 802 to drive the indexing disc 794 while counter clockwise oscillation of wheel 798 has no effect on disc 794.

Link 808, adjustably mounted in slotted arm 806, provides a means for accurately obtaining a 60° rotation of the indexing disc for each actuation of solenoid plunger 818. Reciprocation of solenoid plunger 818 and coincident rotation of the indexing wheel rotates the cutting chain assembly so rapidly that inertia will cause the assembly to coast beyond the 60° increment of movement of the clutch drive element, therefore a novel means is provided to positively stop rotation of the cutting chains at the end of a 60° or 5 pitch length of chain travel.

Fixed to the side surface of disc 794 adjacent the outer periphery are six stop pins 820, spaced 60° apart. Projecting forward from the top of vertical anchor plate 762 is a support arm 822 carrying an indexing pin 823 radially disposed with respect to the axis of shaft 768. A spring 824 biases the indexing pin 823 radially inward to ride on the circumference of hub 800 between the arm 808 and ratchet wheel 798. The indexing pin 823 has a linear path of movement that intersects the circular path of stop pins 820, however, when indexing pin 823 is biased against the circumference of the hub 800, pins 820 may rotate past the outer end of the indexing pin. Integrally formed on hub 800 is a cam 825 in axial alignment with arm 808 and in circumferential alignment with indexing pin 823, arranged to engage the inner end of pin 823 and move it radially outward into the path of stop pins 820 as the hub 800 nears the end of a 60° driving movement. It will be apparent from Figure 27 that during the initial portion of rotation of hub 800, the indexing pin is biased against the hub and the uppermost stop pin 820 can rotate beyond the path of movement of indexing pin 823. Continued rotation of hub 800, and necessarily the driven cutting assembly, will cause cam 825 to lift the indexing pin 823 to a position whereby the next stop pin will abut it (Figure 28). Simultaneously with the abutment between pins 820 and 823, the hub 800 completes the 60° travel and ceases to drive indexing disc 794. The cutting assembly is prevented from coasting past the desired 60° position by the abutment of the pins 820 and 823. Deenergization of the solenoid will allow spring 819 to reposition the hub 800, removing the cam 825 from beneath the indexing pin which will be biased by spring 824 out of the path of stop pins 820 and the mechanism is conditioned to repeat the next 60° cutting step.

The cutting mechanism is not limited to the exact dimensions of chains and sprockets nor the number of wires set forth in the above exemplary description, but any proper ratio may be used to obtain a cutting stroke equal to the distance between two cutting wires.

Previously mentioned extruding tube 100 has a vertical extent 830 fastened to the front vertical anchor plate 860 by U-bolts 831. The lower portion of tube 100 has a laterally extending section 832 passing through the loop of one of the cutting chains 772 between the front and back sprocket wheels and terminating in a vertically disposed nozzle 834 having the plane of its opening disposed a fractional distance above the plane of the lower stretch of cutting wires 778. Note, in Figure 27, that when the cutting assembly is in an inactive position the nozzle is directed between two adjacent cutting wires.

Semi-solid or plastic product mix extrudes from nozzle 834 at a predetermined rate, normally variable by controlled pumps (not shown) that feed the mix to the tubes. The cutting assembly is automatically intermittently actuated, by indexing mechanism to be described, to pass a cutting wire through a predetermined extruded portion, as indicated at 835 in Figures 27 and 29, and allow the cut unit to drop down to a tray 140 on the indexing conveyor. At this point the product unit passes into the antechamber through a hole 836 in the antechamber Plexiglas cover 106.

Although the cutter wires pass rapidly through the plastic mix there may be tendency for the cut unit to shift a slight amount with the moving wire. To prevent any possible shifting of the unit, an angle support 837 (Figure 27) is provided on Plexiglas cover 106 immediately adjacent the front edge of the descending path of the extruded unit. A similar angle support 838 (Figure 29) is provided adjacent one side of the path of the extruded unit to prevent any possible shift of the unit when a stick is inserted by mechanism to be described.

Alternative embodiments of the extrusion tubes and cutting mechanisms are shown in Figures 37 and 38. Figure 37 discloses a split supply tube 839 and 840 for extruding a unit of two flavors, colors or composition, past a cutting wire assembly. Figure 38 discloses an arrangement whereby two units may be simultaneously deposited on one tray by utilizing two separate extruding tubes 841 and 842 and a different embodiment of the cutting assembly, wherein three sprocket wheels and chains are utilized on each shaft to maintain proper tension of the cutting wire as it passes through the two extrusions of mix.

In the disclosed embodiment, one of the twelve cutting wires makes a cut during each actuation of the cutting assembly, leaving the remaining eleven wires to warm at room temperature. There is thus provided a means for preventing the cutting wires from freezing without using heated elements, which, over a period of time, would cause a layer of cooked products to build up on the cutting wire and create a breeding spot for contaminant bacteria.

If desired, a stick inserter, now to be described, may be utilized with the extrusion cutter mechanism.

*Stick inserter*

In the manufacture of certain ice cream products, holding sticks are inserted in each unit. To this end the present invention incorporates a removable stick inserter 104 (Figures 27, 29 and 33–36) to be actuated coincident with the cutting assembly.

The inserter unit comprises a magazine 845 removably and adjustably mounted to the cutter support plate 740 by a sliding brace 846, and to the front bridge member 744 by a second sliding brace 847. The side wall of the stick magazine is slotted at 848 to provide a visual indication of the quantity of sticks remaining.

At the lower end of the magazine 845 a plunger and stick guide track 849 is fixed as by welding. Slidable along track 849 is a stick plunger 850, shown in Figure 33 in the inactive or retracted position. Track 849 is formed with a reverse bend to provide a shelf 851 spaced from the lower end of the magazine 845 a distance equal to the thickness of a stick. The stick plunger 850 is bent in a manner corresponding to track 849, to slidably fit in an interlocking arrangement with the track and has a horizontal portion 852 that slides on top of track shelf 851. A short depending lip 853 extends from the front wall of the magazine to provide a limit stop for plunger 850.

Plunger 850 is actuated by a solenoid 854 mounted on the front wall of magazine 845. A spring biased solenoid plunger arm 855 connects by pivoted link 856 to a lever 857 pivoted on a journal stud 858 suitably fastened to the front face of the magazine. The swinging end 859 of lever 857 describes an arc in a plane coincident with the track 849 and engages with a hole 860 formed in arm 862 on the top side of stick plunger 850. Movement of lever 857 about its pivot axis will reciprocate stick plunger 850 along track 849. Note that solenoid plunger arm 855 is connected to lever 857 close to the pivot point, resulting in rapid movement of the lever at its swinging end.

The solenoid plunger 855 is spring biased to an extended position in a manner similar to that shown for the cutter solenoid 816, and is retracted by energizing the solenoid 854. In Figure 27, the stick plunger will move away from the viewer upon actuation of the lever 857. As will be apparent from Figure 33, when the stick plunger 850 is retracted, a stick will drop in position on shelf 851 ahead of the plunger and subsequent actuation of stick plunger 850 will force the stick to the left until plunger 850 abuts depending lip 853. In Figure 29, a view from the rear of Figure 33, plunger 850 has just completed a stick insertion as shown by stick 861.

When the stick inserter is used in this machine, the solenoid 854 will be connected in parallel (Figure 43) with the cutting assembly solenoid 816 and both solenoids will be simultaneously energized each time a signal is initiated calling for a unit to be deposited in a tray. Although both the cutting mechanism and stick inserter operate very rapidly, the stick inserter will finish the insertion operation first because of the small inertia of the mechanism and because of the large mechanical advantage afforded by the associated linkage, as compared with that of the cutter mechanism. This is a desirable feature because the stick must be inserted before the cut unit drops down or the stick will be crooked causing distortion of the products.

The indexing mechanism and control circuit for automatically depositing product units at controlled points on a tray will now be described.

*Indexing mechanism*

The indexing mechanism comprises means for automatically actuating the product unit depositing mechanism at successive spaced time intervals as a tray passes beneath the depositing mechanism and is constructed in such a manner that the number of cuts made during the time a tray passes below the depositer, the position of the first deposited unit relative to the leading edge of a tray, the spacing between any two adjacent cuts, and the spacing between the last cut and the end of the tray may be individually varied as desired without changing chains, sprockets or gears.

With reference to the upper portion of Figure 6 and the upper left portion of Figure 8, a variable contact distributor bar 870 of suitable electrical conductive material, and having a C-shaped cross-section, is fastened to plates 871 made of a suitable dielectric material. Plates 871 are fastened to mounting brackets 872 which in turn are welded or bolted to the underside of angle brackets 170 and 260, providing a rigid insulated mounting for the distributor bar. Bar 870 has a hooked portion at its rear end, as clearly shown in Figure 39, for a purpose that will become apparent. With reference to Figures 40 and 41, the open slot of the C-section bar is situated at the top of the bar and provides a convenient structure for adjustably mounting a plurality of bolts 873 having ends formed as pin contacts 874. The heads of bolts 873 bear on the underside of distributor bar flanges 875 and are clamped in position by nuts 876 and washers 877. It will be appreciated that the plurality of contact pins 874 thus mounted on distributor bar 870 are individually adjustable along the length of bar 870.

Immediately adjacent the distributor bar (Figure 6) and offset horizontally is an endless loop of link chain 878 the same length as the indexing conveyor chain loops 264 or 266. Index chain 878 passes around and engages with sprocket wheels 879 and 880 mounted in fixed engagement on extensions of the main drive shaft 164 and of shaft 250 respectively. Sprocket wheels 879 and 880 are the same size as the corresponding indexing conveyor sprocket wheels 174 and 262 and corresponding sprockets are fixed on the same shafts, hence linear movement of the index chain will be equal to that of the indexing conveyor chain. For this reason a point chosen on the index chain can be used as a control point having a direct and equal relation to the position of a tray on the indexing conveyor. Because the indexing conveyor chains are twice the length of a tray and have two drive lugs 270 and 272 for alternately engaging successive trays, and the index chain is the same length as the indexing conveyor chain, a second control point is required on the index chain, the two control points dividing the chain in two equal lengths.

Looking now at Figure 39, the indexing conveyor chain 266 and the index chain 878 are shown in offset relation and two trays 140' and 140" are shown on the indexing conveyor. At the equally spaced control points on index chain 878, two stylus points 881 and 882 are fastened to chain link pivot pins 883 as shown in detail in Figures 40 and 42. Note that stylus point 881 will pass the top dead center of sprocket wheel 880 as conveyor chain drive lug passes the center of extrusion nozzle 834. This relationship should be set up in accordance with positioning of the extrusion nozzle relative to the length of the indexing conveyor. With this relationship between the chains 266 and 878, the stylus point 881 will pass and contact each of the pins 874 during passage of one half of conveyor chain 266, between drive lugs 270 and 272, beneath the extrusion nozzle, and stylus point 882 will contact each of the pins 874 during passage of the other half of conveyor chain 266 beneath the extrusion nozzle.

The indexing circuit is described with reference to Figure 43, wherein stylus 881 is grounded through the chain 878 to the antechamber frame structure 132 and insulated distributor for 870 has connected thereto an electrical lead 884. A step-down transformer 885 connected to, for example, a 110 volt A.C. source has one low-voltage circuit lead 886 connected to frame 132 and the other lead 887 connected to one side of a solenoid 888. The lead 884 from distributor bar 870 is connected to the other side of solenoid 888, enabling a circuit to be completed each time a stylus point 881 or 882 makes contact with any contact pin, to thereby energize solenoid 888. Each time solenoid 888 is energized a plunger 889 contacts a limit switch 890 controlling a 110 v. circuit to the cutting mechanism solenoid 816 and the stick inserter solenoid 854. Thus, each time a stylus point makes contact with a contact pin, a stick will be inserted into an extruded portion of product and that extruded portion will be cut off and drop onto a tray below.

Looking again at Figure 39, tray 140' has received its final unit and drive lug 270 and the leading end of the tray 140" have just passed beneath the extrusion nozzle 834. Stylus point 881 has just made momentary contact with the first contact pin 874 and a unit of product 835 has been cut and is dropping into its position on the tray 140". Note that as the indexing conveyor chain moves the tray, with the first unit, past the nozzle 834, stylus point 881 will contact the second contact pin 874 and a second unit will drop immediately behind the first unit.

Depending on width of units, the spacing of contact pins 874 may be varied to place the adjacent units closer together or further apart and more or less contact pins can be used as desired. Position of the first and last contact pins 874 will determine the distance from the ends of a tray that the first and last units on a tray are deposited.

This indexing control is not limited to control of a cutter mechanism or stick inserter but may be used to index the depositing of many types of items on a moving tray or belt, as an example it may be used to index the depositing of prepacked semi-solid food products on a tray.

When an equal and direct relationship exists between the indexing conveyor linear movement and the index chain control points or styluses, the actual distance between two adjacent distributor bar contact pins 874 minus the width of an extruded unit will determine the space between the two product units deposited by the two pins thus providing a relatively simple manner of obtaining desired unit spacing. However the linear relationship between the conveyor and the index chain does not have to be equal, for example, if the index chain loop were only one half the length of the indexing conveyor chain loop, only one control point or stylus would be necessary and the distributor bar could be formed in a loop. The index chain could also be constructed half the length and rotate at half the speed of the indexing conveyor chain. However the relationship shown and described is considered the simplest structure to construct and operate.

*Freezer cabinet*

The sub-zero freezer cabinet 114 is shown in Figures 1, 2, 3 and 5 as a horizontally arranged elongated cabinet having front wall 900, top 901, back wall 902, bottom 903 and two hinged end closures 904 and 905 having latches 906 arranged thereon. All walls and closures comprise metal sheathed insulation as indicated at 908, structurally reinforced in any conventional manner. The interior is of sufficient dimension to enclose the magazine conveyor 320 with proper clearance at the sides, bottom and one end to provide ducting for return flow of cooling medium around the exterior of the magazine.

Adjacent the opposite end of cabinet 114 is a conventional sub-zero evaporator assembly 910 having inlet and outlet lines, 911 and 912 respectively, passing through a wall of the cabinet for connection to the remainder of the refrigerant system (not shown). Sheet metal plates 914, one of which is seen in Figure 1 are fastened to the tops and bottoms of evaporator assembly 910 to constitute a duct abutting the adjacent open end of magazine 320 and, together with magazine 320, results in a continuous duct extending from one end of the cabinet to the other end and spaced from each end closure 904 and 905. Circular baffles 916 are provided at the open end of the evaporator assembly 910 to form peripheral diffusers for fans or air pumps 918 positioned between the evaporator assembly and the end closure 905.

Two electric motor fans 918 are provided to circulate air, as a cooling medium, over the evaporator coils 910, through the ducts formed by trays within the magazine conveyor 320, and back along the sides and bottom of the magazine conveyor to the inlet side of the fans. As seen in Figures 1 and 2, the fan motors 920 are mounted on brackets 922 bolted to the exterior of end closure 905. Motor drive shafts 924 pass through holes 926 in the end closures and have fans 918 fixed to their ends. The motors are thus mounted on the exterior of the freezing cabinet and are not subjected to the extreme cold temperatures within the cabinet nor can they add heat to the interior of the cabinet to increase the refrigerant load.

Although not disclosed in the cabinet views, the hydraulic pump and controls for the chainless magazine conveyor are located exterior of the cabinet; and by conventional linkage, all limit switches may also be located exterior of the cabinet, to be actuated from the interior of the cabinet.

As previously mentioned the magazine can be placed within a freezing room and the ducting could be eliminated. Conventional freezing rooms can maintain the temperature at or below —40° F. and can be provided with fans to maintain constant circulation of air throughout the room.

*Antechamber*

The antechamber 108 comprises essentially a box like frame work of channel members 132 and is covered on the front, bottom and two sides by sheet metal 930. The rear end is open and adapted to abut in sealing relation with the front wall of the freezer cabinet to surround the freezer cabinet exit opening 116. On the left side of the antechamber a cover member 162, previously referred to, encloses the variable drive mechanism and a second side cover member 932 provides space for the tilting chute 700, when shifted out of the path of the elevator conveyor.

The top of the antechamber is formed of three separate covers. Cover member 934 encloses the intermittent conveyor and abuts the index mechanism cover 936. The indexing conveyor cover 106 previously described is made of Plexiglas or other similar transparent plastic to enable the deposited products to be viewed by the machine operator. Cover 106 fits over upturned flanges 938 (Figure 28) on bent over portions of the sheet metal sides 930, and abuts the freezer cabinet front wall 900 in surrounding relation to a portion of the cabinet entrance 112 as indicated in Figure 2. The remaining portion of entrance 112 is closed by an adjustable cover 940 that abuts the top of Plexiglas cover 106 to effectively seal the freezer cabinet entrance opening.

The two openings 112 and 116 leading from the freezer cabinet to the antechamber enable circulation of sub-zero air into and out of the antechamber for maintaining the antechamber at a sub-freezing temperature to effectively prevent formation of frost on the trays while they remain in the antechamber.

Should it be desired to process units having a thickness greater than the depth of a tray, the cutting mechanism pedestals 750 may be raised and an alternate higher Plexiglas cover substituted for the one disclosed. Accordingly the adjustable cabinet entrance cover 940 will also have to be raised to permit abutment of the alternate Plexiglas cover against the cabinet wall.

The antechamber covers are attached by conventional quick-disconnected fittings to provide ease of accessibility for repair and cleaning. The material used throughout the apparatus is preferably stainless steel but any suitable metal may be used.

*Modified drive mechanism*

It will be appreciated that this machine may be utilized to extrude large blocks of plastic or semi-solid ice cream mix or other suitable products, but, in order to prevent interference between the constantly extruding column of mix and the deposited unit, the bottom of the extrusion column must be at least the height of the unit above the tray to allow the previously deposited unit to pass beneath the extrusion column. This entails a considerable distance for units of pint or quart brick size to drop to the tray and can result in deformation of the units as they land on the tray. Furthermore either the conveyor speed must be increased or the extrusion rate decreased to prevent the aforementioned interference. Either factor will result in reduced tray capacity, and an increased rate of tray travel will result in reduced duration of the conditioning cycle, increased tray shifting frequencies and reduced timing tolerances.

Accordingly, the alternative drive mechanism illustrated in Figures 44, 45, 46 and 47 is provided, and is so arranged that the drive may readily be converted to the embodiment previously described. With regard to Figure 44, shaft 164' is journalled in pillow bearings 168 and has indexing conveyor sprocket wheels 174 fixed for rotation with the shaft. Journalled on shaft 164' is a coaxial hollow shaft 950 held against axial movement relative to shaft 164' by collars 951 fixed to shaft 164' as by set screws 952. Shaft 950 is further journalled in pillow block bearing 166' providing additional support for shaft 164'.

Fixedly mounted for rotation with hollow shaft 950 are the accelerating conveyor drive sprocket 176', main power driven sprocket 178' and index chain sprocket 879'. Sprocket 176' is connected by chain 312 to the accelerating conveyor while the driven sprocket 178' is connected by chain 180 with sprocket 158 on the drive motor variable speed shaft. Sprocket 879' engages with and drives index chain 878 in the manner previously described.

Looking now at Figure 48 it will be seen that the index chain 878 engages sprocket 880' which is fixedly mounted on a short hollow shaft 956 which also fixedly carries the intermittent conveyor drive sprocket 274'. Hollow shaft 956 is journalled on shaft 250 and prevented from axial movement thereon by collar 957. The forward indexing conveyor sprockets 262 are fixed on shaft 250 journalled in pillow bearings 252 and 254 in a manner identical to that described for the previous embodiment. It is thus seen that the index sprockets and chain, the accelerating conveyor and the intermittent conveyor are directly driven by the drive motor as explained in the previous embodiment, but the indexing conveyor may be operated independently of the foregoing mechanisms.

To operate the indexing conveyor in proper cyclical cooperation with the constantly driven index means, the motor drive shaft is extended, as indicated at 958, beyond the sprocket 158. Fastened to shaft extension 958 is a large diameter spring loaded variable pitch sheave 959 of conventional design. Suitably spaced from sheave 959 is a small variable pitch sheave 962, keyed to a counter-shaft 960 and connected by a belt to the large sheave 959. Counter-shaft 960 is journalled in pillow block bearings 961 which are suitably fastened to the frame 132. A slotted disk 963 is keyed or otherwise suitably fixed to the end of counter-shaft 961.

Shaft 164' is also extended, projects beyond the index distributor bar 870 and has a ratchet wheel 964 keyed adjacent the end. Freely journalled on the extended end of shaft 164' is a pawl lever 965 pivotally carrying, intermediate its length, a floating pawl 966 spring biased toward ratchet wheel 964, adapted to engage the teeth of and rotate ratchet wheel 964 when the pawl lever is rotated counterclockwise (Figure 45), and to disengage and float back over the beveled ratchet wheel teeth when the lever is rotated clockwise. Lever 965 is suitably retained on shaft 164' as by a spring clip retainer 967. The end of lever 965 is pivotally connected to a link 968 having its other end adjustably fastened to disk 963 by the shouldered stud 970 (Figure 44) passing through slot 969 and having a nut 971 threaded to its free end clamping the pivot stud to the disk.

The r.p.m. of the counter-shaft 960 is controlled by manually varying the pitch of the small sheave 962. This is accomplished in a conventional manner by a screw threaded control shaft 974 journalled in support brackets 975 and 976. The threaded shaft 974 engages the internally threaded end member 977 of a sheave control fork 978 acting against the face of a thrust bearing 979 to vary the pitch of sheave 962. As is well known, the speed ratio between sheaves 962 and 959 may be decreased by decreasing the pitch of controllable sheave 962, the tension on the belt automatically increasing the pitch of spring loaded sheave 959. Conversely the speed ratio may be increased by increasing the pitch of sheave 962, allowing the belt tension to slacken and spring loaded sheave 959 will automatically decrease its pitch.

Because each revolution of the small sheave 962, and hence of disk 963, results in one intermittent step of the indexing conveyor, a change in ratio between the r.p.m.'s shaft 958 and counter-shaft 960 will change the number of intermittent steps occuring during the predetermined number of revolutions of shaft 958 that are required to move the index chain one-half its length. Whenever the number of intermittent steps for each one-half length of index chain travel is varied, the length of each intermittent step must also be varied, by adjusting the position of stud 970 in the slotted disk 963, to thus maintain the proper direct relationship between the continual movement of the indexing conveyor and the continuous movement of the index chain.

During operation of the alternate embodiment, one-half revolution of the counter-shaft 960 will oscillate lever 965 and pawl 966 counterclockwise to advance the indexing conveyor and tray with deposited product units into position for receiving the next unit to be cut. The pawl 966 and ratchet 964 are engaged during the 180° rotation of stud 970 from TDC (with reference to a line between the centers of shafts 164' and 960 in Figure 45) to BDC and are released during the second 180° rotation from BDC to TDC, however, the index chain is maintained in continuous rotation, and is arranged to traverse a distance equal to that between desired center lines of deposited units during one rotation of counter shaft 960. The index distributor bar contact points will be arranged at intervals equal to the aforementioned desired center line spacings, and the index chain contact stylus will engage a distributor bar contact point approximately five degrees before the stud 970 reaches TDC, thus severing and depositing a unit just prior to a shifting movement of the tray.

This alternative embodiment will permit a closer spacing of large product portions on trays by moving the trays at a higher speed for a given distance to thereby permit the extruding column to clear the severed portion. The tray then remains stationary while the next portion is being extruded, severed and deposited. Thus the column may extrude to a position closer to the tray before the portion is severed resulting in a much shorter distance to drop to the tray; and the unit spacing may be closer together enabling an increased large unit capacity over that obtainable in the previously described embodiment.

It may be desirable to convert the drive mechanism to continuously operate the indexing conveyor in the manner described for the first embodiment. This is conveniently accomplished by removing link 968 from disk 963, removing spring retainer 967 and pawl lever 965 with pawl 966. Hollow shaft 950 has holes 972 drilled therein that may be aligned with a hole 973 drilled in shaft 164' and a pin or bolt (not shown) can then be passed through the holes 972 and 973 and retained therein to interlock shafts 164' and 950 for unitary rotation. When thus interlocked, the drive mechanism will rotate the intermittent conveyor, indexing conveyor, accelerating conveyor and index chain in a manner identical to that described for the first embodiment.

*General operation*

The method of starting the chainless magazine conveyor has been described and it will be apparent to those skilled in the art that the time interval required for the magazine to (1) receive a tray, (2) shift all trays at all levels horizontally, (3) return the horizontal carriages to their initial position, (4) vertically lower the alternate opposite end trays of succeeding levels to the next lower level and simultaneously eject a tray, and (5) return the vertical carriage to their initial position, will depend on the hydraulic operating pressure. An important factor that controls the time interval for the magazine cycle resides in the fact that product units are spaced and freely resting on the trays at desired intervals and a too rapid shift of trays into and out of the conveyor could cause units to slide against one another. For this reason the shifting speed of the conveyor is kept to a desired predetermined value. However, there is no possibility of a product unit falling off a tray while within the magazine because of the side shifting of trays.

It will be appreciated that the magazine cycle time interval will control the maximum operating speed of the apparatus and the gap created between the accelerating conveyor and the indexing conveyor must create a sufficient interval of time between trays entering the magazine to enable the magazine to complete a shifting cycle. If desired one or more lockout limit switches could be connected in series with the horizontal shifting limit switch 556 to prevent actuation of the inward horizontal shift whenever the vertical carriages are not in the upper position. This would prevent a jamming of trays within the magazine if the chain conveyor system were inadvertently operated at a speed in excess of the magazine operating speed.

It has been previously mentioned that as one tray is picked up by the accelerating conveyor and inserted into the magazine entrance, the succeeding tray starts to be filled. At this point in the entire cycle of operation, the tray being filled is the only tray in the antechamber. When the magazine receives the tray, the horizontal shifting is initiated, then the vertical shifting occurs. The first stage of vertical shift will eject a tray from the magazine to the elevator conveyor. At this point, if the tray being filled has cleared the intermittent conveyor and allowed limit switch 674 to close, the elevator will automatically pass through its cycle of operation to deposit the tray on the intermittent conveyor.

As is apparent from Figure 4, the front end of the trays are being filled with unprocessed products before the processed items are entirely unloaded from the rear end. This feature results in the shortest possible interval between removals of units having a temperature of approximately —40° F. and depositing of the semi-solid or plastic state units, hence the tray retains a temperature approximating —40° F. or that existing in the freezing cabinet. As previously mentioned it is desirable to maintain the trays close to that temperature to prevent the freshly deposited units from freezing to the tray.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An entirely enclosed, continuous cycle, free tray, product processing machine comprising: an intermittent conveyor adapted to support and convey trays in a straight path; an indexing conveyor adjacent and horizontally aligned with said intermittent conveyor to receive and convey said trays in the same direction; product extruding, cutting and stick inserting mechanism disposed immediately above said indexing conveyor, and including means intermittently actuated by said indexing conveyor at timed intervals, for depositing units of a product at intervals on a tray; an accelerating conveyor adjacent the end of and vertically aligned with said indexing conveyor opposite to the intermittent conveyor, operated at a higher rate of speed than said indexing conveyor and adapted to receive and accelerate the movement of a product loaded tray from the indexing conveyor; variable speed drive means interconnected with said three conveyors; a horizontally and vertically shiftable tray magazine conveyor abutting the delivery end of said accelerating conveyor adapted to contain a plurality of trays and to receive a loaded tray from the accelerating conveyor, including means coacting with said inserted trays to horizontally shift all trays contained therein, vertically shift a portion of said contained trays and eject a loaded tray; a conditioning cabinet enclosing said magazine conveyor, having an entrance opening surrounding said accelerating conveyor and an exit opening for trays to respectively enter into and exit from said magazine conveyor, and including means for producing and circulating a conditioning medium throughout said cabinet and magazine; a vertical conveyor disposed beneath and in vertical alignment with said three aligned conveyors and adjacent said magazine to receive an ejected tray; means adapted to be actuated by said ejected tray to raise the vertical conveyor with a tray to a position whereby said raised tray rests on said intermittent conveyor and to return the vertical conveyor to its lowermost position; means actuated by said tray when deposited on the intermittent conveyor to engage the drive means to actuate said intermittent conveyor thus moving the tray to said indexing conveyor; unloading means cooperating with said intermittent conveyor and loaded tray during movement toward the indexing conveyor to unload the conditioned product units and enable an empty tray to be received by the indexing conveyor; and an antechamber enclosing said three aligned conveyors and said elevator, abutting said conditioning cabinet and covering said entrance and exit openings.

2. A continuous cycle, free tray product processing machine comprising: an intermittent chain conveyor; an indexing chain conveyor; an accelerating chain conveyor; said three chain conveyors being interconnected to convey trays in a straight line path; product depositing mechanism disposed immediately above said indexing chain conveyor, and including means intermittently actuated by said indexing chain conveyor to deposit units of a product at intervals on a tray; variable speed drive means interconnected with said three chain conveyors; a horizontally and vertically shiftable tray magazine conveyor adapted to contain a plurality of trays, to receive a loaded tray from said accelerating conveyor and to eject a loaded tray; conditioning means enclosing said magazine conveyor and having entrance and exit openings; a vertical conveyor disposed beneath and in vertical alignment with said chain conveyors, and adjacent said magazine conveyor to receive an ejected tray, means to raise the vertical conveyor to deposit said received tray on said intermittent conveyor and to return the vertical conveyor to its lowermost position; means actuated by said tray when deposited on the intermittent conveyor to engage the drive means to actuate said intermittent conveyor to move the tray to said indexing conveyor; unloading means cooperating with said intermittent conveyor and loaded tray to unload the conditioned product units and means enclosing said three chain conveyors, said vertical conveyor, and abutting said cabinet.

3. A machine as set forth in claim 2, wherein said intermittent conveyor comprises: parallel spaced side walls with spring loaded support lugs attached thereto to form the base and one side of a tray guide track; an endless chain vertically arranged to one side of and above said support lugs and constituting the opposite side of said guide track; a drive lug on said chain adapted to engage and slide a tray in said track; sprocket means for said chain adjacent each end of said tracks; and tray actuated clutch means interconnecting said drive means and one of said sprocket means to cause said chain to drive when a tray is deposited in the intermittent conveyor tracks by said vertical conveyor.

4. A machine as set forth in claim 2, wherein said indexing conveyor comprises: two endless chains vertically arranged and in parallel spaced relation; a plurality of horizontally projecting support lugs at spaced intervals on the facing sides of said chains, the uppermost portion of said chains together with said lugs being adapted to support and longitudinally convey a tray; at least one opposing set of said support lugs including drive lugs for engaging an end of said tray to positively shift said tray; sprocket means for said chains at each end of the endless chain loops; said variable speed drive means being interconnected with one of said sprockets; a third vertically arranged endless chain parallel to and off-set to one side of said two endless chains; a second set of sprocket means interconnected with said first mentioned sprocket means for driving said third endless chain; at least one stylus point horizontally fixed to said third chain and grounded through said chain and driving means; a plurality of synchronizing distributor contact points connected to said depositing mechanism, arranged parallel with and off-set from said third endless chain, said distributor points and said stylus point adapted to coact at predetermined spaced intervals whereby said stylus point grounds each distributor point.

5. A machine as set forth in claim 2 wherein said accelerating conveyor comprises: two endless chains vertically arranged in spaced parallel relation; sprocket means at each end of said chains; said interconnecting means between the drive means and said accelerating conveyor being constructed to drive said accelerating conveyor at twice the rate of speed as said indexing conveyor; horizontally disposed support lugs on the facing sides of each of said endless chains adapted to support a tray on the upper portion of said endless chain track; said accelerating chain track being arranged with a slight downward inclination from the adjacent end of said indexing conveyor and protruding into said conditioning means.

6. A machine as set forth in claim 2 wherein said magazine conveyor comprises: spaced apart vertical side walls; a plurality of pairs of tracks disposed at different levels on the facing surfaces of said vertical walls; an entrance opening formed in one of said side walls disposed vertically below said entrance opening and adjacent to the lower edge, a plate disposed in the plane of the two upper level tracks extending from the lower edge of said entrance opening to the other of said side walls to form a shelf for receiving a longitudinally moving tray from said accelerating conveyor; means for shifting alternate levels of trays sideways in opposite directions in unitary action; means at the end of said upper level track and at alternate ends of each lower track level except the lowermost track for vertically shifting a tray from each upper level to the next lower level of tracks; means controlled by a tray entering said magazine for actuating said horizontal shifting means and setting up a circuit for actuating said vertical lowering means, said vertical lowering means including means for ejecting a tray out of said exit opening.

7. A machine as set forth in claim 2 wherein said vertical conveyor comprises: a horizontal platform; means for shifting said platform vertically and horizontally while maintaining said platform in a horizontal position; control means, connected to said shifting means, actuated by a tray being ejected onto said platform by said conveyor to cause operation of said shifting means to shift said platform to the level of said intermittent conveyor; and a second control means, connected to said shifting means, actuated by said tray reaching the level of said intermittent conveyor to cause said shifting means to return said platform to its lower level position.

8. A machine as set forth in claim 2 wherein said variable speed drive means comprises: an electric motor, variable speed means interconnecting said motor with said three aligned conveyors, and manually operated means connected to said variable speed means and extending outside of said enclosing means for changing the speed of said variable speed drive means.

9. A machine as set forth in claim 2 wherein said enclosing means comprises enclosing walls surrounding the sides, ends and bottom of said three aligned conveyors and said vertical conveyor, having an opening provided at one side thereof to form an unloading exit for processed units; a cover of transparent material for enclosing the top portion of said conveyors disposed beneath said depositing mechanism, a small opening being provided in said transparent cover immediately below said depositing mechanism, an upper and lower opening provided in the end of the enclosing means abutting said cabinet and aligned with said cabinet entrance and exit openings thus providing means for circulating conditioning medium throughout the interior of said enclosing means.

10. A machine as set forth in claim 2 wherein said depositing mechanism includes: an extruding device having a vertically disposed nozzle located above said indexing conveyor; a cutting mechanism including endless chain means spaced on either side of said extrusion nozzle and a plurality of cutting wires extending transversely and spaced equally between said chains; controlled clutch means for intermittently driving said chains so that one cutting wire passes across said nozzle during each intermittent operation; and power means interconnecting said clutch means with said indexing chain conveyor.

11. In a machine as set forth in claim 10 wherein said depositing mechanism includes: a stick inserter disposed adjacent said extrusion nozzle; said stick inserter including a stick magazine, a reciprocating member adjacent the lower end of said magazine adapted to remove one stick from said magazine and insert said stick in an extruded portion of a moving column of product at the same instance that one of said cutting wires passes across said nozzle; means, including a solenoid actuated linkage, connected to said reciprocating member and said indexing conveyor to intermittently actuate said reciprocating member.

12. In a machine as set forth in claim 2 wherein said unloading means comprises; a vertically disposed fixed finger plate adapted to fit within a tray deposited on the intermittent conveyor by said vertical conveyor; an exit chute tiltably mounted beneath said intermittent conveyor for receiving product units unloaded from said tray when passing beneath said finger plate; said exit chute coacting with said vertical conveyor to be tilted to a vertical side position by said vertical conveyor.

13. In a machine as set forth in claim 2 wherein said conditioning means comprises: an insulated cabinet including top, bottom, front and side walls and removable end walls; entrance and exit openings provided in said front wall to enable said magazine conveyor to receive and eject a tray; a motor mounted on the exterior of one of said end walls having a drive shaft extruding through said end wall and an impeller carried by said shaft on the interior side of said end wall; an evaporating coil located at one end of the cabinet adjacent said impeller; and fluid connections passing through a wall of said cabinet and connecting with said evaporator coil.

14. A continuous cycle, free tray, product processing machine comprising: an intermittent conveyor adapted to support and convey trays in a straight path; an indexing conveyor adjacent and horizontally aligned with said intermittent conveyor to receive and convey trays in the same straight path; product extruding and cutting mechanism disposed immediately above said indexing conveyor and including means intermittently actuated by said indexing conveyor at timed intervals, for depositing units of a product at equally spaced intervals on a tray; an accelerating conveyor adjacent the end of and vertically aligned with said indexing conveyor at the end opposite to the intermittent conveyor, operated at a higher rate of speed than said indexing conveyor and adapted to receive and accelerate the movement of a product loaded tray from the indexing conveyor; drive means interconnected with said three conveyors; a horizontally and vertically shiftable tray magazine conveyor abutting the delivery end of said accelerating chain conveyor, adapted to contain a plurality of trays and to receive a loaded tray in a starting position, including means coacting with said inserted trays to horizontally shift all trays, vertically shift some trays and eject a loaded tray; a conditioning cabinet enclosing said magazine conveyor, having an entrance and exit opening formed in one wall and including means for producing and circulating a conditioning medium throughout said cabinet and magazine; a vertical conveyor disposed beneath and in vertical alignment with said three aligned conveyors and adjacent said magazine to receive an ejected tray, means adapted to be actuated by a tray to raise the vertical conveyor with a tray to a position whereby said raised tray rests on said intermittent conveyor and to return the vertical conveyor to its position adjacent said magazine conveyor; means actuated by said tray when deposited on the intermittent conveyor to engage the drive means to actuate said intermittent conveyor thus moving the tray to said indexing conveyor; and unloading means cooperating with said intermittent conveyor and loaded tray during movement toward the indexing conveyor to unload the conditioned product units and enable an empty tray to be received by the indexing conveyor.

15. A continuous cycle, free tray product processing machine comprising: three in-line chain conveyors; drive means coupled to said three conveyors to continuously drive the second conveyor at a constant rate of speed, to intermittently drive the first conveyor at a higher rate of speed, and to continuously drive the third conveyor at a higher rate of speed; product unit depositing mechanism for placing units of product on a tray moving on said second conveyor; indexing means interconnecting said second conveyor and said depositing mechanism to control the spacing of units on said tray; a horizontally and vertically shiftable tray magazine conveyor adapted to contain a plurality of trays and including means for receiving a tray from said third conveyor and ejecting a tray; a conditioning means enclosing said magazine conveyor; a vertically shiftable conveyor disposed beneath and in vertical alignment with said three conveyors, and disposed adjacent said magazine conveyor to receive an ejected tray; means to shift said vertically shiftable conveyor, and a tray carried thereby, to place said tray on said first conveyor; means engaged by said tray to permit operation of said first conveyor by said drive means; means to unload said tray as it passes from the first conveyor to the second conveyor.

16. A machine as set forth in claim 15 wherein said first conveyor comprises: parallel spaced side walls with spring loaded support lugs attached thereto to form the base and one side of a tray guide track; an endless chain vertically arranged to one side of and above said support lugs and constituting the opposite side of said guide track; a drive lug on said chain adapted to engage and slide a tray in said track; sprocket means for said chain adjacent each end of said tracks; and tray actuated clutch means interconnecting said drive means and one of said sprocket means to cause said chain to drive when a tray is deposited in the intermittent conveyor tracks by said vertically shiftable conveyor.

17. A machine as set forth in claim 15, wherein said second conveyor comprises: two endless chains vertically arranged and in parallel spaced relation; a plurality of horizontally projecting support lugs at spaced intervals on the facing sides of said chains, the uppermost portion of said chains together with said lugs being adapted to support and longitudinally convey a tray; at least one opposing set of said support lugs including drive lugs for engaging an end of said tray to positively shift said tray; sprocket means for said chains at each end of the endless chain loops; said drive means being interconnected with one of said sprockets; a third vertically arranged endless chain parallel to and off-set to one side of said two endless chains; a second set of sprocket means interconnected with said first mentioned sprocket means for driving said third endless chain; at least one stylus point horizontally fixed to said third chain and grounded through said chain and driving means; a plurality of synchronizing distributor contact points connected to said depositing mechanism, arranged parallel with and off-set from said third endless chain, said distributor points and said stylus point adapted to coact at predetermined spaced intervals whereby said stylus point grounds each distributor point.

18. A machine as set forth in claim 15 wherein said chainless magazine conveyor comprises: spaced apart vertical side walls; a plurality of pairs of tracks disposed at different levels on the facing surfaces of said vertical walls; an entrance opening formed in one of said side walls adjacent the top and one end; an exit opening formed in said one side wall disposed vertically below said entrance opening and adjacent to the lower edge, a plate disposed in the plane of the two upper level tracks extending from the lower edge of said entrance opening to the other of said side walls to form a shelf for receiving a longitudinally moving tray from said third conveyor; means for shifting alternate levels of trays sideways in opposite directions in unitary action; means at the end of said upper level track and at alternate ends of each lower track level except the lowermost track for vertically shifting a tray from each upper level to the next lower level of tracks; means controlled by a tray entering said magazine for actuating said horizontal, tray shifting means and setting up a circuit for actuating said vertical, tray shifting means; means controlled by return of said horizontal, tray shifting means for actuating said vertical, tray lowering means; said vertical, tray lowering means including means for ejecting a tray out of said exit opening.

19. A machine as set forth in claim 15 wherein said vertical conveyor comprises: horizontal platform; means for shifting said platform vertically and horizontally while maintaining said platform in a horizontal position; control means, connected to said shifting means, actuated by a tray being ejected onto said platform by said shiftable tray magazine conveyor to cause said shifting means to shift said platform to the level of said intermittent conveyor; and a second control means, connected to said shifting means, actuated by said tray reaching the level of said intermittent conveyor to cause said shifting means to return said platform to its lower level position.

20. A machine as set forth in claim 15 wherein said drive means comprises: an electric motor, variable speed means interconnecting said motor with said three aligned conveyors, and manually operated means connected to said variable speed means and extending outside of said enclosing means for changing the speed of said drive means.

21. A machine as set forth in claim 15 wherein said depositing mechanism includes: an extruding device having a vertically disposed nozzle located above said indexing conveyor; a cutting mechanism including endless chain means spaced on either side of said extrusion nozzle and a plurality of cutting wires extending transversely and spaced equally between said chains; controlled clutch means for intermittently driving said chains so that one cutting wire passes across said nozzle during each intermittent operation; and power means interconnecting said clutch means with said indexing chain conveyor.

22. In a continuous cycle free tray conveyor system for depositing units of a product to be processed on a tray, conveying the tray to a conditioning chamber and back to a position to receive more deposited units, the improvement comprising: an indexing chain conveyor having means carried by chains to continuously move a tray at constant speed beneath a depositing mechanism; indexing means actuated by said indexing conveyor and connected to said depositing mechanism to deposit units of product at equally spaced intervals on a tray as it moves under the depositing mechanism; an accelerating conveyor adjacent the end of the indexing conveyor; an intermittent conveyor to pass a tray to said indexing conveyor; means coacting between said accelerating conveyor and said intermittent conveyor to convey and condition loaded trays of units to be processed from the accelerating conveyor to said intermittent conveyor; and means to unload conditioned units from the trays as they pass from the intermittent conveyor to the indexing conveyor.

23. In a continuous cycle, free tray, product processing machine having a system of continuous conveyors, a product depositing mechanism and a conditioning unit, the improvement comprising: an indexing chain conveyor having means carried by chains to continuously move a tray at constant speed below the depositing mechanism; means cooperating between said indexing conveyor and the depositing mechanism to actuate the depositing mechanism at timed intervals; a horizontally and vertically shiftable tray magazine conveyor enclosed within said conditioning unit, adapted to contain a plurality of trays, having means provided to receive an unconditioned product carrying tray and to eject a conditioned product carrying tray and also having means coacting with said inserted trays to horizontally shift all trays contained therein, vertically shift a portion of said container trays and eject a tray each time a tray is received; an accelerating conveyor interconnecting the indexing conveyor with the magazine conveyor; drive means connected to drive the indexing conveyor at a predetermined speed and said accelerating conveyor at a predetermined higher speed to thereby create a gap between trays passing from the depositing mechanism to the conditioning unit.

24. In a continuous cycle, free tray, product processing machine having a continuous system of conveyors, a product depositing mechanism and a conditioning unit, the improvement comprising: a first means to convey a tray at a predetermined speed under said depositing mechanism; a second means to receive a tray and convey it away from said first means at a higher rate of speed; and a third means within said conditioning unit comprising support means to receive a tray from said second means and to contain a plurality of trays at different levels, and shiftable means to shift all contained trays horizontally, a portion of said contained trays vertically and eject a tray of conditioned products.

25. A product conveying and processing system comprising: free, elongate U-shaped trays; a first means to fill said trays and convey them in a lengthwise direction; accelerating conveying means receiving said lengthwise conveyed trays increasing their rate of travel; a horizontally and vertically shiftable magazine tray conveyor adapted to contain a plurality of trays and comprising a receiving shelf abutting said accelerating conveyor to receive a lengthwise conveyed tray therefrom, a skate roller means positioned vertically from said receiving shelf to convey a tray from said conveyor magazine, and means to horizontally shift all trays, vertically shift some trays and combining with said skate roller means to eject one tray in a longitudinal direction opposite to and vertically displaced from said accelerating conveying means; a horizontal platform cooperating with said skate roller means to receive an ejected tray; means for vertically displacing said horizontal platform to carry the tray to a position at substantially the level of said accelerating conveyor; and means receiving a tray from said platform, removing products therefrom and transferring the tray to said first means.

26. A system for conveying elongate U-shaped product holding trays and processing the products carried thereby comprising: a magazine tray conveyor having support means to contain a plurality of trays in substantially horizontal disposition with different portions of said plurality located on a plurality of vertically disposed support levels, an inlet entrance to said support means to receive a tray at one of said levels, an outlet exit enabling ejection of a tray at another of said levels, shiftable means to horizontally simultaneously shift all of the plurality of trays along the level on which they are disposed and subsequent to such a horizontal shift to vertically simultaneously shift at least one of the trays from each support level excepting said another level to the adjacent support level including said another level, and to eject at least one tray from said another level simultaneously with said vertical shifting, and means responsive to at least one tray being received through said inlet entrance into said magazine conveyor to actuate said shifting means for operation through the aforesaid cycle; conditioning means enclosing said magazine conveyor; a second conveyor structurally inter-related with said magazine to introduce thereto a tray of unconditioned products; a platform conveyor disposed adjacent said magazine conveyor and adapted to receive a tray of conditioned products ejected at said second level; means to vertically shift said platform conveyor and tray to said first level; and means for receiving said trays from said platform conveyor, unloading the conditioned products, reloading the tray with unconditioned products and conveying said tray to said magazine conveyor at the first level.

27. In a free tray, conveying and product disposing system; a first, second and third conveyor aligned and in abutting relationship and adapted to convey trays along a straight path; a product extruding and cutting mechanism mounted above said second conveyor; means for driving said conveyors connected to intermittently drive said first conveyor, to continuously drive said second conveyor at a first predetermined speed and to drive said third conveyor at a second predetermined speed greater than said first predetermined speed; means to intermittently drive said cutting mechanism; means for placing a tray on said first conveyor; means controlled by a tray placed on said first conveyor for permitting said drive means to engage said first conveyor to move the tray to said second conveyor and said cutting mechanism drive means to operate said drive means at timed intervals to deposit cut extruded units of product at intervals on a tray passed beneath the cutting mechanism by said second conveyor.

28. A system as set forth in claim 27, including: means abutting said third conveyor and cooperating with said first conveyor to receive a loaded tray, subject the products to a conditioning process and place the loaded tray on said first conveyor; and means cooperating with said first conveyor to unload said conditioned products.

29. A mechanism for depositing units of semi-solid products on a free platform, consisting of: a frame; conveyor means on said frame for moving said platform horizontally; product extruding means having a vertical nozzle above said conveyor; cutting means disposed on said frame having a plurality of cutters adapted to pass across the open end of the nozzle and including a motor operated reciprocable member actuating said cutters to pass one cutter across said nozzle each time the motor operates; power means connected to said motor including control means connected to and adapted to be intermittently actuated by said conveyor means to cut units of extruded product and allow them to drop at intervals on said moving platform.

30. A mechanism for depositing units of semi-solid products on a tray, consisting of: a frame; spaced sprocket wheels; drive means connected to said sprocket wheels; a plurality of endless chains interconnecting said sprocket wheels to constitute a chain conveyor; a tube ending in a vertical nozzle disposed above said conveyor to extrude a product toward a tray on said conveyor; a cutting mechanism at the discharge end of said nozzle drive mechanism, including a reciprocable member connected to actuate said cutting mechanism one cutting stroke for each reciprocation; a solenoid having a plunger connected to said reciprocable member; a distributor member fixed on said frame structure and having a plurality of contact points connected in parallel; one of said plurality of chains having at least one contact member connected thereto and adapted to successively engage each of said contact points as said plurality of endless chains rotates; an electric circuit connecting said solenoid, contact points and contact member and adapted to be completed each time the contact member engages a contact point whereby as a tray is conveyed under said extrusion nozzle a unit of extruded product will be cut and deposited at intervals on said tray.

31. A mechanism for depositing units of semi-solid products on a tray, consisting of: a frame; horizontally spaced sprocket wheels; drive means connected to said sprocket wheels; a plurality of endless chains interconnecting said sprocket wheels to constitute a chain conveyor; a tube joined to a vertical nozzle disposed above said chains for directing an extruded product toward a tray conveyed on said chains; a cutting mechanism cooperating with said nozzle comprising at least two endless chains; a plurality of cutting wires passing horizontally from one of said two endless chains to the other; drive mechanism, including a reciprocable member, connected to drive said two endless chains so that a cutting wire passes across the open end of said nozzle for each reciprocation of the member; a solenoid having a plunger connected to said reciprocable member; an electric circuit connected to said solenoid including a distributor member disposed on said frame structure and having a plurality of contact points connected in parallel arrangement to said solenoid; one of said plurality of chains being connected to the other side of said circuit, means on last mentioned chain adapted to successively engage each of said contact points as said plurality of endless chains rotate to close said circuit at timed intervals and actuate said solenoid; whereby as a tray is conveyed under said nozzle units of extruded product will be cut and deposited at intervals on said tray.

32. A mechanism for depositing units of semi-solid products on a tray, consisting of: a frame structure; two sets of horizontally spaced sprocket wheels; drive means connected to one set of sprocket wheels; a plurality of endless chains interconnecting one set of sprocket wheels with the other set; support lug means on some of said chains to support and convey a tray with said chains as they pass from one set of wheels to the other set; a tube having a horizontal portion above and transversely arranged in relation to said chains, joined to a vertical nozzle above and directed vertically toward said chains for directing a semi-solid extruded product toward a tray carried by said chains; a cutting mechanism comprising at least two endless chains; a group of sprocket wheels guiding said chains in vertical parallel planes, a plurality of cutting wires passing horizontally at equal intervals from one of said two endless chains to the other, resilient means on one of said last mentioned chains engaging said cutting wires to hold them taut; a ratchet drive mechanism, including a reciprocable member, and a member connected to one of said sprocket wheels to rotate said sprocket wheel so that a cutting wire passes across the open end of the vertical nozzle for each reciprocation; a solenoid having a plunger; resilient means within said solenoid biasing said plunger in one direction; a connection between said plunger and said reciprocable member; an open electric circuit connected to said solenoid; a J-shaped distributor member disposed in fixed relation on said frame structure and having a plurality of contact points connected to a common point in said open circuit; one of said plurality of chains being connected to the other side of said open circuit, at least one stylus point connected to said last mentioned chain and adapted to successively engage each of said contact points as the drive means rotates said plurality of endless chains to close said circuit at timed intervals and actuate said solenoid; whereby as a tray is conveyed under said extrusion nozzle units of extruded product will be cut and deposited at intervals on said tray.

33. A mechanism as set forth in claim 30 including: a solenoid operated stick inserter, including a magazine having sticks therein, disposed on said frame structure adjacent said nozzle; circuit means connected with said inserter solenoid and in parallel arrangement to said cutter solenoid circuit so that each time a distributor contact point is contacted by a contact member a stick will be inserted into an extruded portion of semi-solid product and that portion will be cut off by said cutter and deposited in a tray.

34. A mechanism as set forth in claim 33, wherein said stick inserter comprises a reciprocable stick inserting plunger slidably connected to the lower end of said magazine, an inserter solenoid operated plunger and linkage interconnecting said two plungers.

35. In a machine for conveying and performing a processing step on a product the combination comprising a driven endless chain horizontal conveyor; an indexing means including a member with a plurality of projections offset from said chain conveyor; a driven means rotating in direct relation to said endless chain, drivingly connected therewith and including a member adapted to intermittently engage successive projections of said indexing member during a cycle of rotation; means for performing a processing step operatively connected with said indexing means to be actuated each time one of said projections is engaged.

36. In a machine for conveying and performing a processing step on a product the combination comprising: and endless chain horizontal conveyor; indexing means parallel to and horizontally offset from said conveyor and including a grounded endless chain means drivingly connected with said conveyor having at least one contact member projecting therefrom; an elongate distributor bar fixed to said machine, having a plurality of contact points adapted to be intermittently engaged by said contact member and affixed in parallel to one side of an electrical circuit whose other side is grounded; said electric circuit including a motor means adapted to actuate a device for performing a process step on a product to be conveyed on said conveyor.

37. A cutting device comprising: a support frame; two parallel spaced axles; a plurality of sprocket wheels similarly spaced on and fixed to each axle so that each sprocket on one axle is in the same plane as a sprocket on the other axle; bearing means on said frame, journalling said axles; ratchet means including a reciprocable member and adapted to coact with one of said sprocket wheels to rotate said wheel and axle; a plurality of endless roller link chains disposed around and engaging complementary pairs of sprocket wheels, thus constituting a plurality of parallel link chain loops; opposed pairs of rollers in adjacent chains at spaced intervals having an axial through bore therein; each of said pairs of rollers having a cutting wire passing through the bores to extend perpendicular between said adjacent chains; said cutting wire, at one end, having a stop means to coact with an outer surface of one roller and spring means coacting between the opposite outer surface of the other roller of a pair and the other end of said wire to keep the wire taut.

38. An extended product cutting mechanism comprising a plurality of parallel endless chain means, at least one cutting device extending perpendicular from one chain means to another and drive means for intermittently rapidly moving said chain means.

39. A cutting mechanism as set forth in claim 38, wherein each of said chain means comprises an endless roller link chain.

40. A cutting mechanism as set forth in claim 39, wherein spaced opposed rollers of adjacent roller link chains have said cutting devices attached thereto to extend between the opposed rollers.

41. A cutting mechanism as set forth in claim 38 wherein said endless chain means comprises axles having sprocket wheels thereon.

42. A cutting mechanism as set forth in claim 41, wherein said drive means comprises a powered reciprocating member, a one-way drive mechanism connected thereto and connected with one of said sprocket wheels to rapidly rotate said sprocket wheel and endless chain each time the powered member reciprocates.

43. A cutting mechanism as set forth in claim 38, wherein means coact with said endless chain means to positively limit the distance of each intermittent movement.

44. A product distributor mechanism for use with a mechanism having a fixed cycle comprising: a fixed member positioned adjacent said fixed cycle mechanism; a plurality of relatively movable control means adjustably mounted on said fixed member; a control engaging element on said fixed cycle mechanism adapted to engage each of said control means successively during each cycle of said fixed cycle mechanism; a conditioning means for performing a plurality of conditioning functions equal in number to said plurality of control means each time said control engaging element completes a cycle; and operating means for said conditioning means, providing parallel control connection between all control means and said conditioning means, rendered operative each time said control engaging element engages a control means.

45. In a free tray conveyor apparatus including a conveyor: a product unit depositing mechanism including electric power means disposed adjacent said conveyor; a rotating element electrically connected to and rotating in direct relationship with the speed of said conveyor; a distributor member; means including a dielectric material mounting said distributor member adjacent said conveyor in insulated relation to said conveyor; a plurality of contact elements relatively adjustably fastened on said distributor member and structurally arranged to be successively contacted by said rotating element during a cycle of rotation; and electrical means connecting all contact elements in parallel to one side of said power means and said conveyor to the other side of said power means to thus complete a power circuit to operate said depositing mechanism to deposit a product unit on said conveyor each time a contact element is engaged by said rotating element.

46. A conveyor apparatus as in claim 45, wherein said distributor member comprises an elongate C-section channel member and each of said plurality of contact elements include a contact pin and are individually adjustably mounted within said channel with said contact pin protruding from the open side of said channel member.

47. A continuous cycle process of manufacturing ice cream units so they will not freeze to a conveying tray when deposited thereon and passed through a freezing medium consisting of the steps of: passing a tray whose temperature is at least as cold as −30° F. under a semisolid ice cream mix extrusion tube and cutting mechanism; cutting and depositing units of extruded mix on the cold trays; conveying the loaded trays into an atmosphere having a temperature colder than −30° F.; retaining the trays at a temperature below −30° F. until the units and trays are equal to the surrounding temperature; conveying the trays and products with a minimum time lapse to a position within a sub-freezing enclosure where the tray is again directed toward the extrusion tube and cutter; and sliding the frozen units off one end of the tray as the tray passes toward the extrusion and cutting mechanism to start a repetition of the cycle.

48. A continuous cycle, free tray product processing machine comprising: at least three aligned chain conveyors; drive means coupled to said aligned conveyors to drive the second conveyor at a first rate of speed, to intermittently drive the first conveyor at a higher rate of speed than said first rate of speed, and to continuously drive the third conveyor at a higher rate of speed than said first rate of speed; product unit depositing mechanism for placing units on a tray moving on said second conveyor; and indexing means interconnecting said second conveyor and said depositing mechanism to control the spacing of units on said tray in accordance with a predetermined rotation of said drive means.

49. A machine as set forth in claim 48 wherein means are included in the connection between the drive means and the second conveyor to continuously move said second conveyor in direct relationship with said indexing means.

50. A machine as set forth in claim 48 wherein means are included in the connection between the drive means and the second conveyor to move the second conveyor at intermittent intervals but at a constant rate of travel in direct relationship with said indexing means.

51. A continuous cycle, free tray, product processing machine comprising: a continuous system of plural conveyors arranged to automatically move free trays in a closed endless path; a product depositing mechanism; a conditioning means; one of said conveyors being continuously operated and disposed adjacent said depositing mechanism and having connected thereto, in direct rotational relationship, an indexing device operatively connected to control said depositing mechanism whereby operation of said depositing mechanism will be in direct relation with the speed of said one conveyor; a second one of said conveyors disposed in successive arrangement to said one conveyor to receive a tray and convey it away from said one conveyor at a higher rate of speed; and a third one of said conveyors capable of containing and conveying a plurality of trays within said conditioning means disposed to receive a tray from said second conveyor and including means rendered operative upon receiving a tray from said second conveyor to shift all contained trays and eject a tray of conditioned products.

References Cited in the file of this patent

UNITED STATES PATENTS

| Number | Name | Date |
| --- | --- | --- |
| 562,512 | Dick | June 23, 1896 |
| 930,239 | Schrag | Aug. 3, 1909 |
| 1,196,364 | Hytrek | Aug. 29, 1916 |
| 1,313,793 | Dalton | Aug. 19, 1919 |
| 1,345,301 | Winchester | June 29, 1920 |
| 1,452,711 | Schroeder et al. | Apr. 24, 1923 |
| 1,609,199 | Retzbach | Nov. 30, 1926 |
| 1,958,890 | Foss et al. | May 15, 1934 |
| 1,960,456 | Robb | May 29, 1934 |
| 1,969,833 | Beard | Aug. 14, 1934 |
| 1,992,135 | Underwood | Feb. 19, 1935 |
| 2,055,805 | Rapisarda | Sept. 29, 1936 |
| 2,080,557 | Braui | May 18, 1937 |
| 2,271,937 | Engels | Feb. 3, 1942 |
| 2,303,186 | Williams | Nov. 24, 1942 |
| 2,496,438 | Brandt | Feb. 7, 1950 |
| 2,538,734 | Patterson | Jan. 16, 1951 |
| 2,612,852 | Morrison | Oct. 7, 1952 |
| 2,624,297 | Nuttall | Jan. 6, 1953 |
| 2,625,120 | Eddy et al. | Jan. 13, 1953 |
| 2,625,284 | Atwood | Jan. 13, 1953 |

UNITED STATES PATENT OFFICE
CERTIFICATE OF CORRECTION

Patent No. 2,903,979                          September 15, 1959

Clarence R. Behling

It is hereby certified that error appears in the printed specification of the above numbered patent requiring correction and that the said Letters Patent should read as corrected below.

Column 8, line 65, for "simutaneously" read -- simultaneously --; column 9, line 53, for "Motors" read -- Motor --; column 20, line 47, for "chanel" read -- channel --; column 32, line 61, for "quick-disconnected" read -- quick-disconnect --; column 41, line 64, for "conveyor magazine" read -- magazine conveyor --; column 44, line 39, for "and" read -- an --; line 70, for "extended" read -- extruded --; column 45, line 32, for "connection" read -- connections --.

Signed and sealed this 29th day of March 1960.

(SEAL)
Attest:

KARL H. AXLINE
Attesting Officer

ROBERT C. WATSON
Commissioner of Patents